United States Patent [19]
Bondie et al.

[11] 3,789,500
[45] Feb. 5, 1974

[54] MACHINE TOOL WITH AUTOMATIC TOOL CHANGING MEANS

[75] Inventors: Dale J. Bondie, Fowlerville; Robert S. Sutton, Franklin; James D. Lewelling, Birmingham, all of Mich.

[73] Assignee: Ex-Cell-O Corporation, Detroit, Mich.

[22] Filed: July 28, 1971

[21] Appl. No.: 166,886

[52] U.S. Cl. ............................................... 29/568
[51] Int. Cl. ............................................ B23q 3/157
[58] Field of Search .. 29/568, 26 A; 408/239 A, 71; 90/11 D, 56 R, 58 R, 58 B; 74/826, 813 L

[56] References Cited
UNITED STATES PATENTS

| | | | |
|---|---|---|---|
| 3,286,344 | 11/1966 | Brainard et al. | 29/568 |
| 3,311,025 | 3/1967 | Zankl et al. | 29/568 X |
| 3,300,856 | 1/1967 | Daugherty | 29/568 |
| 3,271,853 | 9/1966 | Pfister | 29/26 A |
| 3,635,569 | 1/1972 | Sato et al. | 29/26 A |
| 3,691,655 | 9/1972 | Kueimoto et al. | 29/568 |
| 3,449,823 | 6/1969 | Jerve | 29/568 |
| 2,924,152 | 2/1960 | Zettler | 408/239 A |
| 3,667,305 | 6/1972 | Rasoira | 74/813 L |
| 3,031,902 | 5/1962 | Parske et al. | 74/826 X |
| 3,054,333 | 9/1962 | Brainard et al. | 74/826 X |
| 3,238,615 | 3/1966 | Leone et al. | 29/568 |
| 3,513,730 | 5/1970 | Lohneis | 74/826 X |
| 3,587,873 | 6/1971 | Lohneis | 29/568 X |

Primary Examiner—Andrew R. Juhasz
Assistant Examiner—Z. R. Bilinsky
Attorney, Agent, or Firm—James H. Bower; Mitchell J. Hill

[57] ABSTRACT

A machine tool having an automatic changing means and which is constructed and arranged to carry out a variety of machining operations, such as milling, drilling, boring, tapping and the like. The machine includes a rotary, four-position index work table which is carried on two movable, perpendicularly disposed slide members to provide movement of the work table along X and Z axes. A tool spindle assembly is slidably mounted on a "Y" axis between two column members with a tool spindle, spindle drive motor, gear box, tachometer and resolver mounted in axial alignment with each other for movement as a unit along said Y axis. A tool storage conveyor is disposed horizontally on said column members above the tool spindle assembly and for moving tools into a tool changing position above the tool spindle. A tool changer means is mounted between the column members and between the tool spindle assembly and the tool storage conveyor for automatically transferring tools directly between the tool storage conveyor and the tool spindle.

13 Claims, 57 Drawing Figures

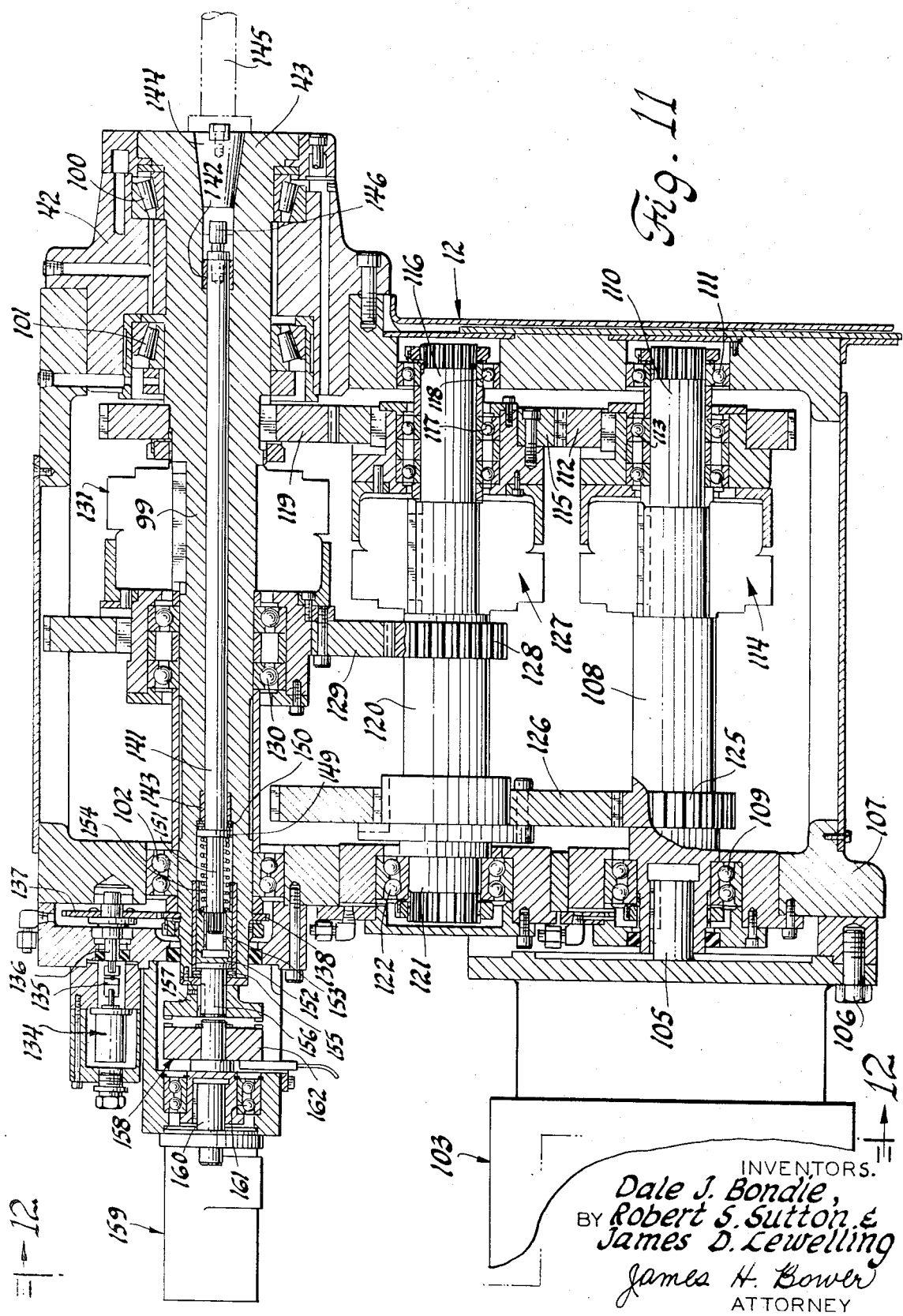

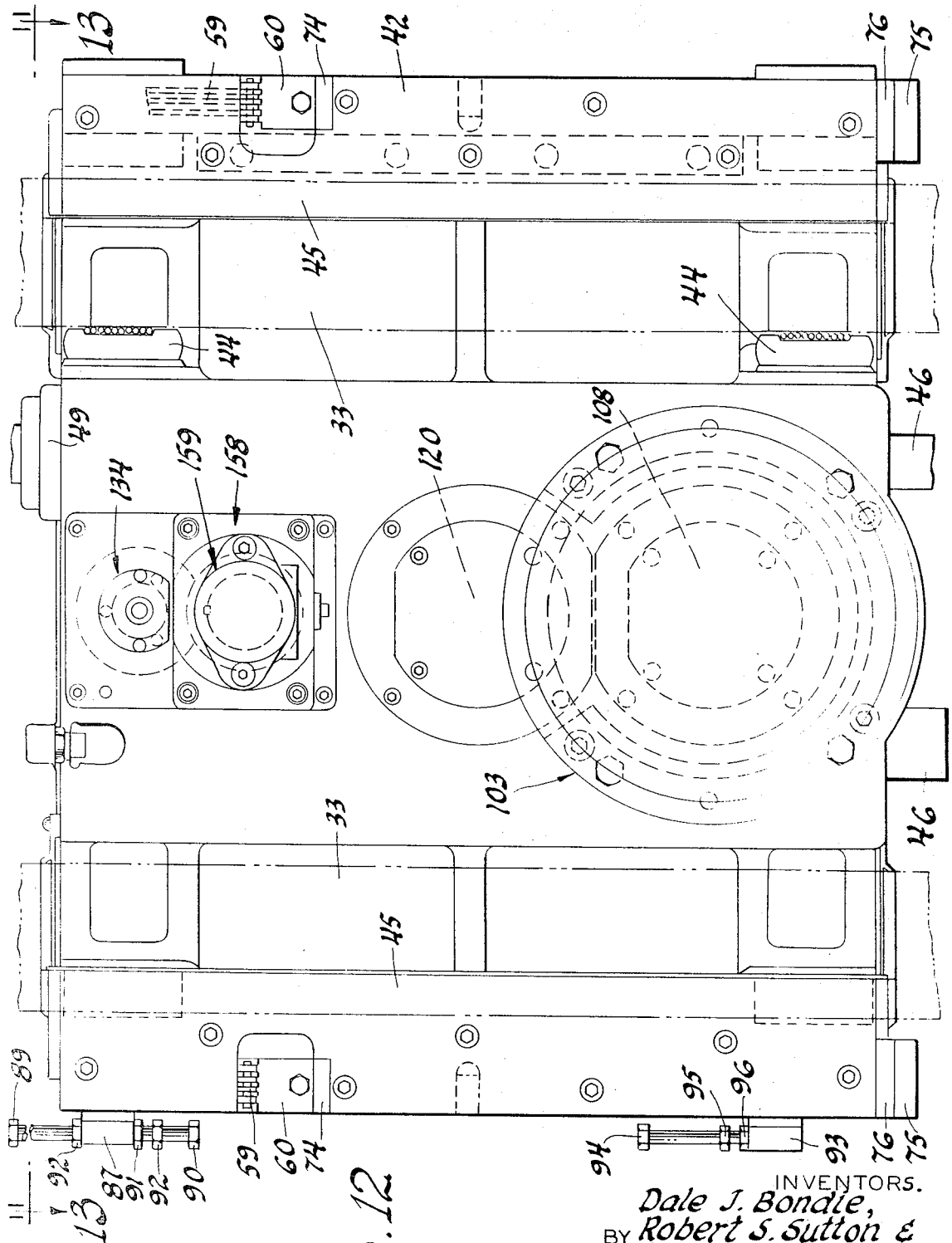

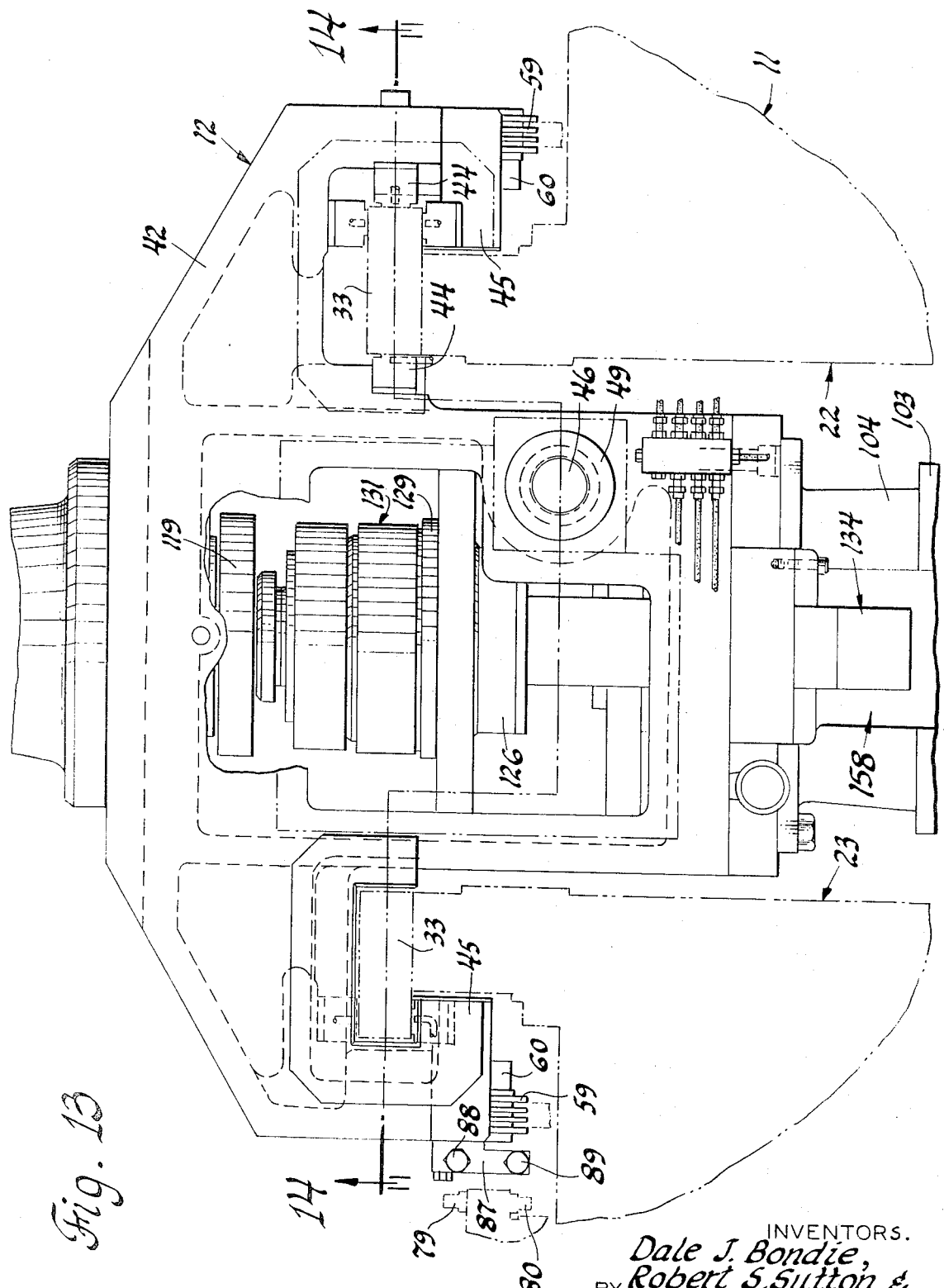

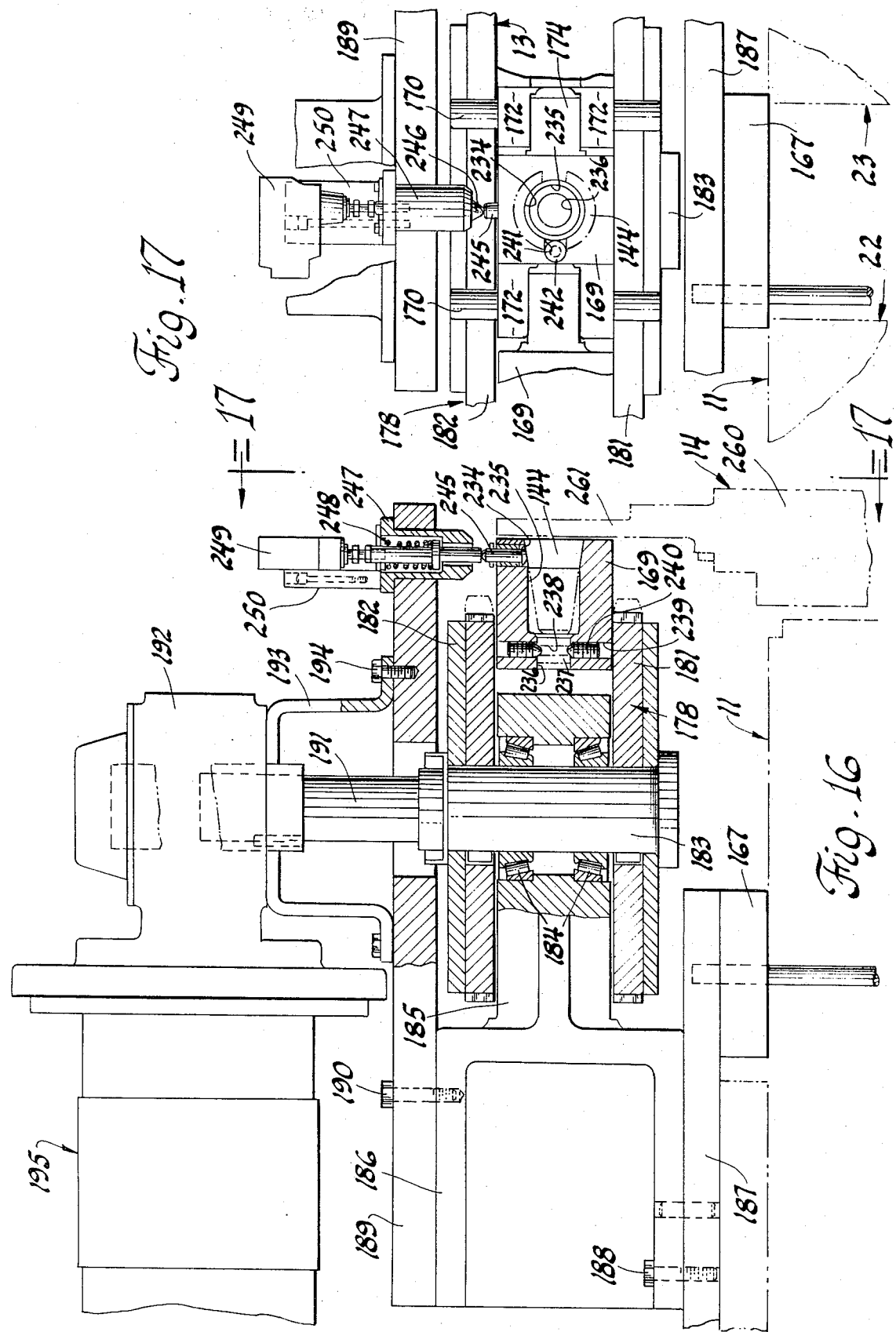

INVENTORS.
Dale J. Bondie,
BY Robert S. Sutton &
James D. Lewelling
James H. Bower
ATTORNEY

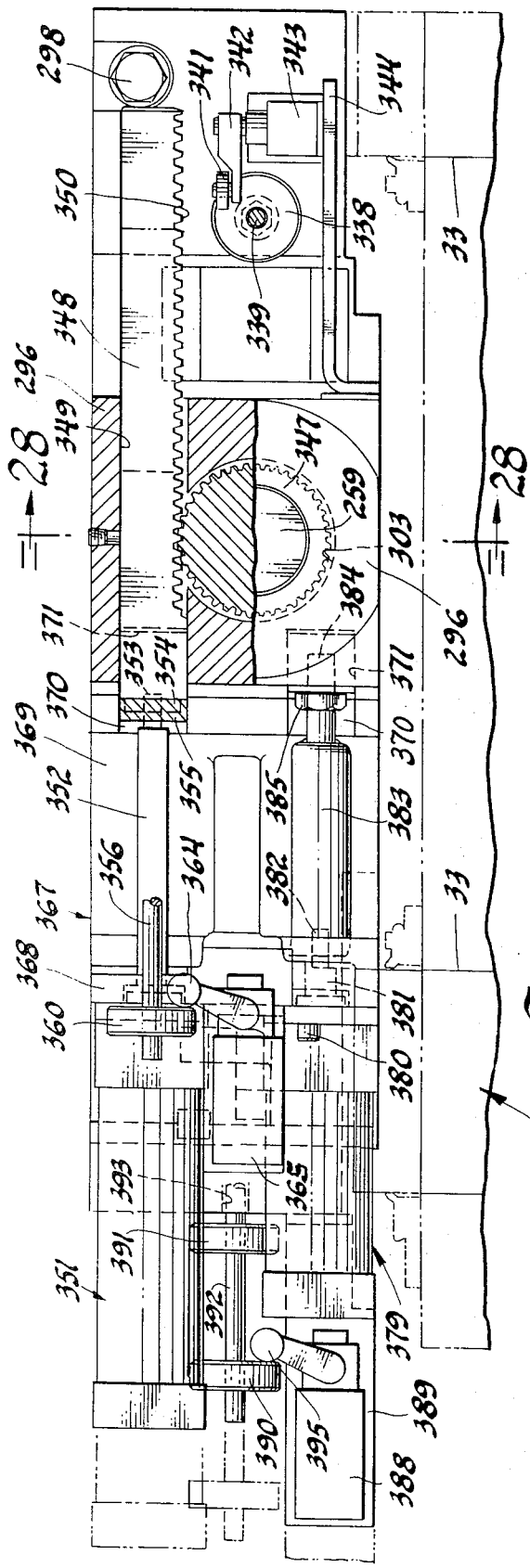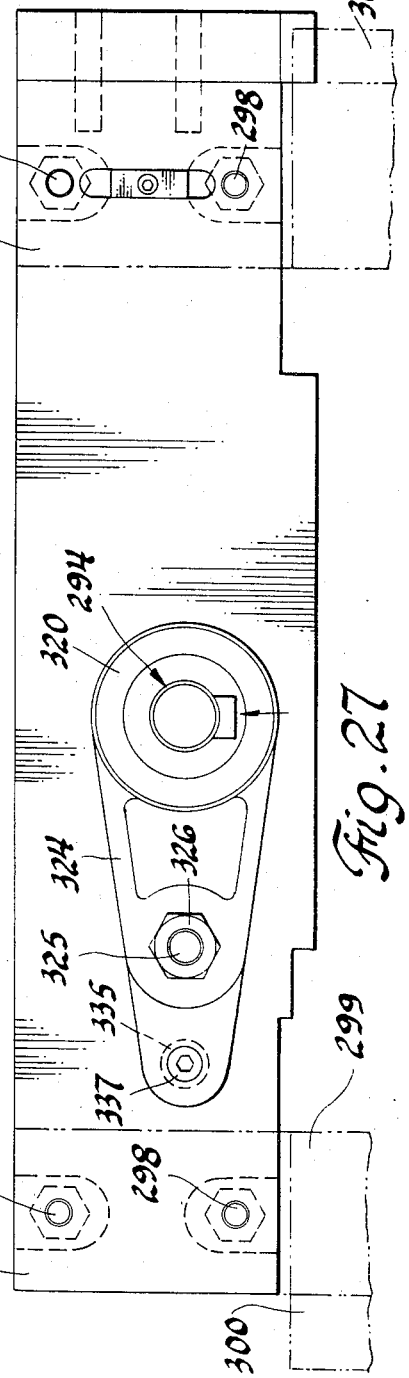

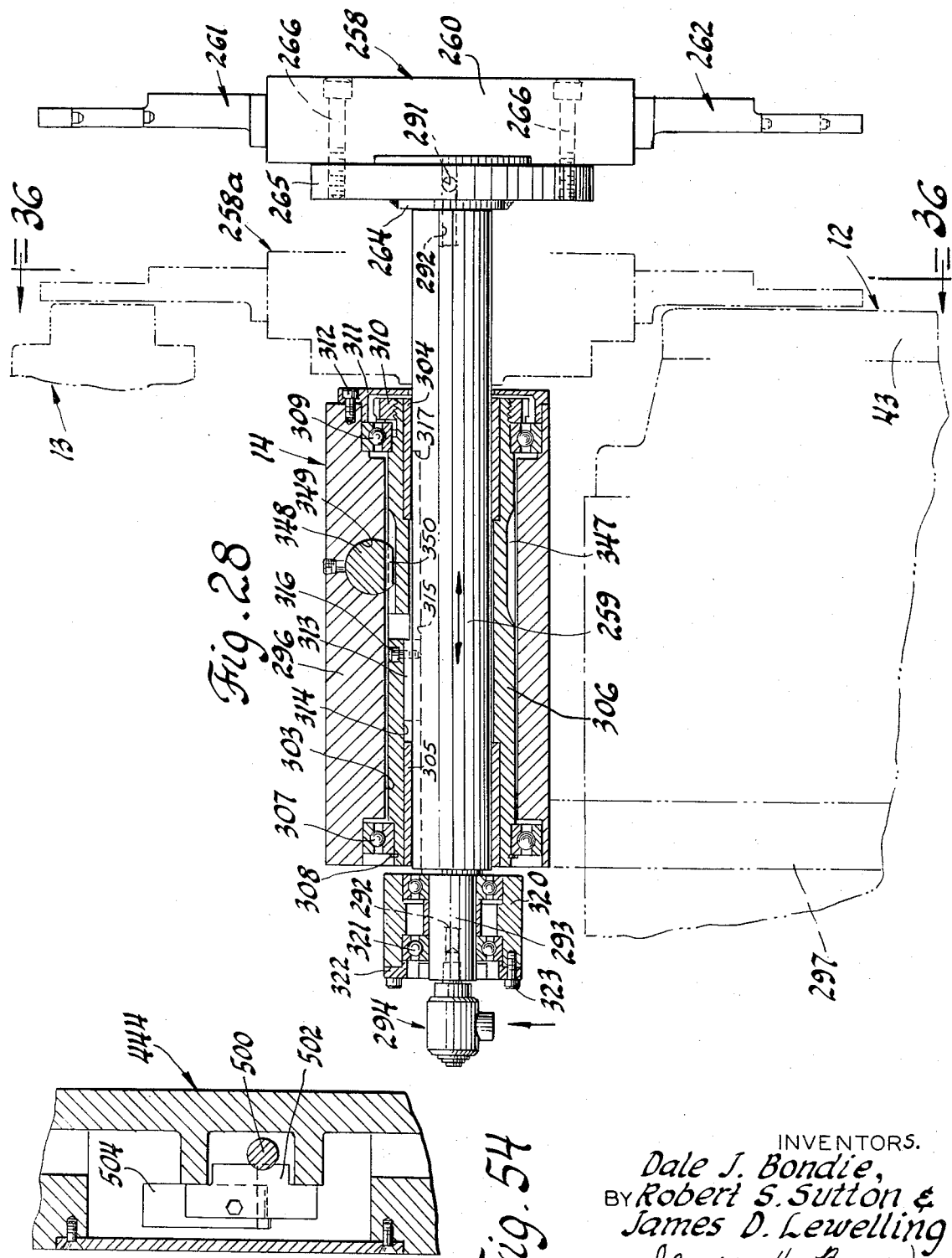

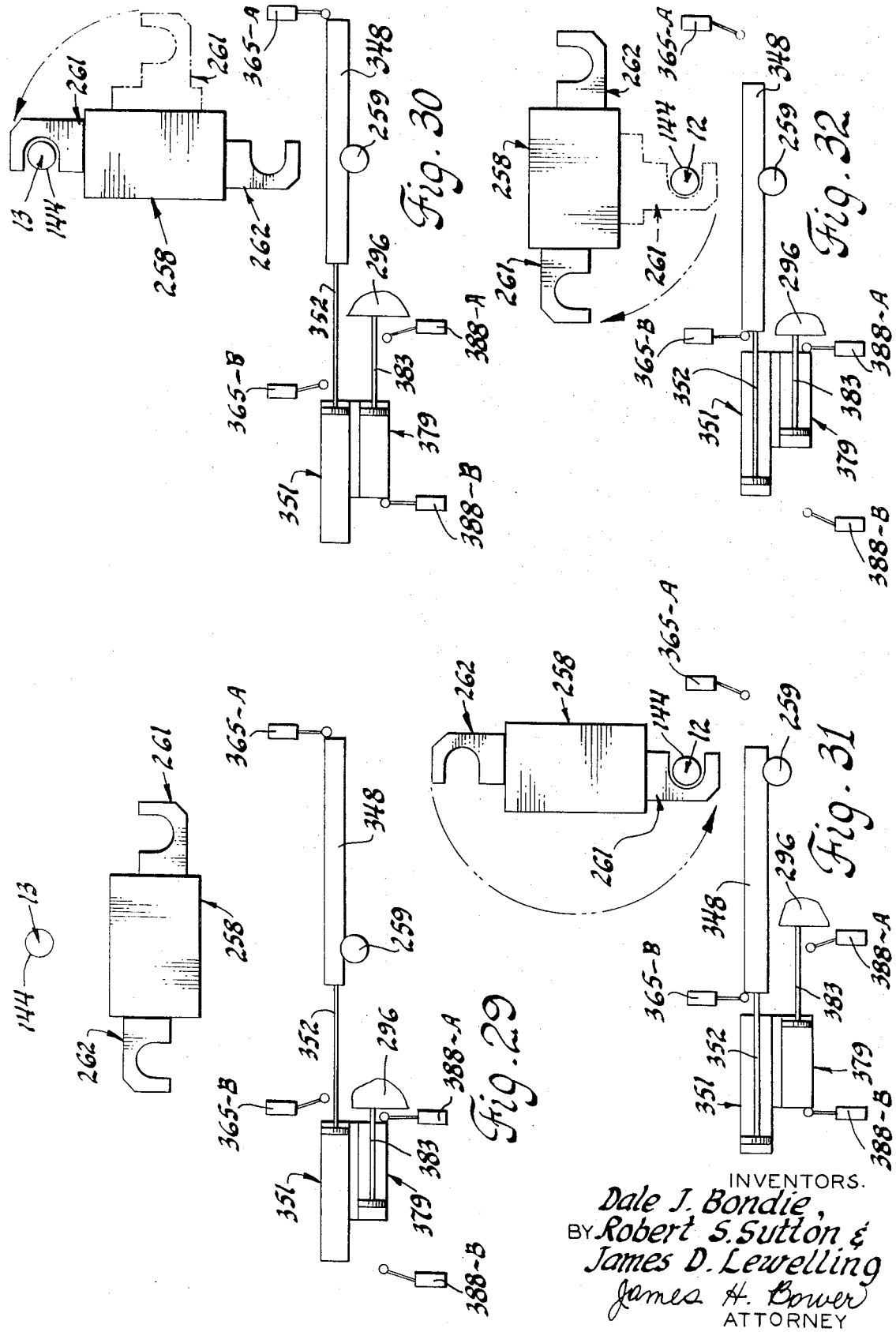

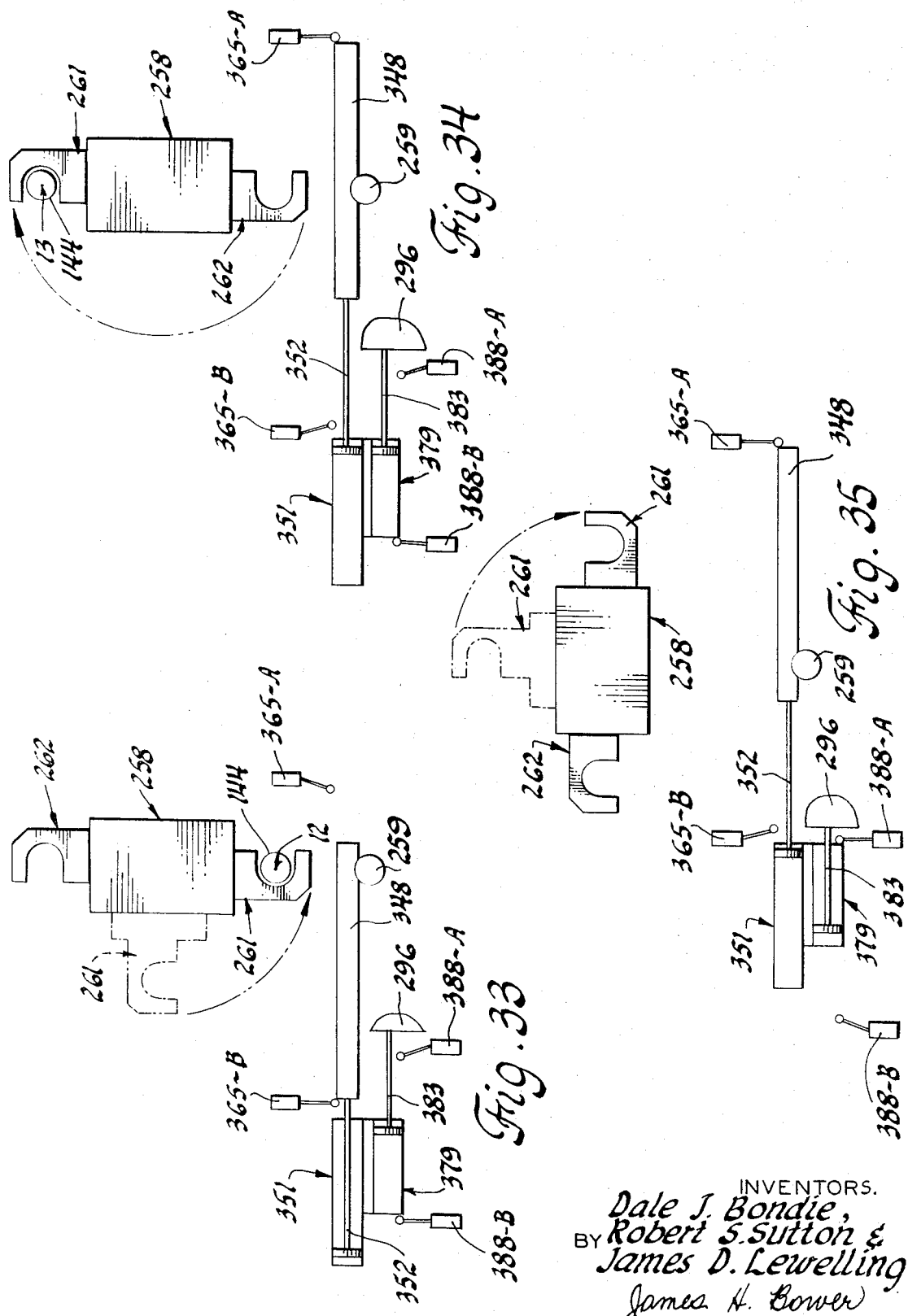

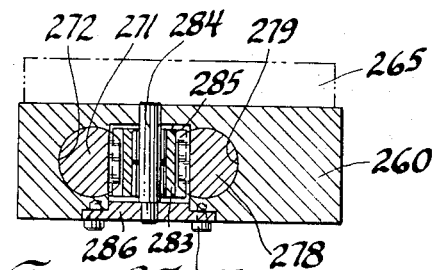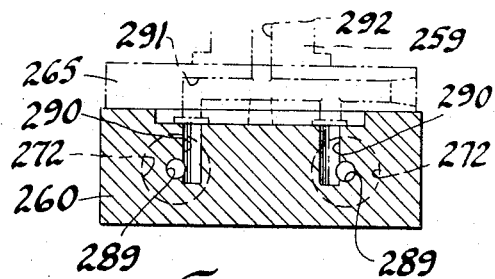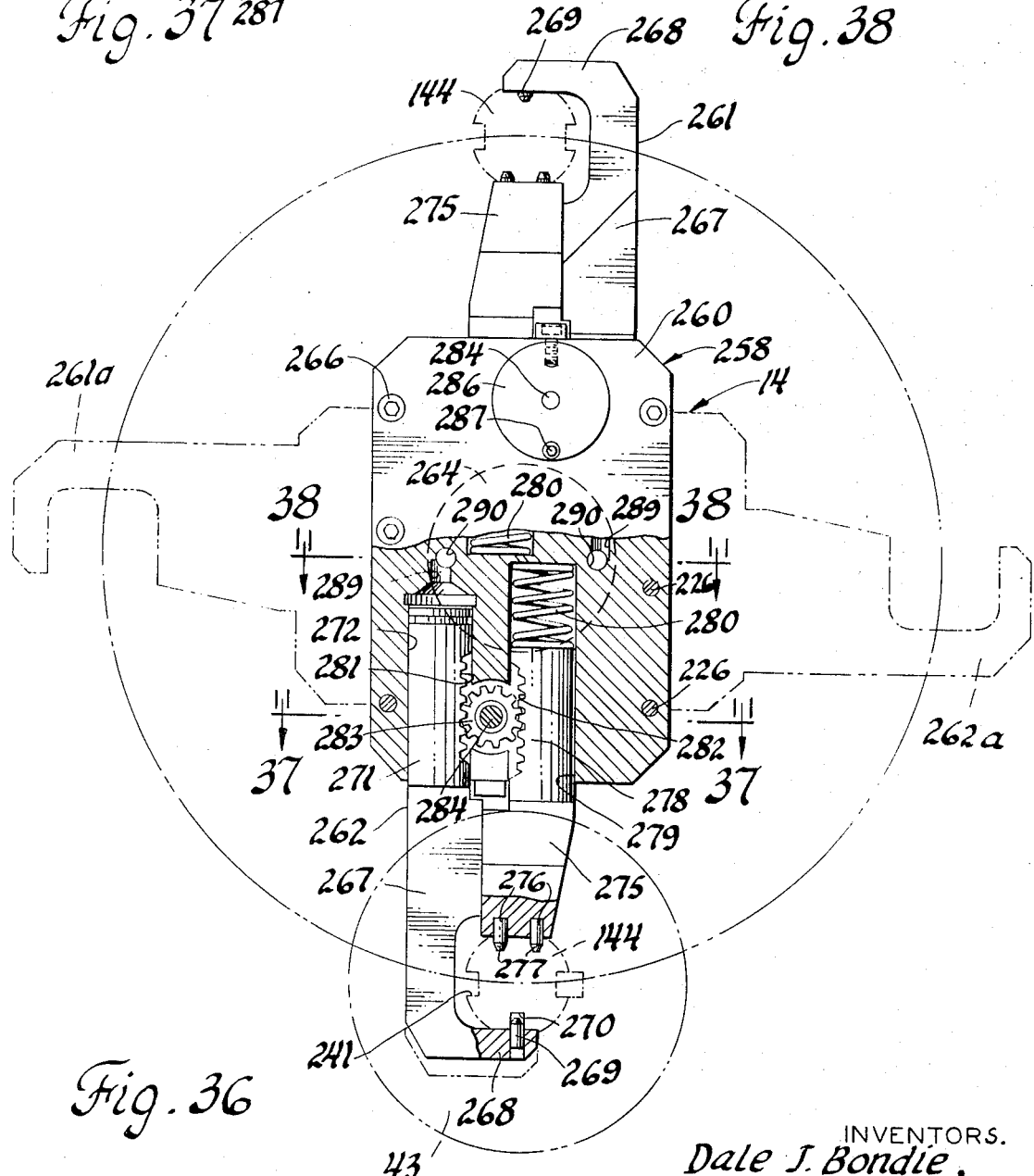

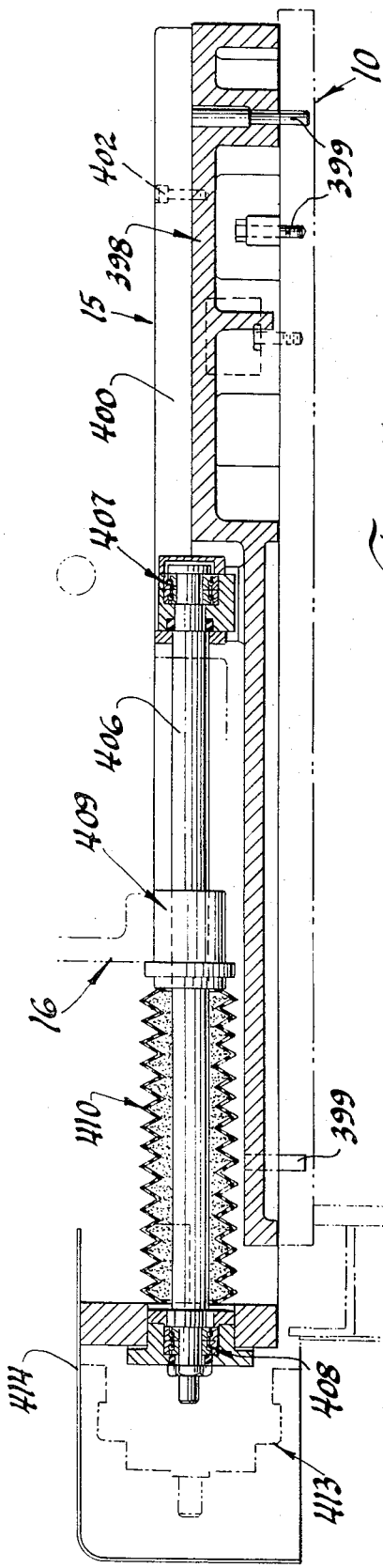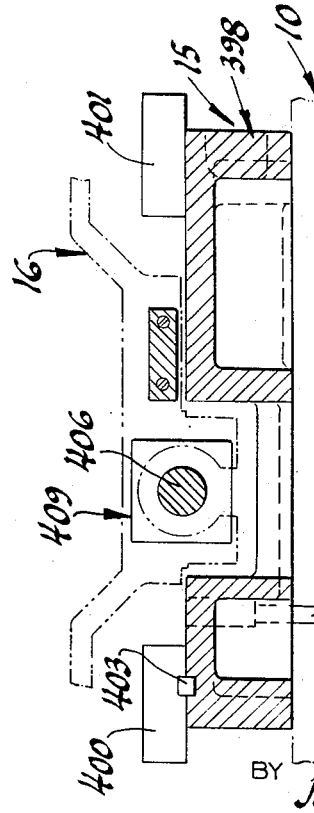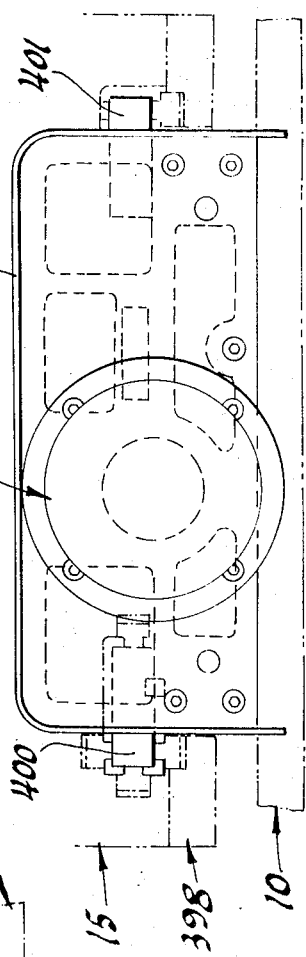

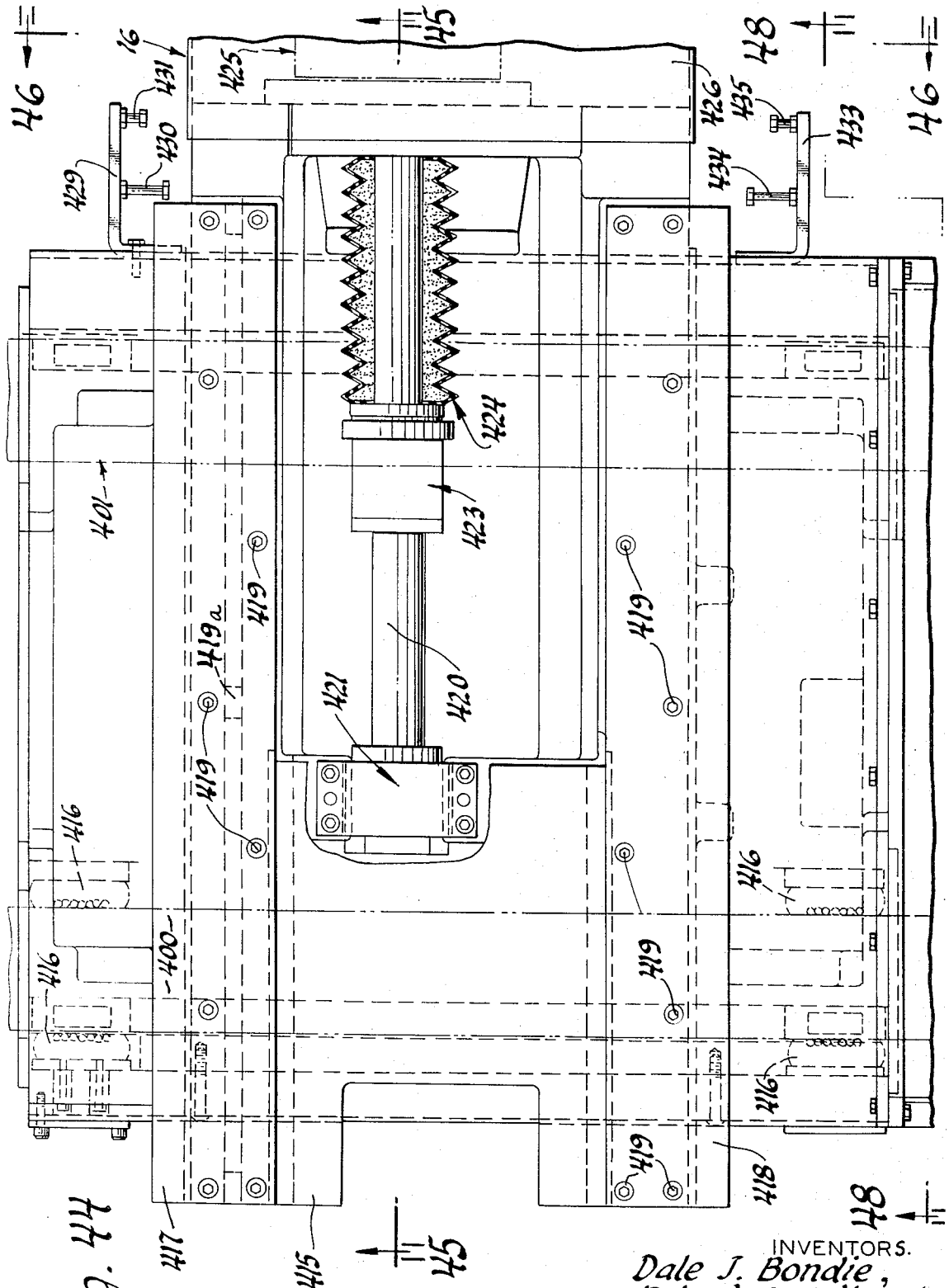

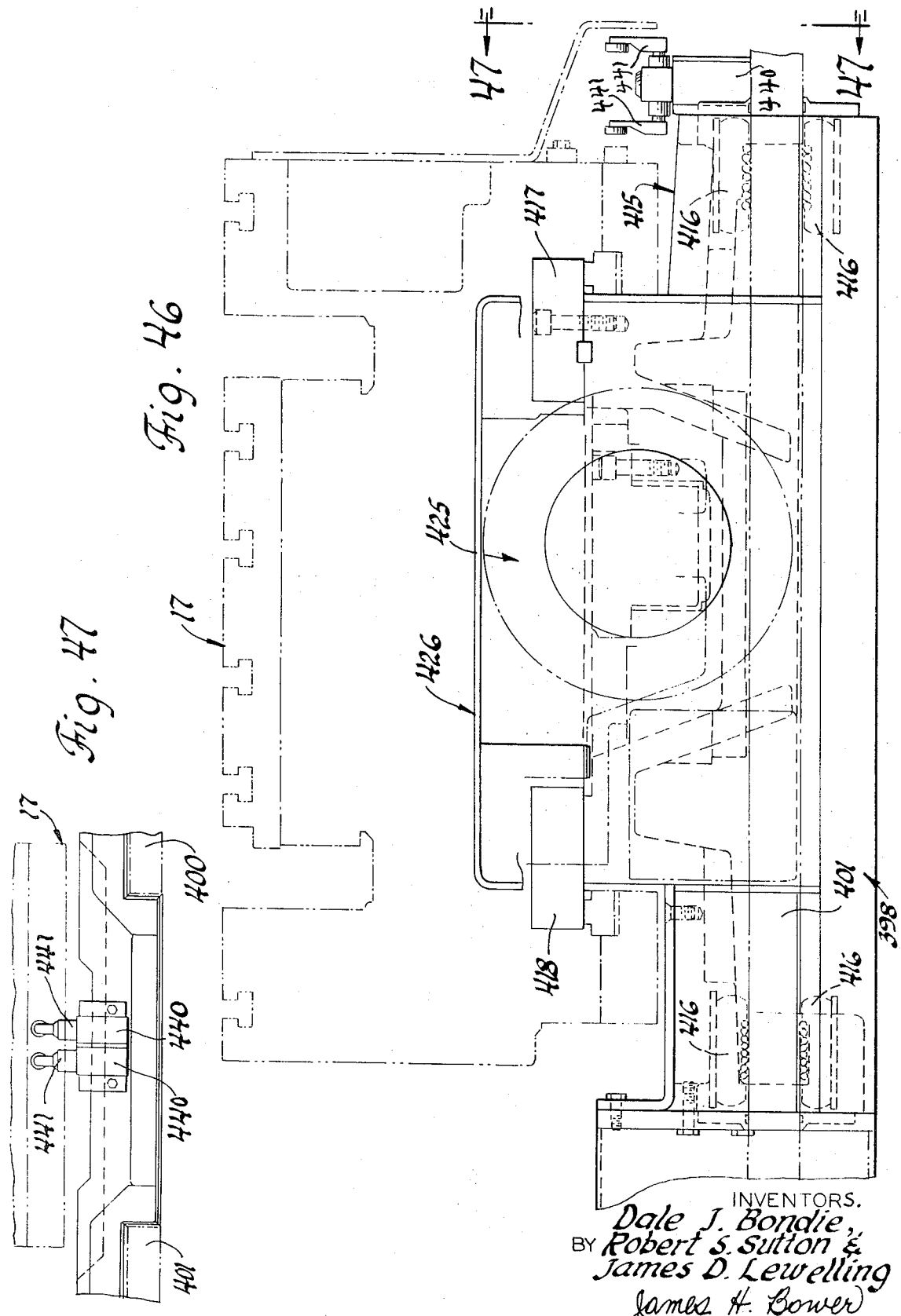

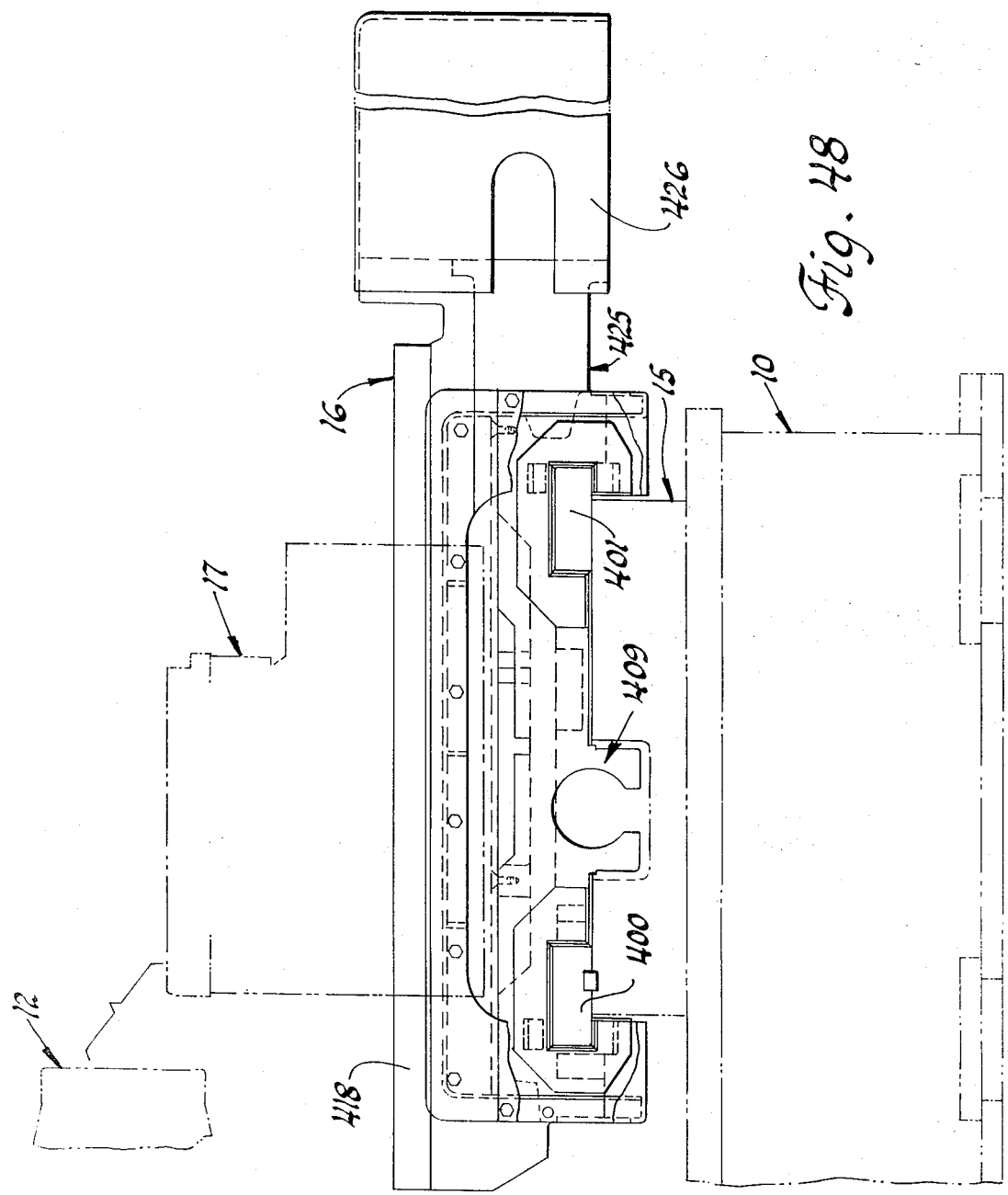

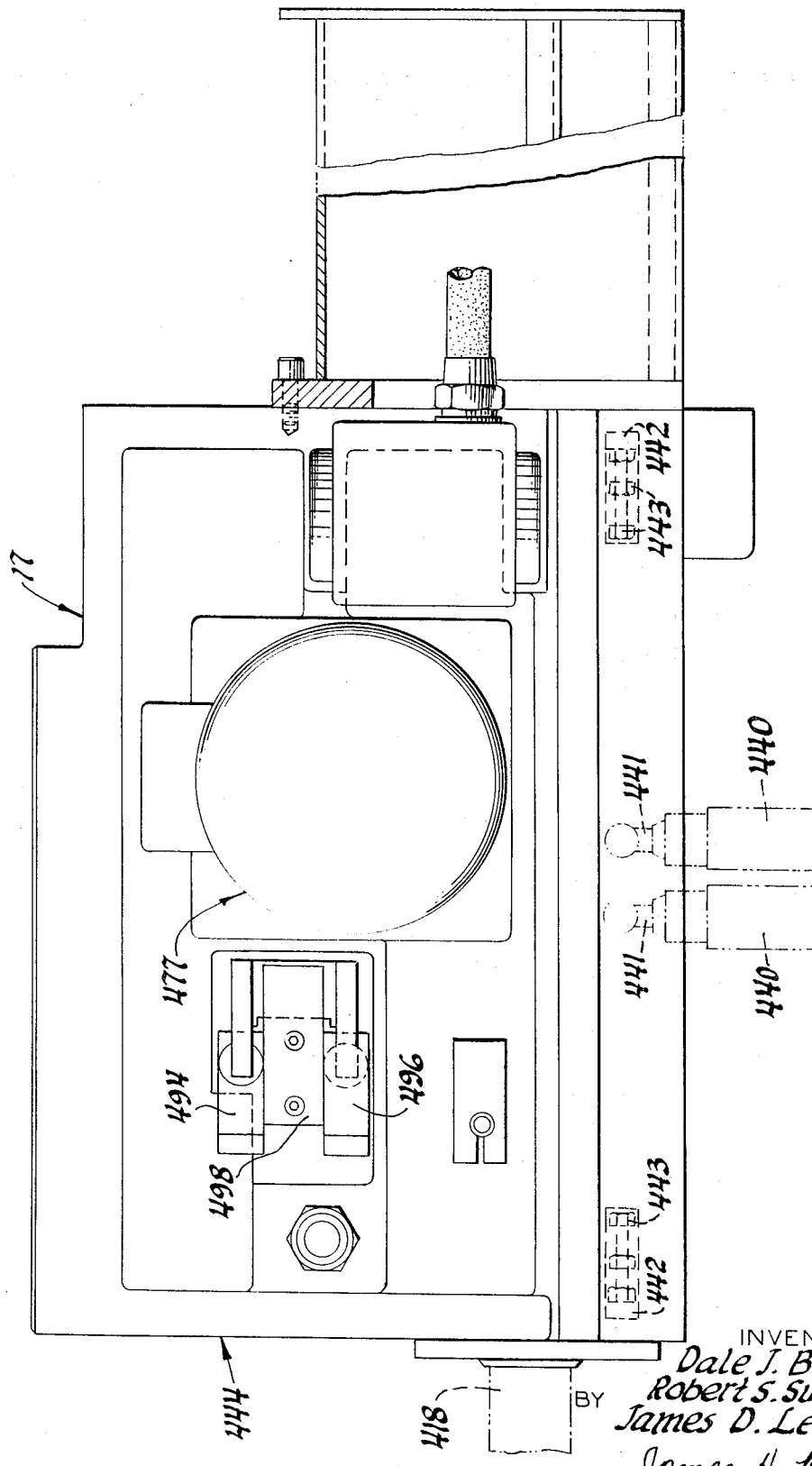

MACHINE TOOL WITH AUTOMATIC TOOL CHANGING MEANS

SUMMARY OF THE INVENTION

This invention relates generally to the machine tool art, and more particularly, to a horizontal spindle machine tool capable of performing various machining operations such as drilling, boring, tapping and the like, and which is provided with an automatic tool changer means for transferring tools in a predetermined sequence directly between a tool storage means and a tool spindle to provide the tool spindle with a predetermined sequence of tools for carrying out a desired sequence of machining operations.

The prior art machine tools which are constructed to carry out automatically a sequence of machining operations have many inherent disadvantages. For example, some of the prior art machines of this type are each provided with a tool storage means which is mounted separately from the machine, or on the machine in such a position whereby the tool changer means must transfer the tools to intermediate hold positions when transferring a tool from a storage means to a tool spindle which action increases the tool transfer time. Another disadvantage of the prior art machines of this type is that the tool storage means is disposed in a position whereby the operator of the machine does not have full visibility of the tools when they are in the storage means, and the storage means is not accessible to the operator for manual changing of the tools between tool change cycles while the machine is running. A further disadvantage of the prior art machines is that they are complex, and constructed and arranged whereby heat from the lube oil and heat generated by the running of the machine is retained in the machine structure, which adversely affects the accuracy of the machining operations carried out by the machine.

Accordingly, in view of the foregoing, it is an important object of the present invention to provide an improved machine tool which is capable of automatically carrying out a variety of machining operations and which overcomes the former disadvantages of the similar prior art machines.

The automatic machine tool described herein as an illustrative embodiment of the invention is a horizontal spindle, three-axis milling machine which is provided with a four-position index table. The machine tool of the present invention is capable of performing a variety of machining operations such as milling, drilling, boring, tapping and the like. The machine tool illustrated herein includes an automatic tool changer means which is adapted to transfer tools directly between a tool spindle and a horizontally disposed tool storage conveyor which is capable of storing a plurality of tools. The tool changer means is disposed between the tool storage conveyor and the tool spindle so as to permit a direct transfer between the tool storage conveyor and the tool spindle. The work table is carried on an index table which is rotatably mounted on a slide assembly which is movable on the Z axis toward and away from the tool spindle. The table slide assembly is carried on a saddle slide assembly which is adapted to move left or right along the X axis, as viewed from the front of the machine.

The machine tool of the present invention further includes a pair of laterally spaced apart rigid column members which are preferably made as a welded steel, tubular consturction mounted on a plate which is mounted on a suitable machine base with the column members being disposed adjacent the work table. A tool spindle assembly is movably supported on ways on the front faces of the column members for vertical movement along the Y axis. The tool spindle includes a drive motor, a resolver and a gear reduction means operatively attached to said tool spindle on a common axis and movable as a unit with the tool spindle along said Y axis between said column members. The tool spindle includes a power operated means for automatically clamping a tool in the spindle for a machining operation on the workpiece carried on the table, and said means for clamping the tool includes a draw bar interconnected by an electric clutch to a suitable hydraulic motor and a pressure operated switch which de-energizes said clutch when a predetermined clamping pressure has been reached in the hydraulic drive motor.

A horizontally disposed tool storage conveyor is secured to the top of the column members whereby the tools in the storage means are visible at all times to an operator. A tool changer means is operatively mounted between the column members and between the tool storage conveyor and the tool spindle assembly, and it is operative for transferring tools directly between the tool storage conveyor and the tool spindle without the need for any intermediate holding position. The machine is adapted to be controlled by a numerical control means or any suitable control means, whereby tools may be withdrawn and inserted in the tool spindle in a predetermined or programmed manner. The machine is provided with a rotary table which is adapted to be automatically indexed between four index positions.

It is another object of the present invention to provide a machine tool which is provided with a tool storage conveyor and a tool changer means capable of transferring tools from the tool storage conveyor to a tool spindle in a direct, positive, fast, simple and accurate manner.

It is anotehr object of the present invention to provide a novel and improved machine tool having a tool storage means and an automatic tool changer means which is simple and compact in construction and efficient in operation.

It is still another object of the present invention to provide a machine tool having a tool spindle assembly including a horizontal tool spindle, a spindle drive motor, a gear box, tachometer and a resolver in alignment with each other and movable upwardly and downwardly as a unit.

It is another object of the present invention to provide a machine tool having a horizontally disposed tool storage conveyor and in which the conveyor comprises a continuous chain formed from a plurality of tool pots and a plurality of interconnecting pins.

It is still another object of the present invention to provide a machine tool with a tool storage means in which tools are stored in a tool holder which is provided with a locating detent groove on the shank thereof.

Other objects, features and advantages of this invention will be apparent from the following detailed description, appended claims, and the accompanying drawings.

BRIEF DESCRIPTION OF THE DRAWINGS

FIG. 11 is an elevational section view of the tool spindle assembly structure illustrated in FIG. 10, taken along the line 11—11 thereof, and looking in the direction of the arrows.

FIG. 12 is a rear elevational view of the spindle assembly structure illustrated in FIG. 11, taken along the line 12—12 thereof, and looking in the direction of the arrows.

FIG. 13 is a top plan view of the spindle assembly structure illustrated in FIG. 12, taken along the line 13—13 thereof, and looking in the direction of the arrows.

FIG. 16 is a fragmentary, enlarged, elevational view, partly in section, of the tool storage conveyor structure illustrated in FIG. 15, taken along the line 16—16 thereof, and looking in the direction of the arrows.

FIG. 17 is a fragmentary, front elevational view of the tool storage conveyor structure illustrated in FIG. 16, taken along the line 17—17 thereof, and looking in the direction of the arrows.

FIG. 26 is a fragmentary, elevational view, partly in section, of the tool changer assembly structure illustrated in FIG. 24, taken along the line 26—26 thereof, and looking in the direction of the arrows.

FIG. 27 is a fragmentary, rear elevational view of the tool changer assembly structure illustrated in FIG. 24, taken along the line 27—27 thereof, and looking in the direction of the arrows.

FIG. 28 is a fragmentary, elevational section view of the tool changer assembly structure illustrated in FIG. 26, taken along the line 28—28 thereof, and looking in the direction of the arrows.

FIGS. 29 through 35 illustrate the sequence of operations which the tool changer arm carries out in picking up a tool from the tool storage conveyor and delivering it to the tool spindle, and which it carries out while also picking up a tool from the tool spindle and returning it to the tool storage conveyor.

FIG. 36 is a fragmentary, enlarged elevational view, partly in section, of the tool changer arm structure illustrated in FIG. 28, taken along the line 36—36 thereof, and looking in the direction of the arrows.

FIG. 37 is a fragmentary, horizontal section view of the tool changer arm structure illustrated in FIG. 36, taken along the line 37—37 thereof, and looking in the direction of the arrows.

FIG. 38 is a fragmentary, horizontal section view of the tool changer arm structure illustrated in FIG. 36, taken along the line 38—38 thereof, and looking in the direction of the arrows.

FIG. 40 is a fragmentary, elevational section view of the X-axis ways structure illustrated in FIG. 39, taken along the line 40—40 thereof, and looking in the direction of the arrows.

FIG. 41 is a fragmentary, left end elevational view of the X-axis ways structure illustrated in FIG. 39, taken along the line 41—41 thereof, and looking in the direction of the arrows.

FIG. 42 is a fragmentary, elevational section view of the X-axis ways structure illustrated in FIG. 39, taken along the line 42—42 thereof, and looking in the direction of the arrows.

FIG. 44 is a horizontal view of the saddle assembly structure illustrated in FIG. 3, taken along the line 44—44 thereof, and looking in the direction of the arrows.

FIG. 45 is a fragmentary, elevational section view of the saddle assembly structure illustrated in FIG. 44, taken along the line 45—45 thereof, and looking in the direction of the arrows.

FIG. 46 is a right side elevational view of the saddle assembly structure illustrated in FIG. 44, taken along the line 46—46 thereof, and looking in the direction of the arrows.

FIG. 47 is a fragmentary, elevational view of the saddle assembly structure illustrated in FIG. 46, taken along the line 47—47 thereof, and looking in the direction of the arrows.

FIG. 48 is a fragmentary, elevational view of the saddle assembly structure illustrated in FIG. 44, taken along the line 48—48 thereof, and looking in the direction of the arrows.

FIG. 49 is a horizontal top plan view of the work table assembly illustrated in FIG. 2, taken along the line 49—49 thereof, and looking in the direction of the arrows.

FIG. 54 is a fragmentary, horizontal section view of the work table structure illustrated in FIG. 53, taken along the line 54—54 thereof, and looking in the direction of the arrows.

FIG. 55 is a side elevational view of the work table structure illustrated in FIG. 49, taken along the line 55—55 thereof, and looking in the direction of the arrows.

DESCRIPTION OF THE PREFERRED EMBODIMENT

General Description

Figure 1:
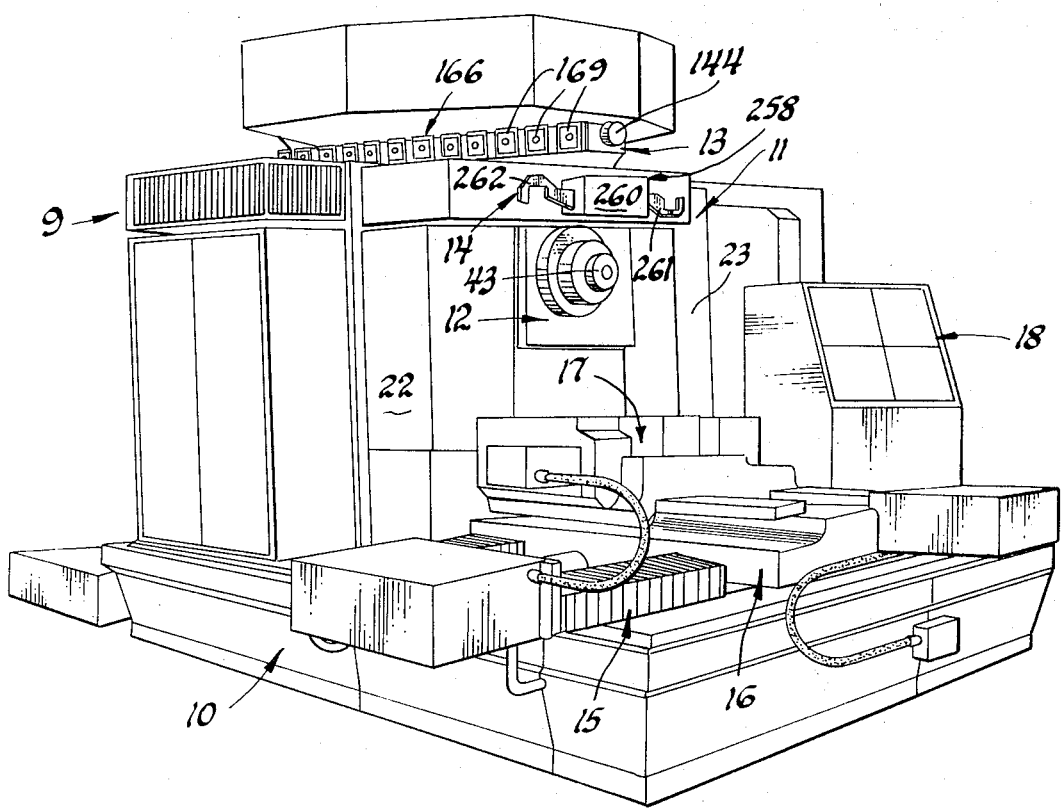
FIG. 1 is a perspective elevational view of an illustrative embodiment of a machine tool made in accordance with the principles of the present invention.
Figure 2:
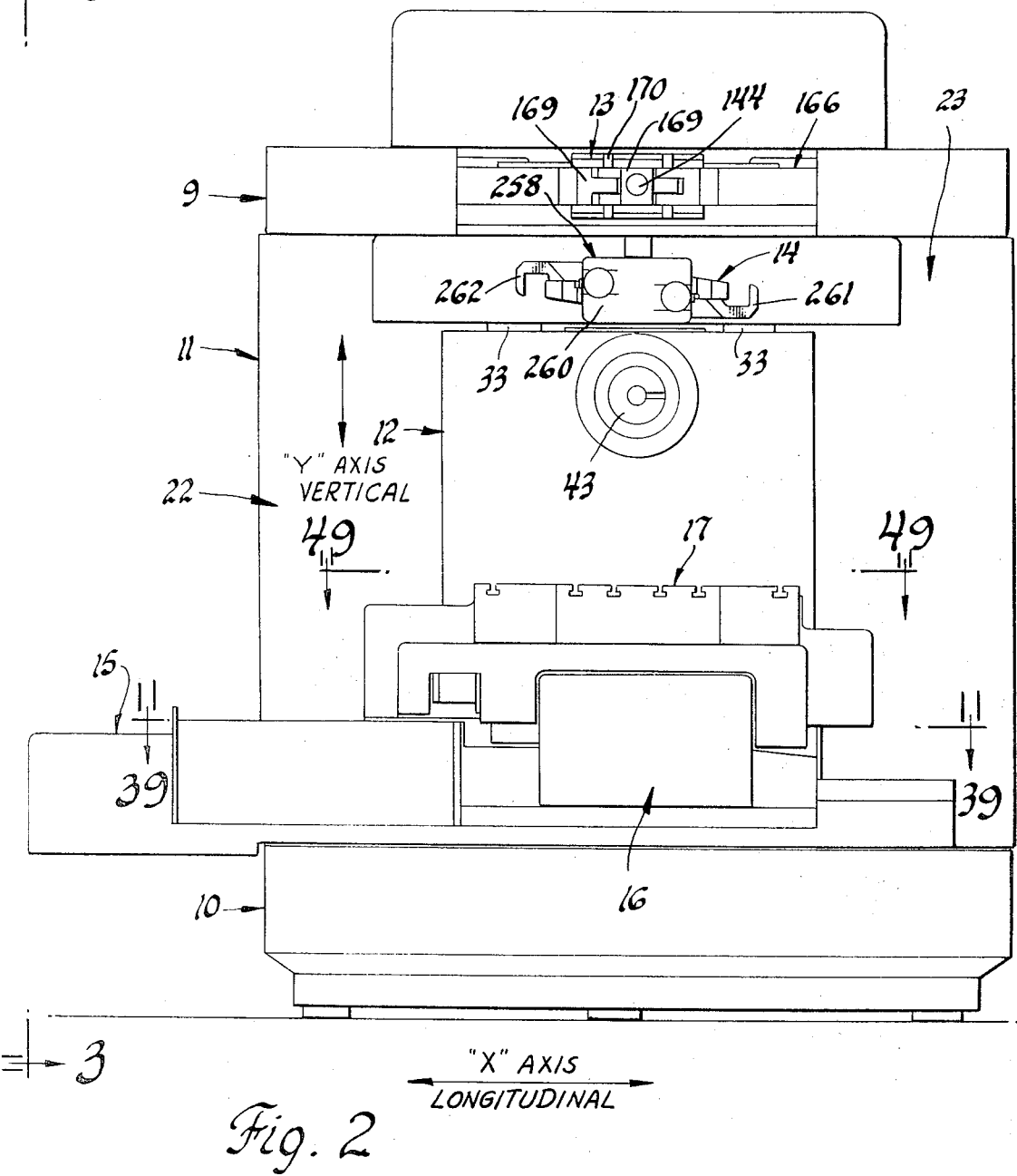
FIG. 2 is a front elevational view of the structure illustrated in FIG. 1.
Figure 3:
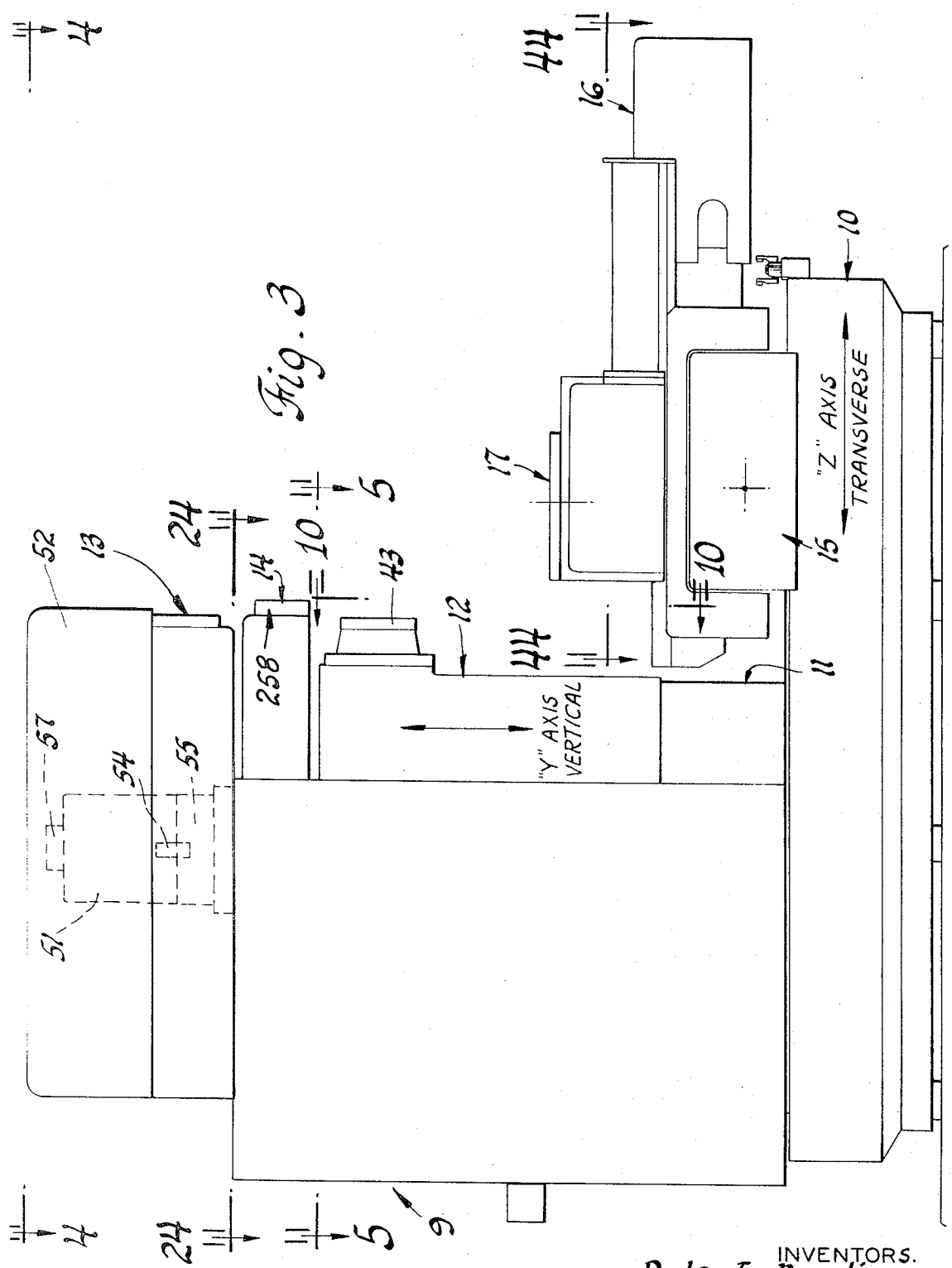
FIG. 3 is a left side elevational view of the structure illustrated in FIG. 2 taken along the line 3—3 thereof, and looking in the direction of the arrows.
Figure 4:
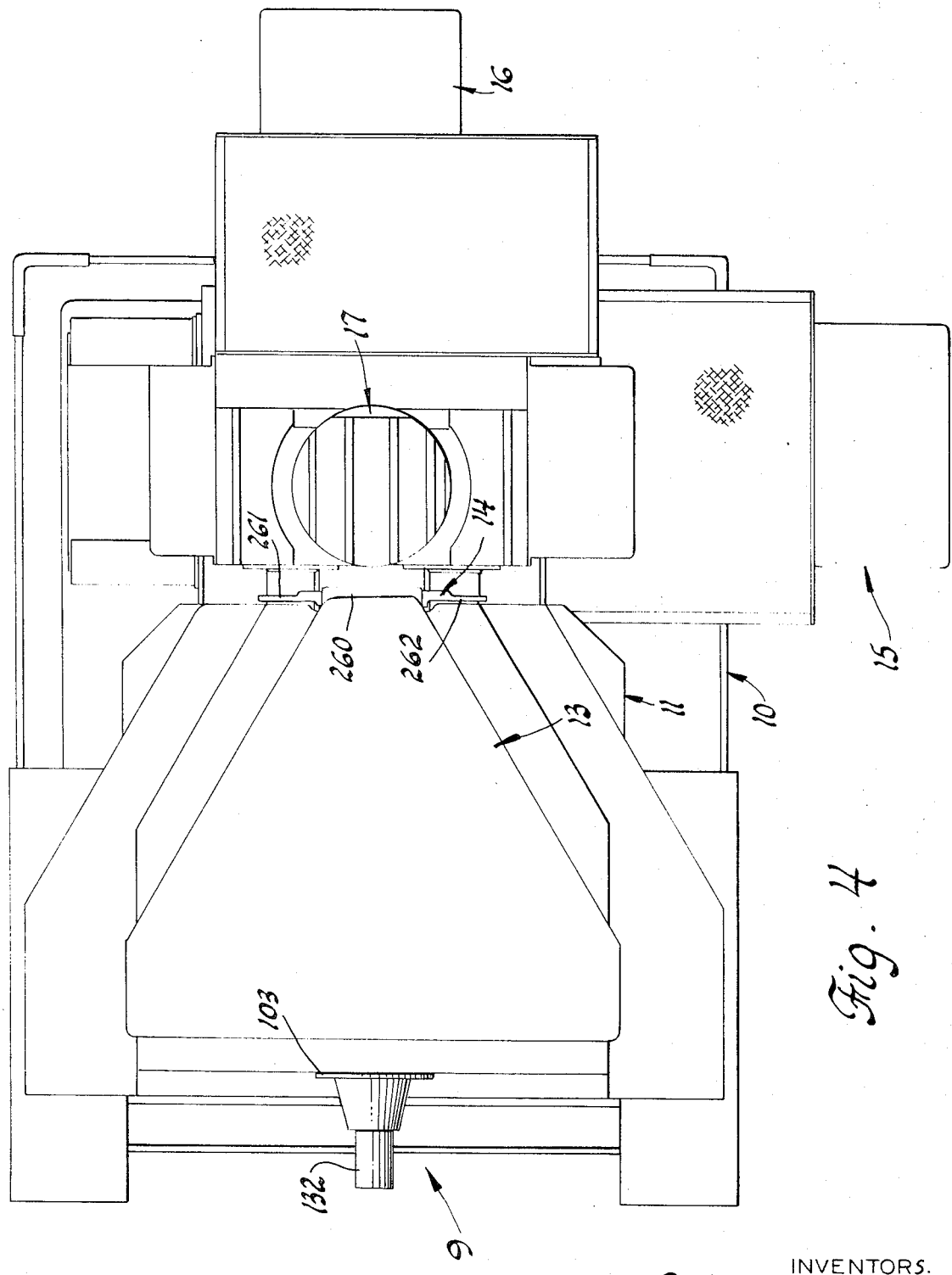
FIG. 4 is a top plan view of the structure illustrated in FIG. 3, taken along the line 4—4 thereof, and looking in the direction of the arrows.

Referring now to the drawings, and in particular to FIGS. 1, 2 and 3, the numeral 9 generally designates an illustrative embodiment of the invention comprising a horizontal spindle, three axis milling machine which is provided with a plural position index table, and which is capable of performing various machining operations on a workpiece such as drilling, boring, tapping and associated operations. The machine tool 9 includes a base, generally indicated by the numeral 10, on which is operatively mounted a column assembly generally indicated by the nuemral 11. The numeral 12 generally designates a tool spindle assembly which is slidably mounted for vertical movement along a Y-axis on the front of the column assembly 11. The numeral 13 generally designates a horizontally disposed tool storage means which is operatively mounted on the top of the column assembly 11.

A tool changer assembly, generally indicated by the numeral 14, is operatively supported on the column assembly between the tool storage means 13 and the tool spindle assembly 12. A tool changer assembly 14 is adapted to transfer a tool between the tool storage means 13 and the tool spindle assembly 12. As best seen in FIGS. 1, 2 and 3, the machine tool 9 is provided with an X-axis assembly 15 which is operatively mounted on the front end of the base 10 in a position perpendicular to the Y-axis. Operatively mounted on the X-axis assembly is a saddle assembly 16 which is operatively mounted on the X-axis assembly for movement on said axis. A work table assembly 17 is operatively supported on the saddle assembly 16 for movement along the Z-axis. The work table assembly 17 includes a rotary table adapted to be rotated on a vertical axis between four different positions. An operator's control panel 18 is positioned on the right side, or oeprator's side, of the machine 9.

Column Assembly

Figure 5:
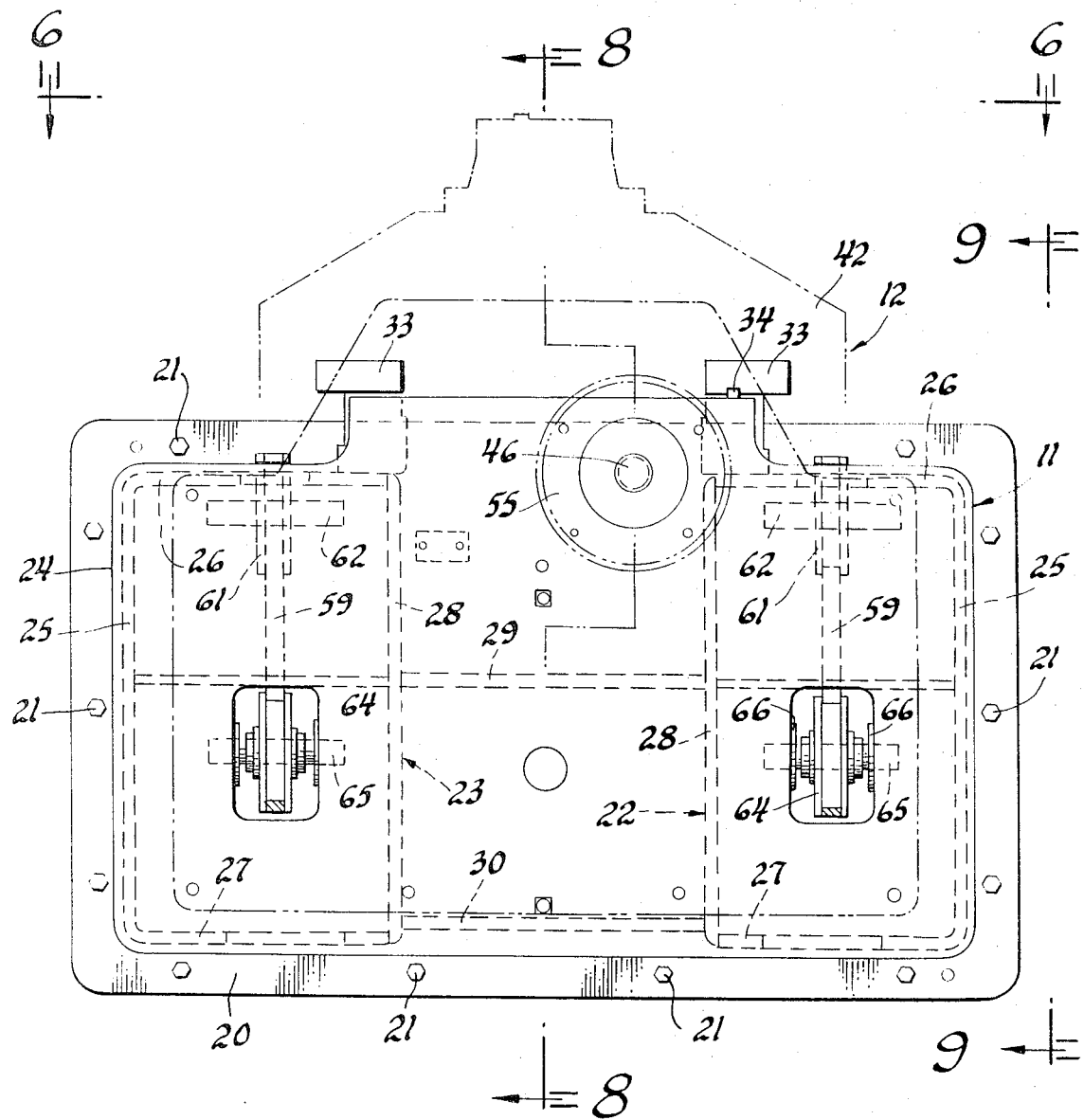
FIG. 5 is a horizontal top plan view of the column assembly structure illustrated in FIG. 3, taken along the line 5—5 thereof, and looking in the direction of the arrows.
Figure 7:
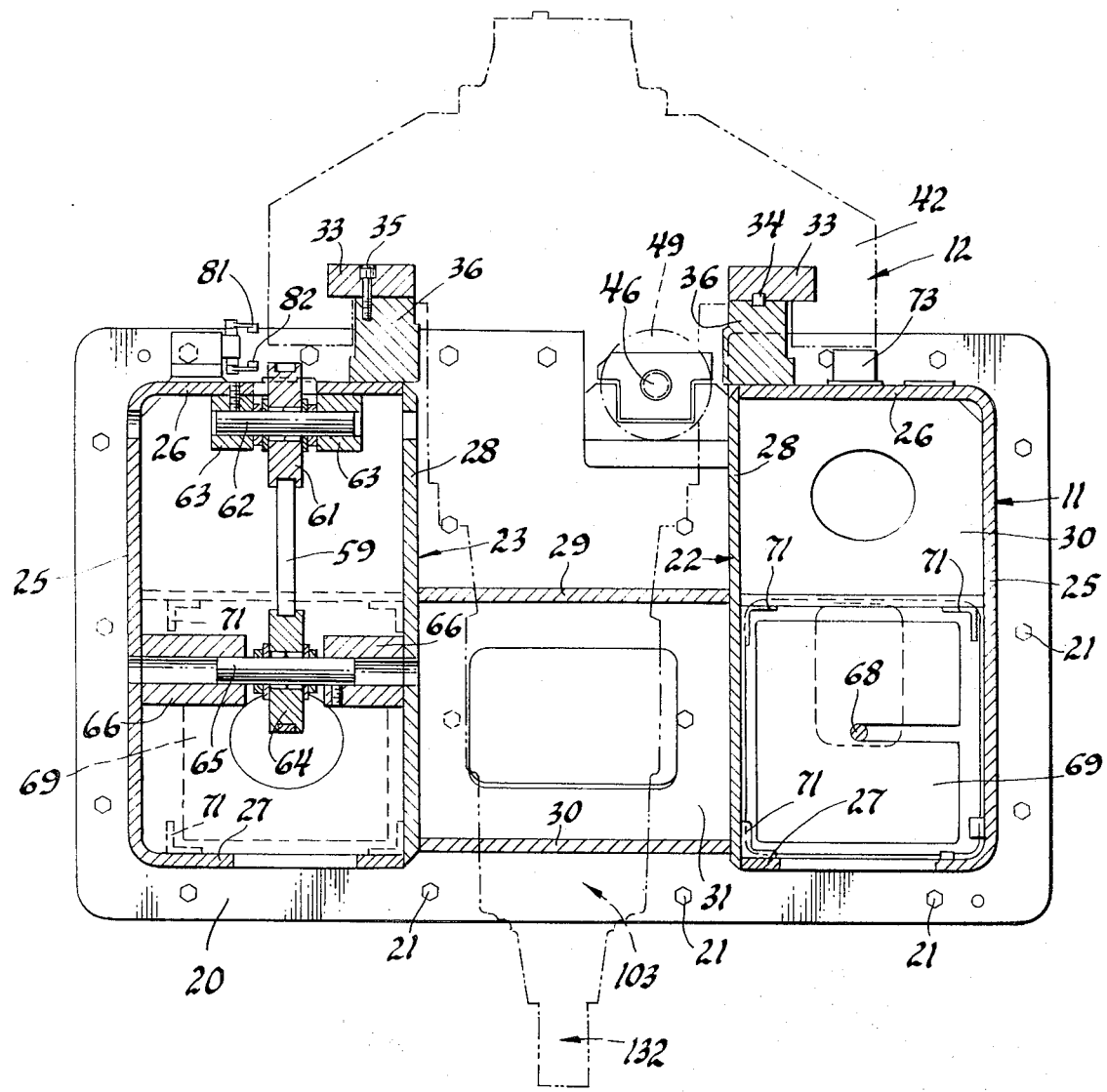
FIG. 7 is a horizontal section view of the column assembly structure illustrated in FIG. 6, taken along the line 7—7 thereof, and looking in the direction of the arrows.
Figure 9:
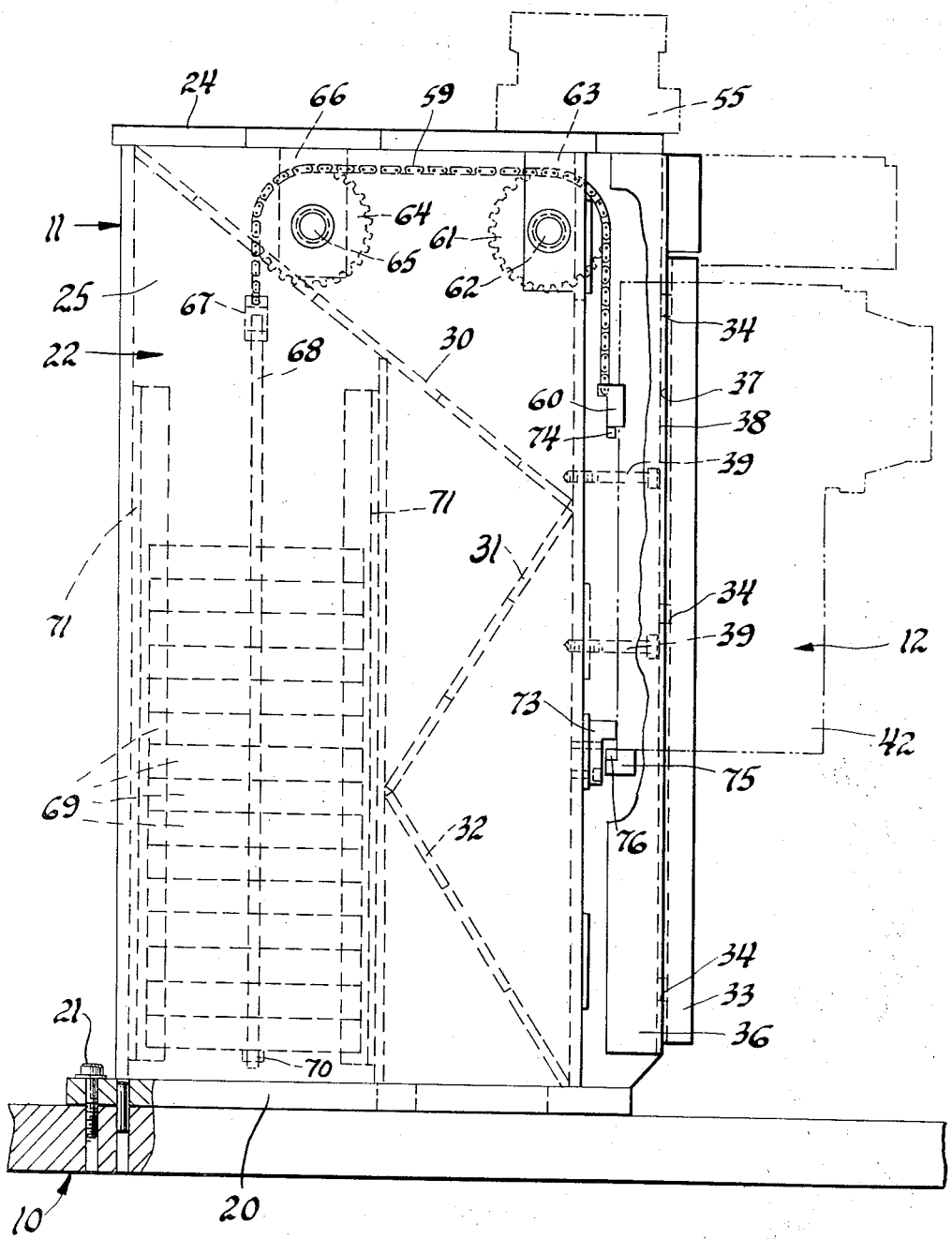
FIG. 9 is a side elevational view of the park"assembly structure illustrated in FIG. 5, with parts broken away, taken along the line 9—9 thereof, and looking in the direction of the arrows. position

As shown in FIGS. 5 and 9, the column assembly 11 includes a base plate 20 which is secured to the machine base 10 by any suitable means, as by a plurality of machine screws 21. As shown in FIGS. 5 and 7, the column assembly 11 includes a pair of laterally spaced apart, left and right column members 22 and 23, respectively, which are preferably made of steel and welded to the base plate 20. A top cover plate 24 is fixedly secured to the top end of the columns 22 and 23 by any suitable means, as by welding.

As best seen in FIG. 7, each of the column members 22 and 23 comprises an outer vertical wall 25, an integral front wall 26, and an integral rear wall 27. Each of the columns 22 and 23 is provided with an inner side wall 28 which is attached to the front and rear walls 26 and 27, respectively, by any suitable means, as by welding. The upper ends of the columns 22 and 23 are braced by a housing having vertical walls 29 and 30 and a lower end wall 31. The last mentioned housing is connected to the column inner walls 28 by any suitable means, as by welding.

Figure 6:
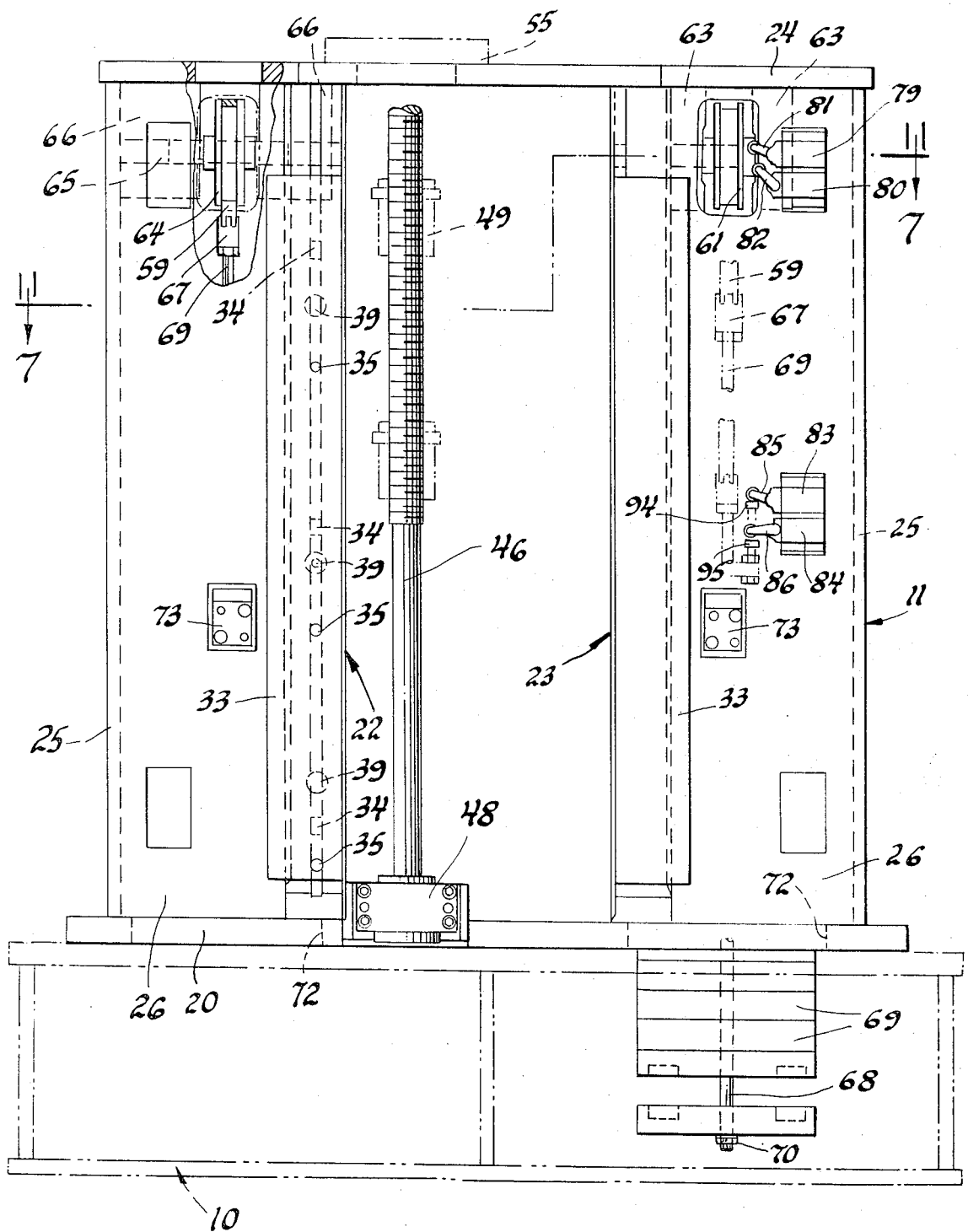
FIG. 6 is a front elevational view of the column assembly structure illustrated in FIG. 5, with parts broken away, taken along the line 6—6 thereof, and looking in the direction of the arrows.

As best seen in FIGS. 6 and 7, a pair of spaced apart Y-axis ways or rails 33 are operatively mounted, in spaced apart positions, on the front sides of the column front walls 26. The Y-axis ways 33 are each fixedly secured by a plurality of keys 34 and machine screws 35 to a base rail 36. As shown in FIG. 9, each of the Y-axis ways 33 is provided with a key groove 37 and the base rails 36 are each provided with a key groove 38. The base rails 36 are each secured to their respective column wall 26 by any suitable means, as by a plurality of machine screws 39.

Tool Spindle Slide Assembly

Figure 10:
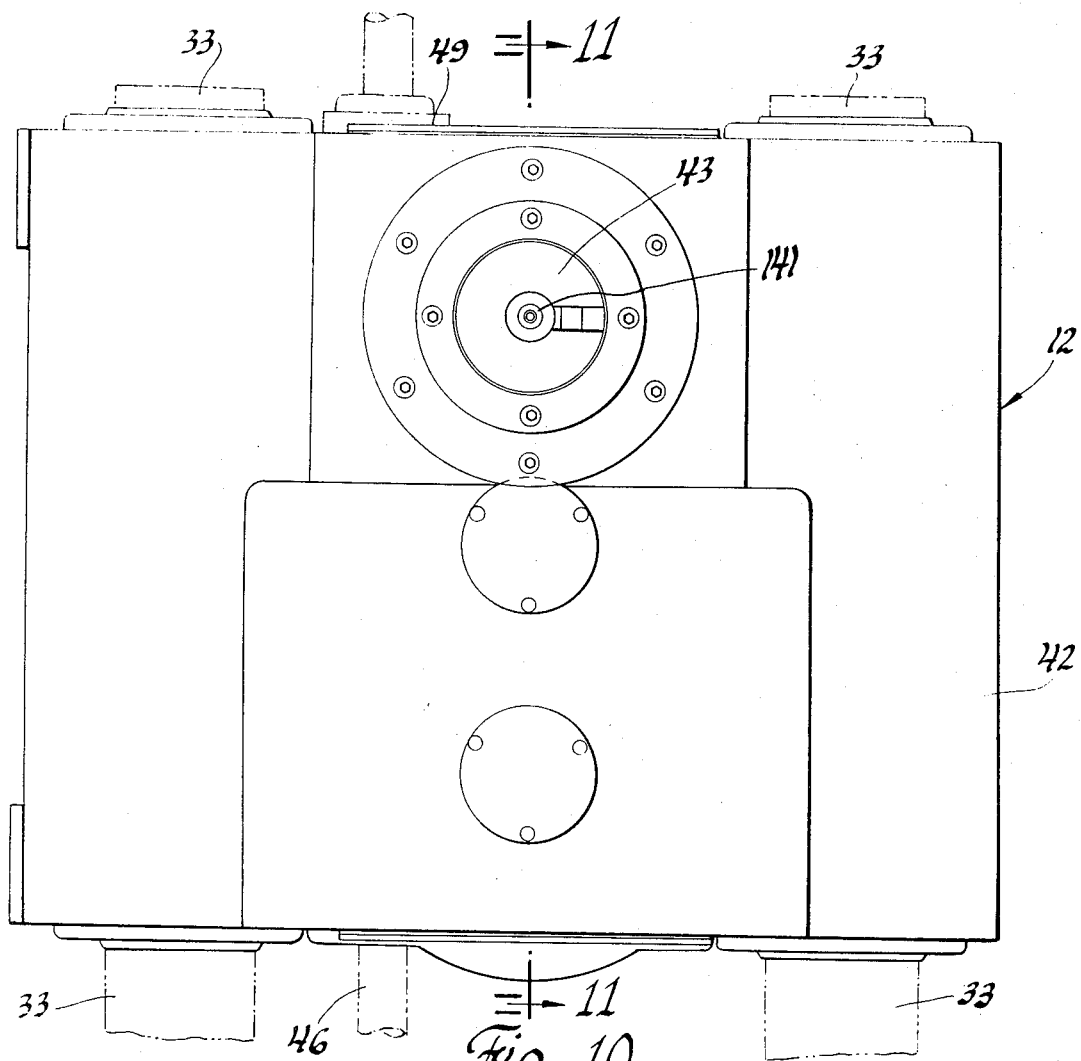
FIG. 10 is a fragmentary, front elevational view of the tool spindle assembly structure illustrated in FIG. 3, taken along the line 10—10 thereof, and looking in the direction of the arrows.
Figure 14:
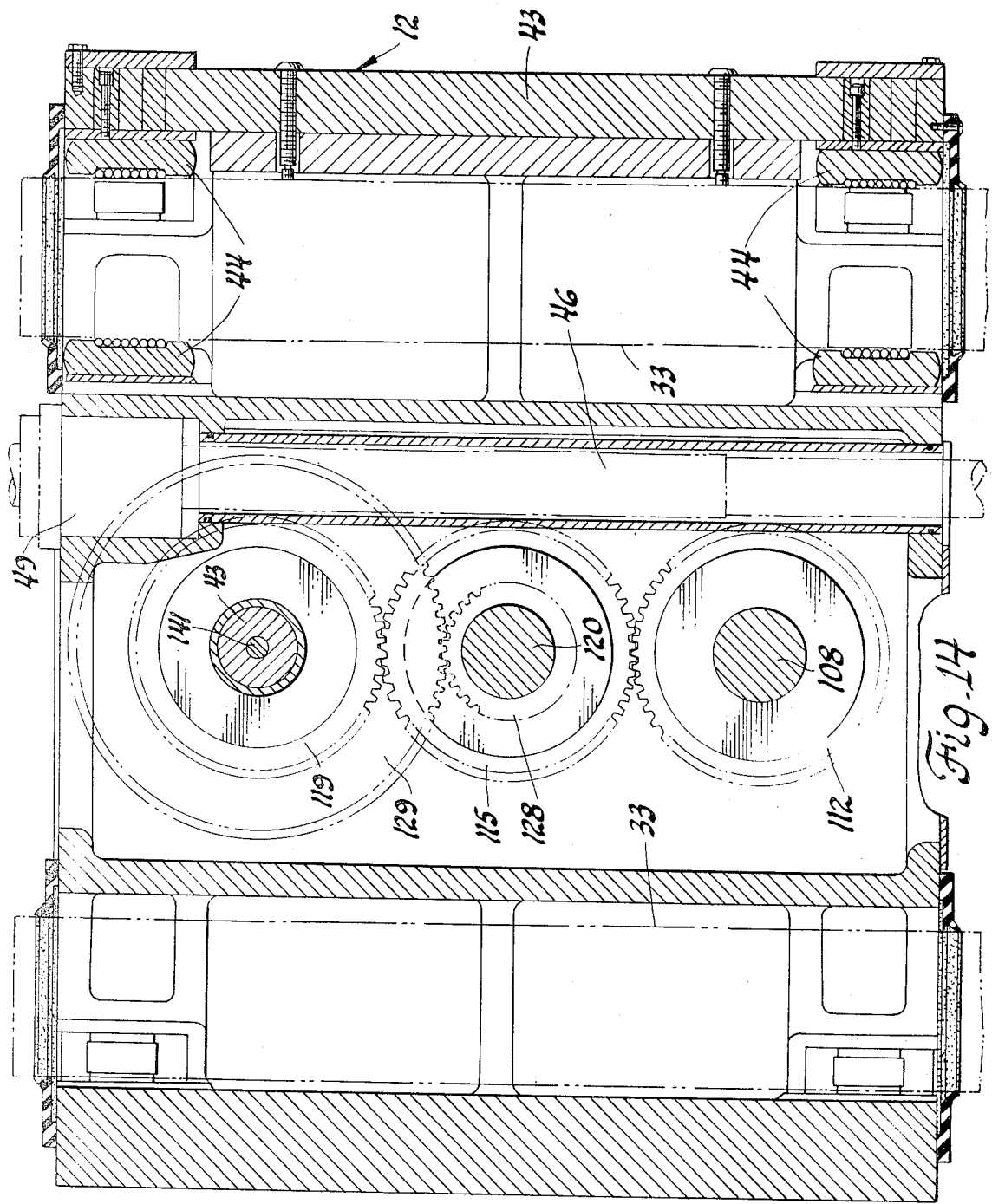
FIG. 14 is a fragmentary, elevational section view of the structure illustrated in FIG. 13, taken along the line 14—14 thereof, and looking in hte direction of the arrows.

As seen in FIGS. 10 and 11, the tool spindle assembly includes a spindle slide 42 which is slidably mounted on the vertical Y-axis ways 33 and which rotatably supports a tool spindle 43. As illustrated in FIGS. 13 and 14, the spindle slide 42 is slidably supported on the Y-axis ways 33 by any suitable means, as by a pair of sets of suitable way bearings 44 supported in a suitable C-shaped mounting structure 45.

The spindle slide 42 is adapted to be moved upwardly and downwardly along the Y-axis ways 33 by a vertical lead screw 46 (FIG. 8) which is rotatably mounted in suitable bearings 47 and 48 that are operatively supported by the column cover plate 24 and the column base plate 20, respectively. The vertical lead screw 46 is operatively mounted through a ball screw nut member 49 which is fixedly secured to the spindle slide 42 (FIG. 14) by any suitable means.

Figure 8:
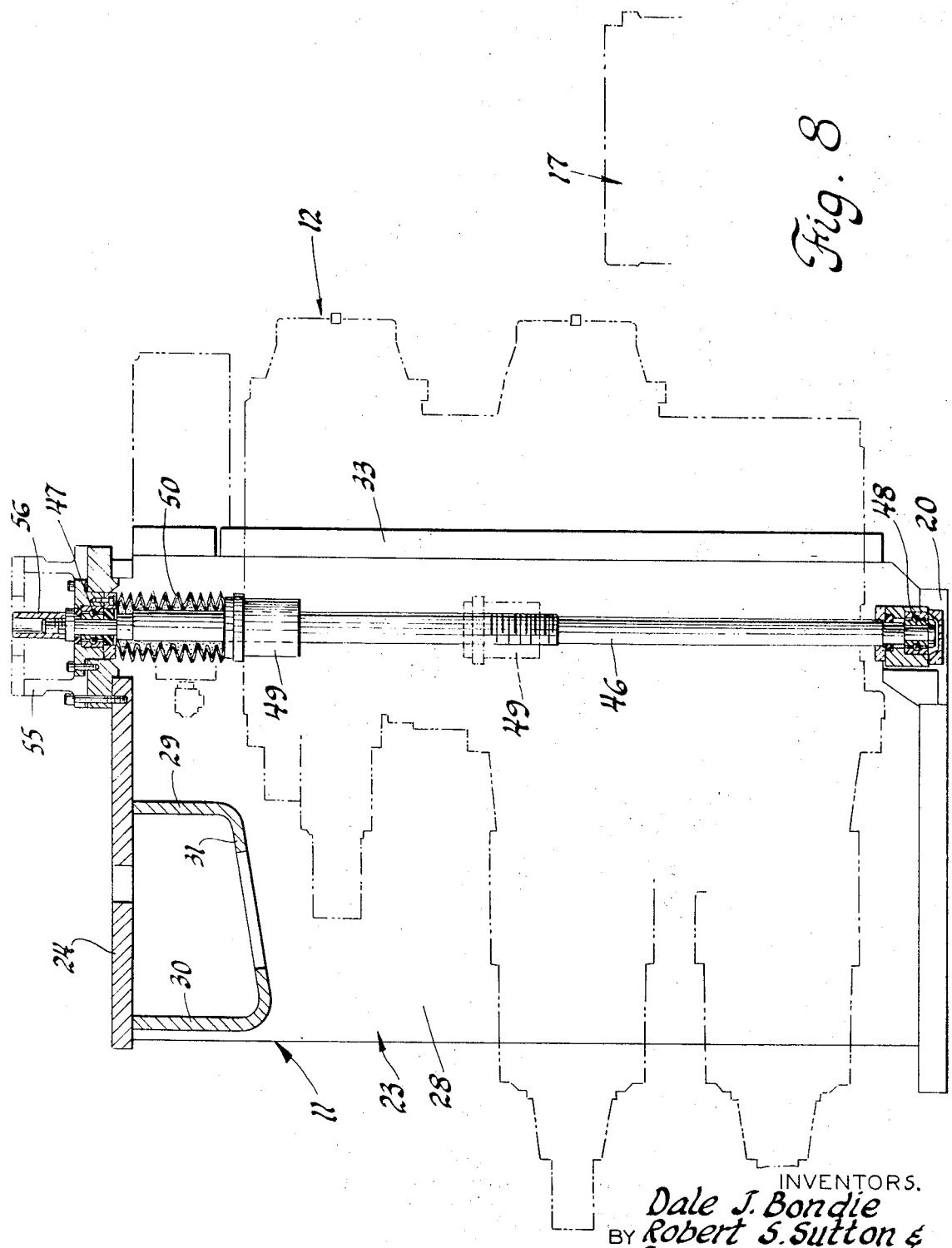
FIG. 8 is an elevational section view of the column assembly structure illustrated in FIG. 5, taken along the line 8—8 thereof, and looking in the direction of the arrows.

An accordian type dust cover 50 (FIG. 8) is mounted over the lead screw 46 and has its upper end connected to the lower end of the support structure for the bearing means 47 and its lower end connected to the top end of the ball screw nut 49. The lead screw 46 is adapted to be driven by a suitable electric motor 51 provided with a conventional feedback resolver or position sensing means 57. The motor 51 is operatively mounted in a housing 52 which is supported above the column assembly 11. The motor 51 is provided with an output shaft 54 that extends downwardly into the mounting bracket 55 supported on the column top wall 24. The motor shaft 54 is operatively connected to the upper end of the lead screw 46 by a suitable coupling member 56 (FIG. 8).

As illustrated in FIGS. 5, 6, 7 and 9, the spindle slide 42 is provided with two sets of counterbalancing weights to overcome the gravity effect on the massive spindle assembly 12. One set of counterweights is positioned in each of the columns 22 and 23. Each of the sets of counterweights is operatively supported by suitable chains and sprocket means, and the same reference numerals have been applied to both sets of chains and supporting parts and to the counterweights.

As best seen in FIG. 9, a counterweight supporting chain 59 is connected at its front end by an attachment lug 60 to the tool spindle slide 42. The chain 59 extends upwardly and inwardly over an idler sprocket 61 which is rotatably mounted on a suitable supporting shaft 62 which is operatively supported by a pair of shaft mounting blocks 63 (FIG. 7). The blocks 63 are secured to the front wall 26 of the column members 22 and 23 and to the top cover plate 24, by any suitable means.

As shown in FIG. 9, the chain 59 extends rearwardly and downwardly over a second idler sprocket 64. The rear end of the chain 59 is connected by an attachment fitting 67 to the upper end of a counterweight supporting rod 68. The sprocket 64 is rotatably mounted on a shaft 65 which is operatively supported by a pair of spaced apart mounting blocks 66 (FIG. 7).

As shown in FIG. 9, a plurality of suitable counterweights 69 are mounted in the rod 68 and retained in place by a suitable nut 70 which is threadably mounted on the lower end of the rod 68. The counterweights 69 may be made from any suitable material, as for example, steel or cast iron, and the number of these counterweights used would depend on the weight of the tool spindle assembly 12. As shown in FIG. 7, the illustrated counterweights 69 are substantially square in plan cross section, and they are guided in their vertical travel by a plurality of angle bar guide rails 71 which are fixedly secured, by any suitable manner, within the columns 22 and 23. As shown in FIG. 6, the counterweights 69 are adapted to travel down into the base 10 through suitable openings 72 in the column base plate 20.

As shown in FIG. 6, a stop member 73 is fixedly mounted on the front wall 26 of each of the columns 22 and 23, and they function to prevent overtravel of the tool spindle assembly 12 in both the "up" and "down" directions. Co-acting with the stop members 73, to prevent over-travel in the "down" direction, are a pair of rubber bumpers 74 (FIG. 9) which are attached to the tool slide assembly 12. One of each of the bumpers 74 is mounted on the lower end of each of the chain attachment lugs 60. A pair of bumper carrier lugs 75 (FIG. 9) are fixedly mounted on the lower end of the tool spindle assembly 12, and they are each provided with an upwardly facing rubber bumper 76 (FIG. 9). The bumpers 76 are adapted to abut the undersides of the stop members 73 if the tool spindle assembly 12 over-travels in the "up" direction. The rubber bumpers 74 engage the top sides of the stop members 73 to limit any overtravel of the tool spindle assembly 12 in the "down" direction.

The operation of the electric motor 51, for raising and lowering the tool spindle assembly 12, is controlled by the following described limit switches which are mounted on the front wall 26 of the right side column 23 in a position adjacent the travel path of the tool spindle assembly 12. As shown in FIG. 6, a pair of limit switches 79 and 80 are mounted on the outer front face of the column wall 26, and they are provided with the limit switch operating arms 81 and 82, respectively. The upper limit switch 79 is disposed in a position outwardly from the column wall 26 and the lower limit switch 80 is disposed inwardly toward the column wall 26, as shown in FIG. 7.

As shown in FIG. 6, a second pair of limit switches 83 and 84 are operatively mounted on the outer face of the right side column wall 26, in a position in alignment with the first two mentioned limit switches, and spaaced below a distance equivalent to the travel of the tool spindle assembly 12. The upper switch 83 is disposed outwardly from the column wall 26 and the lower switch 84 is disposed inwardly. Limit switches 83 and 84 are provided with the usual operating arms 85 and 86, respectively.

The limit switches 79, 80, 83 and 84 are operated by the following described structure. As shown in FIG. 12, a first lug 87 is fixedly secured to the left side of the tool spindle assembly 12, as viewed from the rear thereof, which would be on the right side as viewed from the front side thereof. The lug 87 carries an outwardly disposed limit switch operator 88 (FIG. 13) and an inwardly disposed limit switch operator 89. As shown in FIG. 12, a second pair of outwardly and inwardly disposed operators 90 and 91 are mounted on the lower side of the lug 87. The limit switch operators are threaded bolts which are secured in an adjusted position in the lug 87 by suitable lock nuts 92. As shown in FIG. 12, a second lug is fixedly secured to the tool spindle assembly 12 in a position below the lug 87 and in alignment therewith. Threadably mounted on the upper side of the lug 93, are a pair of outer and inner limit switch operators 94 and 95 which are in the form of threaded bolts that are secured in adjusted positions in the lug 93 by suitable lock nuts 96.

The limit switch 79 may be termed an origin switch since it controls the tool exchange position of the tool spindle assembly 12. The limit switch 80 is a slow-down switch. The limit switch 83 controls the lower end travel position of the tool spindle assembly 12. The limit switch 84 is an overtravel control switch. Limit switches 79 and 80 are operated by the operators 88 and 89 during an upward movement of the tool spindle assembly 12. Limit switches 83 and 84 are operated at both ends of the tool spindle assembly travel by the operators 90 and 91 when the tool spindle assembly 12 moves downwardly and by the operators 95 and 95 when the tool spindle assembly 12 moves upwardly. It will be understood that any suitable control circuit may be employed for interconnecting the operation of the aforementioned limit switches with the motor 51 and the general control circuit for the machine tool 9.

As shown in FIG. 11, the tool spindle 43 is adapted to be driven in either a clockwise or a counterclockwise direction by a suitable electric drive motor generally indicated by the numeral 103. The tool spindle 43 is rotatably supported in a tool slide 42 by any suitable means, as by the pair of roller bearing means 100 and 101 at the front end of the spindle, and by a suitable roller bearing means 102 at the rear end of the spindle. A suitable electric motor is a D.C. 15 h.p. motor capable of turning at 3,000 r.p.m. The motor output shaft 105 is operatively connected to the inner end of a drive shaft 108. The inner end of the drive shaft 108 is rotatably supported by the spindle slide wall 107 by a suitable ball bearing means 109. The other end 110 of the shaft 108 is rotatably supported in a suitable ball bearing means 111 which is mounted in the front wall of the spindle slide 42.

The drive shaft 108 is connected by the following described gear train means for providing selectively a 1:1, 3:1 or 9:1 drive speed ratio between the drive shaft 108 and the tool spindle 43. The 1:1 speed ratio is provided by the following described gear drive means structure. As shown in FIG. 11, a helical drive gear 112 is rotatably mounted, by a suitable ball bearing means 113, on the drive shaft end 110. The gear 112 is adapted to be operatively connected to the drive shaft 108 by a suitable hydraulically operated clutch generally designated by the numeral 114.

As shown in FIG. 11, the drive gear 112 meshes with and drives a helical idler gear 115 which is rotatably mounted on the outer end 116 of an idler shaft 120 by any suitable means, as by the ball bearing means 117. The idler shaft end 116 is rotatably mounted by a suitable ball bearing means 118 on the front wall of the spindle slide 42. The idler gear 115 meshes with and drives a driven helical gear 119 which is fixedly secured, by any suitable means, to the spindle shaft 99. The rear end 121 of the idler shaft 120 is rotatably supported by a suitable ball bearing means 122 on the spindle slide rear wall 107.

The motor 103 is adapted to drive the spindle shaft 99 in a 3:1 speed ratio by the following descirbed gear drive means structure. As shown in FIG. 11, a helical gear 125 is fixedly mounted on the inner end of the drive shaft 108 and it meshes with and drives a helical gear 126 which is fixedly secured by any suitable means to the idler shaft 120. The idler shaft 120 is adapted to be selectively connected to the idler gear 115 through a suitable hydraulically operated clutch generally designated by the numeral 127. The gear 115 drives the gear 119 and the spindle shaft 99 to provide the 3:1 speed ratio.

The electric motor 103 drives the spindle shaft 99 in a 9:1 speed ratio through the following described gear drive means structure. As shown in FIG. 11, a helical gear 128 is fixedly connected by any suitable means to the idler shaft 120 and it is meshed with and drives a dirven helical gear 129. Gear 129 is rotatably mounted on the spindle shaft 199 by a suitable ball bearing means 130. The gear 129 is adapted to be selectively connected to the spindle shaft 99 by a suitable hydraulically operated clutch generally indicated by the numeral 131. The 9:1 speed ratio drive of the spindle shaft 99 thus flows from the shaft 108 through the gears 125 and 126, the idler shaft 120, the gears 128 and 129, and the hydraulic clutch 131 to the spindle sahft 99.

As shown in FIG. 7, a feedback tachometer 132 is operatively connected with an anti-backlash coupling directly to the outer end of the shaft of the motor 103.

The spindle shaft 99 is positioned or indexed to the desired stop position by a suitable position sensing means comprising a conventional resolver generally indicated by the numeral 134. A suitable resolver of this type is one available on the market from the Reliance Electric Co. under Model 5000. As shown in FIG. 11, the shaft of the resolver 134 is connected by a suitable coupling 135 to an idler shaft 136 on which is fixedly mounted a driven gear 137. The gear 137 is meshed with and is driven by a drive gear 138 which is fixedly secured to the rear end of the spindle shaft 99 by any suitable means.

As shown in FIG. 11, the spindle shaft 99 is a tubular shaft in which is slidably mounted a draw bar 141 which is rotatably supported at its front and rear ends by suitable bronze bushings 142 and 143, respectively. The numeral 145 designates a conventional cutting tool which is operatively supported in a tapered shank tool holder 144 which is provided with a threaded bore on its rear end into which is adapted to be threadably mounted a threaded draw bolt 146 that is secured to the front end of the draw bar 141.

As shown in FIG. 11, the rear end of the draw bar 141 is reduced and splined, as indicated by the numeral 151. A flange 149 is formed at the forward end of the splined draw bar end 151 and it operatively engages a thrust bearing 150 which is mounted in the enlarged rear end of the axial bore of the tubular spindle 99. The thrust bearing 150 is positioned between the flange 149 and the rear end of the bushing 143. The splined draw bar end 151 is slidably mounted in a splined bore in the output end 152 of a coupling shaft which is rotatably mounted in a suitable bearing, as a bronze sleeve bearing, 153 in the rear end of the tubular spindle shaft 99. A coil spring 154 is mounted around the draw bar splined end 151, with its front end abutting the flange 149 and its rear end extending into an enlarged recess in the front end of the coupling shaft splined output end 152.

The coupling shaft has a reduced diameter input end 156 and the shoulder formed between the two diameter portions of the coupling shaft abuts a second thrust bearing 155 which is operatively retained in the rear end of the spindle shaft 99.

As shown in FIG. 11, the input end 156 of the coupling shaft is operatively connected to the driven member 157 of a suitable tooth-type electric clutch 158. A suitable hydraulically operated orbit motor 159 is fixedly connected to the spindle slide 41 and its output shaft 160 is rotatably mounted in suitable bearings 161 and operatively connected to the drive member 162 of the electric clutch 158.

It will be seen from the aforegoing description of the draw bar 141 that it is spring loaded so that it can travel in either axial direction as a tool holder 144 is loaded into the spindle 43. The spline connection at the rear end of the draw bar 141 permits the draw bar to move axially and yet be rotated simultaneously. The hydraulic orbit motor 159 is adapted to be rotated in both directions, one for locking a tool holder 144 in the spindle, and in the other direction with a greater pressure to unlock the tool holder. The spring 154 functions to always maintain a forwardly directed axial bias on the draw bar 141.

When a tool holder 144 is loaded into the spindle 43, as described in detail hereinafter, the draw bar 141 begins to revolve in the locking direction and makes contact with a stationary tool holder 144. The threaded draw bolt 146 engages the threaded bore in the rear end of the tool holder 144 and draws the tool holder inwardly into the mating tapered front end of the bore through the spindle shaft 99.

After a tool holder 144 is clamped tight in the spindle 43, the pressure builds up inside of the hydraulic motor 159 to a predetermined point; for example, 430 lbs. p.s.i., whereby a pressure switch 163 (FIG. 56) is operated which, in turn, stops the hydraulic motor 159 and de-energizes the electric clutch 158. The hydraulic motor 159 is operated in one diretion to lock a tool holder 144 in the spindle 43, and in the opposite direction under a greater pressure to unlock the tool holder. It will be seen that the draw bar 141 is allowed to float to compensate for the loading of a tool holder 144 in the spindle 43 while at the same time revolving. The draw bar 141 is thus free to float back and revolve until the threaded draw bolt 146 has threadably engaged the tool holder 144.

Tool Storage Container

The tool storage means 13 comprises a continuous conveyor 166 which is operatively supported for movement in a horizontal plane by a mounting plate 167 which is secured by suitable machine screws 168 to the top of the column assembly 11. The tool storage conveyor 166 comprises a continuous chain formed from a plurality of blocks or tool pots 169 which are hingedly connected by a plurality of pins 170. As shown, the conveyor 166 comprises 24 tool pots 169 which are each adapted to carry a single cutting tool 145.

Figure 22:
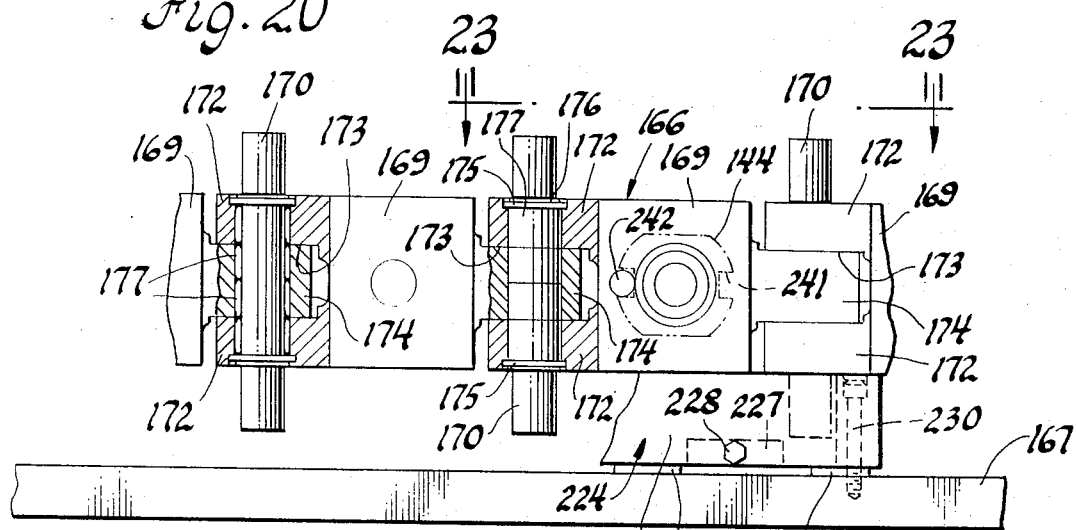
FIG. 22 is a fragmentary, left side elevational view of the tool storage conveyor structure illustrated in FIG. 21, taken along the line 22—22 thereof, and looking in the direction of the arrows.
Figure 23:
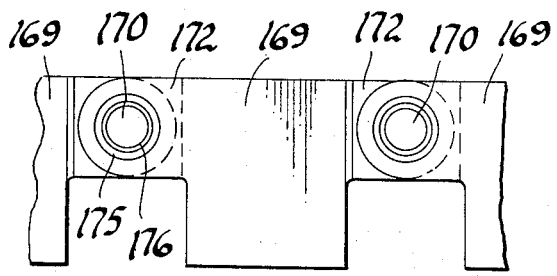
FIG. 23 is a fragmentary, horizontal top plan view of the tool storage conveyor structure illustrated in FIG. 22, taken along the line 23—23 thereof, and looking in the direction of the arrows.

As shown in FIGS. 22 through 23, each of the conveyor pots 169 is provided on one side thereof, near the front face thereof, with a pair of vertically spaced apart hinge arms 172 which form a slot 173 therebetween for the reception of a hinge tongue 174 that is formed on the side of the adjacent tool pot 169. The hinge arms 172 and the hinge tongue 174 are operatively connected by one of the hinge pins 170. As shown in FIG. 22, each of the hinge pins 170 is rotatably supported by a plurality of suitable needle bearings 177 which are secured in place in suitable bores formed through the hinge arms 172 and the hinge tongue 174. The needle bearings 177 are secured in place by any suitable means as by a pair of washers 175 and a pair of retainer rings 176.

Figure 15:
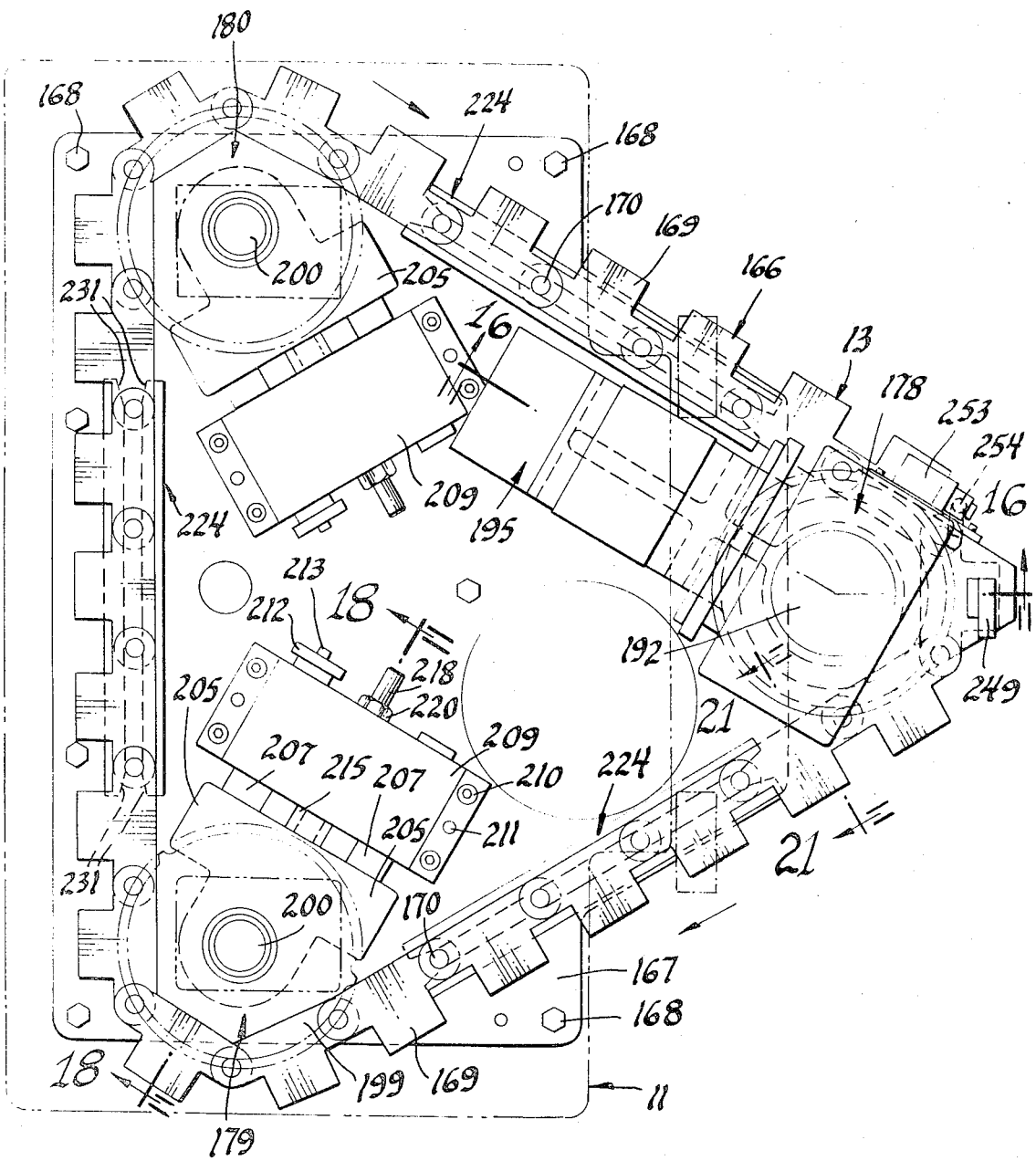
FIG. 15 is a fragmentary, enlarged, horizontal section view of the tool storage conveyor structure illustrated in FIG. 3, taken along the line 15—15 thereof, and looking in the direction of the arrows.

As shown in FIG. 15, the storage conveyor 166 is operatively mounted around a drive sprocket assembly, generally indicated by the numeral 178, and a pair of idler sprocket assemblies 179 and 180. As viewed in FIG. 15, the storage conveyor 166 would rotate in a clockwise direction.

As shown in FIG. 16, the drive sprocket assembly 178 includes a pair of vertically spaced apart drive sprockets 181 and 182 which are fixedly secured by any suitable means to a vertically disposed dirve shaft 183. The shaft 183 is rotatably supported in a journal member 185 by a pair of suitable bearing means 184. Journal member 185 is secured on a mounting bracket 186 which is carried on a support plate 187. The bracket 186 and plate 187 are fixedly secured to the mounting plate 167, by any suitable means, as by a plurality of machine screws 188. A second mounting plate 189 is fixedly secured to the top end of the mounting bracket 186, by any suitable means, as by a plurality of machine screws 190.

As shown in FIG. 16, the upper end of the dirve shaft 183 is reduced as indicated by the numeral 191. The shaft end 191 extends upwardly through a suitable opening in the support plate 189 and it is operatively connected to the output shaft of a suitable gear reducer 192. The gear reducer 192 is fixedly mounted on a mounting bracket 193 which is secured by a plurality of machine screws 194 to the mounting plate 189. Operatively connected to the gear reducer 192 is a suitable electric motor 195.

The idler sprocket assemblies 179 and 180 are constructed in the same manner, and accordingly, the idler sprocket assembly 179 will be described in detail and the same reference numerals applied to the idler sprocket assembly 180.

Figure 19:
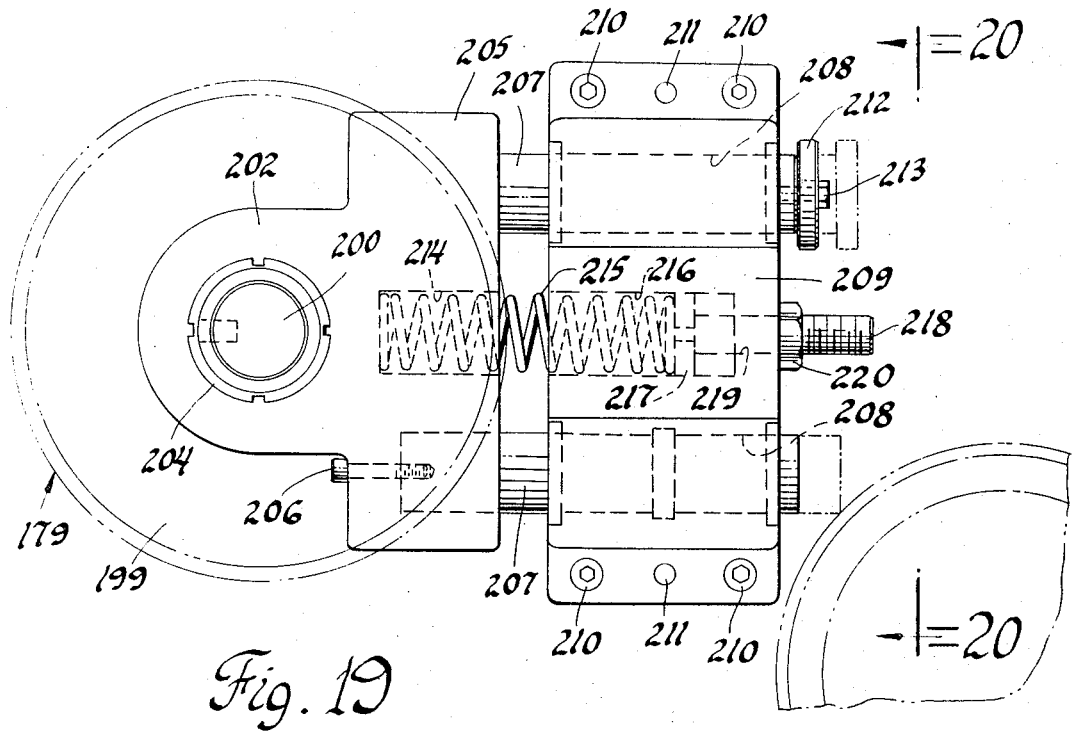
FIG. 19 is a fragmentary, horizontal top view of the tool storage conveyor structure illustrated in FIG. 18, taken along the line 19—19 thereof, and looking in the direction of the arrows.
Figure 18:
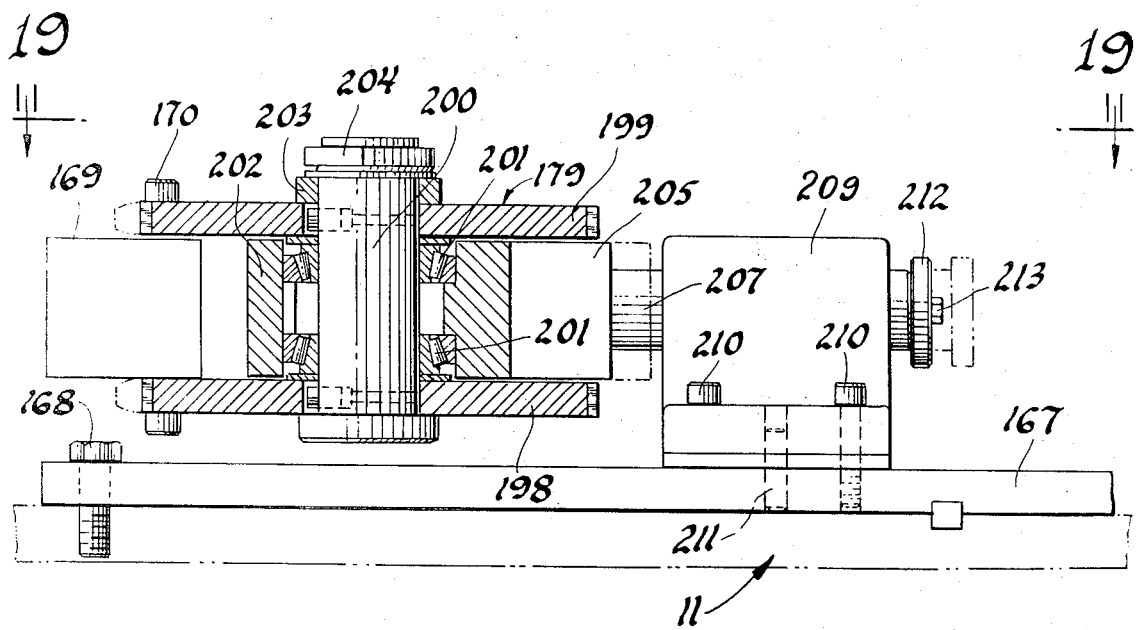
FIG. 18 is a fragmentary, enlarged, elevational section view of the tool storage conveyor structure illustrated in FIG. 15, taken along the line 18—18 thereof, and looking in the direction of the arrows.
Figure 20:
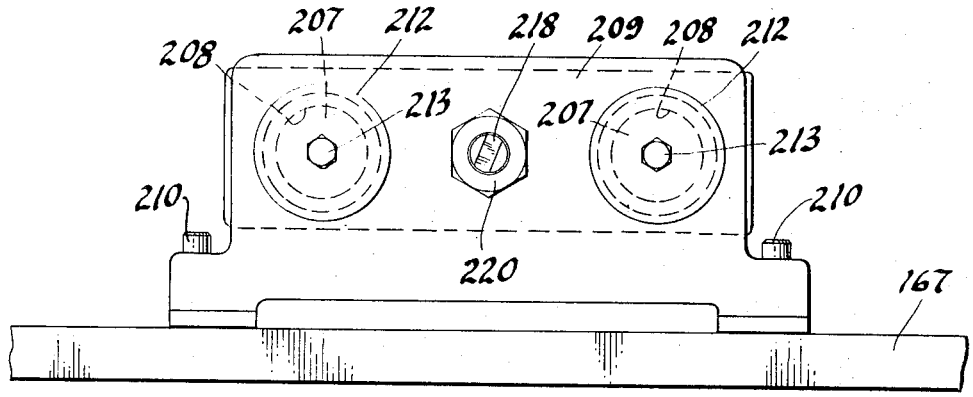
FIG. 20 is a fragmentary, right side elevational view of the tool storage conveyor structure illustrated in FIG. 19, taken along the line 20—20 thereof, and looking in the direction of the arrows.

As shown in FIGS. 18 and 19, the idler sprocket assembly 179 comprises a lower idler sprocket 198 and an upper idler drive sprocket 199, which are fixedly secured in spaced apart positions to an idler shaft 200. The sprockets 198 and 199, and the shaft 200 are operatively secured to the rotating inner portion of a pair of suitable bearing members 201 by a spacer ring 203 and a lock nut 204. The bearing members 201 are operatively mounted in a boss 202 which is integrally formed on the outer side of a slide member 205.

As shown in FIG. 19, the slide member 205 is operatively connected to a pair of spaced apart, horizontally disposed guide bars 207 by any suitable means, as by machine screws 206. The guide bars 207 extend rearwardly from the slide member 205, and through suitable horizontal bores 208 formed in a guide bar block 209. The guide bar block 209 is secured by suitable machine screws 210 and dowel pins 211 to the mounting plate 167. A stop flange 212 is fixedly secured by machine screws 213 to the rear end of one of the guide bars 207 so as to prevent the guide bars 207 from being pulled out of the block 209. The slide member 205 is normally biased outwardly or to the left, as viewed in FIG. 19, so as to provide a chain take-up effect on the conveyor 166.

As shown in FIG. 19, the slide member 205 is provided with a central, inwardly extended bore 214 on its rear face in which is seated the front end of a coil spring 215. The rear end of the coil spring 215 is seated in a similar bore 216 formed in the front side of the guide bar block 209. The spring 215 thus functions to provide a bias toward the left on the slide 205, as viewed in FIG. 19. The pressure on the spring 215 may be regulated by means of a pressure washer 217 which is slidably mounted in the bore 216 and which engages the rear end of the spring 215.

A threaded rod 218 is threadably mounted through a reduced bore 219 in the block 209, and its inner end engages the pressure washer 217. It will be seen that by adjusting the threaded rod 218, the pressure on the washer 217 and on the spring 215 may be adjusted, as desired. The threaded rod 218 is secured in an adjusted position by means of the lock nut 220. It will be seen that the two idler sprocket slides 205 move in and out as the tension increases and decreases, respectively, on the conveyor 166.

As shown in FIG. 15, the conveyor 166 is guided between the drive sprocket assembly 178 and the two idler sprocket assemblies 179 and 180 by three conveyor guide track means generally indicated by the numerals 224. An individual guide track means 224 is disposed between each of the aforementioned sprocket assemblies.

Figure 21:
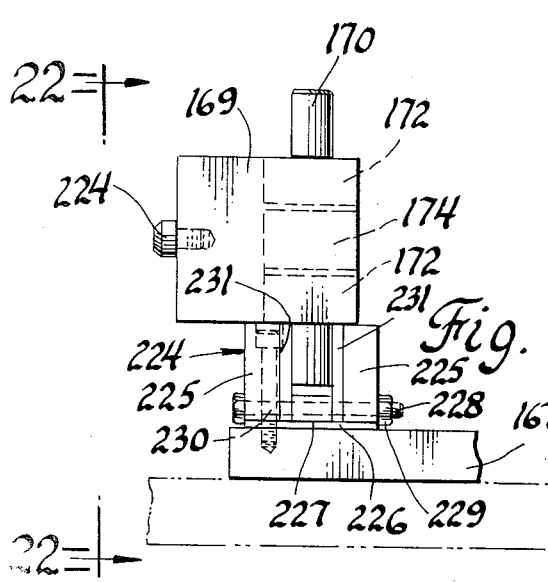
FIG. 21 is a fragmentary, elevational section view of the tool storage conveyor structure illustrated in FIG. 15, taken along the line 21—21 thereof, and looking in the direction of the arrows.

As shown in FIGS. 21 and 22, each of the conveyor guide track means 224 comprises a pair of laterally spaced apart, elongated bars 225 which are spaced vertically upward from the mounting plate 167 by a plurality of vertical spacer plates 226. The track bars 225 are also laterally spaced apart by a plurality of spacer plates 227. The track bars 225 are secured together by a plurality of suitable bolts 228 (FIG. 21) and lock nuts 229. The guide track means 224 are secured to the mounting plate 167 by a plurality of machine screws 230 which extend downwardly through the bars 225 (FIGS. 21 and 22). As shown in FIG. 15, the track bars 225 are chamfered or relieved along the inner end corners thereof, at both ends, to provide a guiding in and out pair of surfaces for the lower ends of the chain hinge pins 170 which extend downwardly below the tool pots 169 and into the passage between the bars 225.

As shown in FIG. 16, each of the tool pots 169 is provided with a stepped, axial, horizontal bore therethrough which includes an outer large diameter portion 234, a communicating intermediate smaller bore 235, and an inner end communicating still smaller bore 236. The cylindrical inner end 237 of a tool holder 144 is adapted to be received into the innermost and smallest bore 236. A tool holder 144 is retained in a tool pot 169 by the coaction of a peripheral V-groove 238 which is formed on the inner cylindrical end 237 and which receives a pair of spring biased detents which are mounted in a pair of detent carriers 240 that are threadably mounted in a pair of transverse threaded bores 239 formed in the inner end of the tool pot 169. It will be seen that the detents coacting with the V-groove 238 locate a tool holder 144 axially in a tool pot 169.

A tool holder 144 is located in a proper position rotated about its longitudinal axis by means of a notch 241 which is formed on the flange of the tool holder and which is adapted to receive an axially extended stud 242 as shown in FIG. 17.

As shown in FIGS. 16 and 17, the tool storage conveyor 166 is provided with a tool present indicating means which comprises a vertically disposed pin 245 that is mounted in a suitable vertically disposed mounting bushing in each of the tool pots 169, in a position radially disposed to the outer large bore 234. As shown in FIG. 16, the bottom of the pin 245 is provided with a round ended head which engages the tapered shank of a tool holder 144 when it is moved into a tool pot 169. The pin 245 is provided on its upper end with a cross pin to prevent it from falling downwardly by gravity through its mounting bushing. When there is no tool holder 144 present in a pot 169, the tool present pin 245 will fall downwardly by gravity until the cross pin engages the upper end of the mounting bushing. However, if a tool holder 144 is mounted in a pot 169, then when that pot is rotated into the tool change position directly above the spindle 43, the tool present pin 245 will be in a pushed upward position whereby it engages the lower end of a switch operator rod 246 and moves it upwardly to actuate a limit switch 249 to indicate to the control circuit for the conveyor that a tool is present at the tool change position. If the tool present pin 245 is disposed downwardly by gravity because of the lack of a tool holder 144, the conveyor 166 will continue moving onwardly to bring the next loaded tool pot 169 into the tool change position. The switch operator rod 246 is vertically aligned with the pin 245 and it is slidably mounted in a substantially cylindrical housing 247 which is fixedly secured by any suitable means in the mounting plate 189. A compression spring 248 is operatively mounted around the operating rod 246 and has its lower end in engagement with a flange on the rod 246 and its upper end in engagement with a stop member disposed on the upper end of the housing 247. The limit switch 249 is supported on a mounting block 250 which has its lower end fixedly secured by any suitable means, to the housing 247.

As shown in FIG. 15, a limit switch 253 is disposed in a fixed position over the travel path of the tool storage conveyor 166 adjacent the tool change position. The limit switch 253 is provided with a suitable roller operating arm 254 which is adapted to be engaged by the pins 170 as the conveyor 166 is moved past the switch 253. The switch 253 functions as a tool holding switch and for locating the pots 169 and stopping them in the tool change position directly over the spindle 43 to permit the tool changer assembly 14 to make a tool change between the tool storage means 13 and the spindle 43.

Although the tool conveyor 166 is illustrated as comprising 24 tool pots 169 connected together by the pins 170, it will be understood that the conveyor 166 may be extended rearwardly to carry a larger number of tools. The conveyor 166 may be enlarged by merely enlarging the mounting plate 167 and extending it rearwardly, and moving the idler sprocket assemblies 179 and 180 backwardly a definite dimension which would depend on the number of tool pots 169 to be employed. It will be seen that the parts of the tool pots 169 and the pins 170 form a conveyor chain which is driven by the drive sprocket assembly 178, and that the teeth of the sprockets engage the pins 170 for driving the chain. The teeth of the idler sprocket assemblies 179 and 180 also engage the pins 170 for guiding them therearound. The pins 170 thus function not only to connect the tool pots 169 together to form a conveyor chain, but also function as a means for locating the tool pots 169 in the tool change position. It will also be seen that the tool holders 144 carried in the tool pots 169 are in a horizontal position with the axis of the tools in the tool holders 144 disposed in a horizontal plane parallel to the axis of the spindle 43. It will also be seen that the tool storage means 13 provides a series arrangement which disposes the tools in a position for transfer directly therefrom to the spindle 43 without having to go through an intermediate "hold" position or the like. The tool pots 169 also totally enclose the tool holders 144 to prevent dirt and chips from collecting on the tapered shanks of the tool holders.

The Tool Changer Assembly

Figure 24:
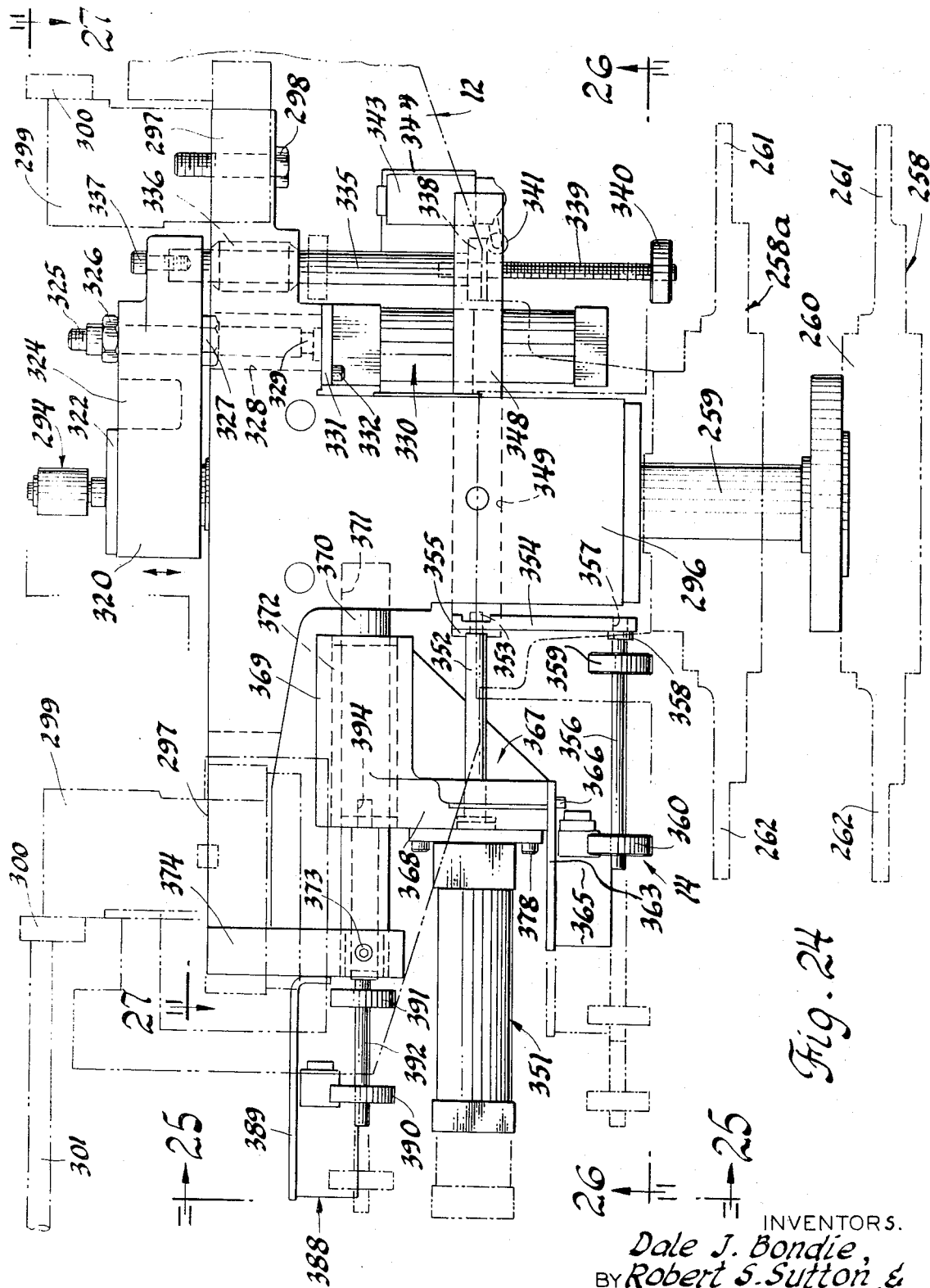
FIG. 24 is a fragmentary, horizontal plan view of the tool changer assembly structure illustrated in FIG. 3, taken along the line 24—24 thereof, and looking in the direction of the arrows.

As shown in FIGS. 24, 28 and 36, the tool changer assembly 14 includes a tool changer arm generally indicated by the numeral 258 which is adapted to be moved between an extended position shown in solid lines in FIG. 28 and a retracted position shown in broken lines and indicated by the numeral 258a. The tool changer arm 258 is operatively mounted on a tool changer arm actuating shaft 259 (FIG. 28). As shown in FIGS. 28 and 36, the tool changer arm 258 includes a carrier block or head 260 on which is operatively mounted a pair of radially disposed, outwardly extended and aligned tool holder gripping mechanisms 261 and 262. The solid line positions of the tool holder gripping mechanisms 261 and 262 in FIG. 36 are the operative positions, and the broken line positions 261a and 262a are the inoperative positions to which these mechanisms are rotated, as more fully described hereinafter.

As shown in FIG. 28, the tool changer arm actuating shaft 259 is provided on its front end with an enlarged end 264 to which is fixedly secured by any suitable means, as by welding, a circular mounting plate 265. The tool changer arm head 260 is fixedly secured to the circular mounting plate 265 by a plurality of suitable machine screws 266. As shown in FIG. 36, each of the tool holder gripper mechanisms 261 and 262 is similarly constructed, and accordingly, the same reference numerals have been applied to both of these mechanisms.

As shown in FIG. 36, each of the tool holder gripper mechanisms 261 and 262 includes an elongated L-shaped outer gripping arm 267 which is provided on its outer end with a flange portion 268 to form the L-shape. Fixedly mounted on the inner side of the flange 268 is a locking pin or finger 269 which is adapted to be received in a radially disposed bore 270 formed in the flange of a tool holder 144. The gripper arm 267 is substantially rectangular in cross section and it is fixedly secured at its inner end by any suitable means to the outer end of a cylindrical hydraulic piston 271 which is slidably mounted in a hydraulic cylinder 272 formed in the head 260.

As shown in FIG. 36, each of the tool holder gripping mechanisms includes an elongated inner gripper arm 275 which is rectangular in cross section and which is provided on its outer end with a pair of outwardly projecting, spaced apart parallel locking pins or fingers 276 which are parallel to the pin 269 and which are adapted to be received into a pair of spaced bores 277 in the flange of a tool holder 144. The inner end of the gripper arm 275 is fixedly secured, by any suitable means, to a second cylindrical piston 278 which is slidably mounted in a hydraulic cylinder 279 formed in the head 260. A compression spring 280 is mounted in the cylinder 279 with its inner end abutting the closed inner end of the cylinder 279 and its outer end abutting the inner end of the cylindrical piston 278 for normally biasing it outwardly.

As shown in FIG. 36, the cylindrical pistons 271 and 278 are each provided along their inner peripheries with longitudinally extended gear rack teeth 281 and 282, respectively, which are meshably engaged with the teeth of an intermediately disposed gear 283 which is rotatably mounted on a shaft 284 that is disposed perpendicular to the direction of travel of the pistons 271 and 278. As shown in FIG. 37, the gear 283 is seated in a chamber 285 formed in the head 260. One end of the shaft 284 is secured in the block 260 by a press fit. The gear chamber 285 is enclosed by a cover plate 286 through which the reduced diameter other end of the shaft 284 is slidably mounted through a suitable bore. The cover plate 286 is secured to the block 260 by a plurality of suitable machine screws 287. It will be seen that both of the tool holder gripper mechanisms 261 and 262 are identically formed, and that the inner ends of each of the hydraulic cylinders 272 are connected to a suitable source of hydraulic fluid under pressure by the following described structure.

As shown in FIG. 36, each of the inner ends of the cylinders 272 is connectd by a passage or bore 289 to a second communicating bore or passage 290. As shown in FIG. 38, the outer ends of the bores 290 are connected to an interconnecting bore 291 in the mounting plate 265. The bore or passage 291 is connected to a bore 292 in the shaft 259 which forms a passage through the entire length of the shaft. As shown in FIG. 28, the bore 292 extends through the reduced diameter rear end 293 of the shaft 259. Operatively mounted in the end of the bore 292 in the shaft end 293 is a conventional rotating fluid fitting 294 which is adapted to be connected to a suitable source of fluid under pressure, as described more fully hereinafter.

As shown in FIG. 28, the tool changer arm shaft 259 is operatively mounted in a cylindrical housing 296 for rectilinear movement and for oscillating rotary movement about its longitudinal axis, as will be more fully described hereinafter. As shown in FIGS. 24 and 27, the housing 296 is provided on its rear end with a pair of integral, laterally extended mounting arms 297 which are secured by suitable machine screws 298 to supporting members 299. The supporting members 299 are fixedly secured, as by welding, to the support members 300 and 301 which are fixed to the columns 22 and 23. It will be understood that the tool changer assembly 14 is thus mounted between the columns 22 and 23 and in a position directly over the tool spindle assembly 12 and underneath the tool storage means 13.

As shown in FIG. 28, the housing 296 is provided with a horizontal bore 303 in which the shaft 259 is operatively mounted. The shaft 259 is supported in the bore 303 at its front end by a sleeve bushing 304 and at its rear end by a sleeve bushing 305. The bushings 304 and 305 are mounted in suitable annular recesses formed in the ends of a sleeve shaft 306. The rear end of the shaft 306 is rotatably supported in the housing 296 by a suitable bearing means 307 which is secured in place axially by a suitable retainer ring 308. The front end of the shaft 306 is rotatably supported by a suitable bearing means 309 which is secured in place axially by a lock nut 310. The front end of the bore 303 is enclosed by a suitable cover plate 311 which is attached to the housing 296 by a plurality of suitable machine screws 312.

As shown in FIG. 28, the tool changer arm shaft 259 may be moved longitudinally or in a rectilinear manner in the bushings 304 and 305, but it is prevented from being rotated in these bushings by a longitudinal key 313 which is secured to the shaft 306 by suitable machine screws 316. The key 313 is mounted in a key slot 314 formed in the inner periphery of the shaft 306. The key 313 extends radially inward into a key slot 315 formed in the outer periphery of the shaft 259. The key slot 315 extends from the rear end of the shaft 259 longitudinally inward to a point indicated by the numeral 317.

The tool changer arm shaft 259 is moved longitudinally to move the tool changer arm 258 between the extended and retracted positions by the following described structure. As shown in FIG. 28, a bearing housing 320 is rotatably supported on the shaft end 293 by a pair of spaced apart bearing means 321. The bearing means 321 are retained in the housing 320 by a suitable retainer plate 322 and machine screws 323. As shown in FIGS. 24 and 27, the bearing housing 320 is integrally connected to a laterally extended operating arm 324. As shown in FIG. 24, the operating arm 324 is adapted to be moved forwardly and backwardly by a suitable hydraulically operated cylinder 330 which is provided with an attachment flange 331 that is secured to a housing mounting arm 297 by suitable machine screws 332. The cylinder piston rod 329 is connected by suitable means to a threaded rod 325 which extends through a bore 328 formed through the mounting arm 297 and thence through a communicating bore formed through the operating arm 324. The threaded rod 325 is secured to the operating arm 324 by suitable nuts 326 and 327.

As shown in FIG. 24, a limit switch operating rod 335 has its rear end seated in a suitable bore on the front side of the operating arm 324, in a position outboard from the threaded rod 325. The rod 335 is slidably mounted through a bushing 336 mounted in the housing mounting arm 297, and it is fixed to the operating arm 324 by a suitable machine screw 337.

As shown in FIGS. 24 and 26, a limit switch operator 338, in the form of a disk, is threadably mounted on the rear end of a threaded rod 339 which is threaded into the front end of the rod 335. A second switch operator or disk 340 is fixedly secured by any suitable means on the front end of the threaded rod 339. The first operator 338 is also adapted to function as a locking means to lock the shaft 339 in an adjusted position relative to the shaft 335.

As shown in FIG. 26, a double acting limit switch 343 is fixedly mounted on a supporting plate 344 which has its inner end secured by any suitable means to the housing 296. The limit switch 343 is provided with the operating arm 342 which carries on its outer end a roller 341. It will be understood that the limit switch operator 338 will operatively engage the roller 341 to operate the limit switch 343 when the cylinder 330 operates to move the tool changer arm 258 outwardly to the extended position to terminate the changer arm movements, and that the operator 340 will engage the roller 341 when the cylinder 330 is operated in the other direction to terminate the retractive movement of the tool changer arm 258.

The tool changer actuating shaft 259 is oscillated between the various tool changer operating positions by the following described structure. As shown in FIGS. 26 and 28, a gear 347 is formed in the outer periphery of the sleeve shaft 306, in a position forward from the key 313. An elongated gear rack 348 having a gear rack 350 on the lower side thereof is slidably mounted in a cylindrical bore 349 which intersects the shaft bore 303 in the transverse direction. The gear 347 meshes with the gear rack teeth 350 and the shaft 359 is oscillated between various tool changer operating positions when the gear rack 349 is moved longitudinally, as more fully described hereinafter.

As shown in FIG. 24, the cylindrical bore 349 extends completely through the housing 296, and the gear rack 348 also extends completely through the bore 349. The gear rack 348 is moved longitudinally, to oscillate the shaft 259, by a suitable hydraulically operated cylinder generally indicated by the numeral 351 in FIGS. 24, 25 and 26. As best seen in FIG. 24, the cylinder 351 includes a cylinder rod 352 which is provided with an outer reduced threaded end 353 that is threadably mounted into the rear end of the gear rack 348. A horizontally disposed limit switch operating arm 354 has its inner end secured by the threaded shaft end 353 and a lock nut 355 to the rear end of the gear rack 348.

A threaded rod 356 has one end thereof threadably mounted in a bore 357 in the outer end of the arm 354, and it is secured in place by a lock nut 358. A pair of spaced apart adjustable operators 359 and 360, in the form of disks, are carried on the rod 356 in positions for operating a limit switch 365. As shown in FIG. 26, the limit switch 365 is provided with the usual operating arm and roller 364. The limit switch 365 is double acting switch, whereby the movement of the gear rack 348 is controlled in its movement to the right, as viewed in FIG. 26, when the operator 360 engages the roller 364 and its movement in the other direction is controlled when the operator 359 engages the roller 364.

As shown in FIG. 24, the limit switch 365 is operatively mounted on a mounting plate 363 which is fixedly secured to a cylinder carrier member, generally indicated by the numeral 367, by any suitable means, as by the machine screws 366. The two operating positions of the limit switch 365 are indicated on the hydraulic schematic control circuit of FIG. 57 by the numerals 365A and 365B.

Figure 25:
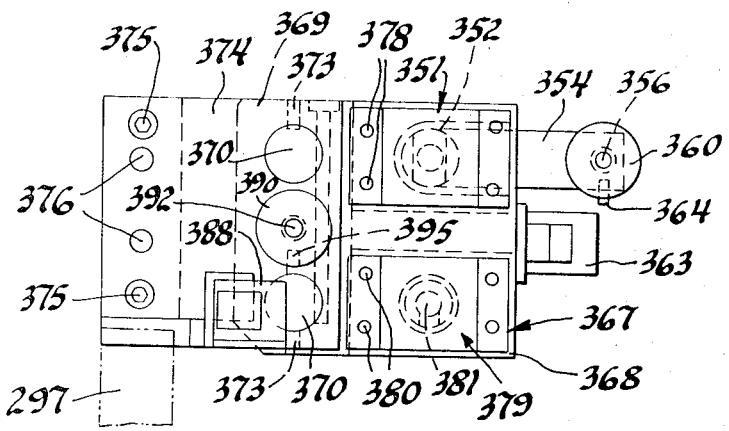
FIG. 25 is a fragmentary, left side elevational view of the tool changer assembly structure illustrated in FIG. 24, taken along the line 25—25 thereof, and looking in the direction of the arrows.

As best seen in FIG. 24, the cylinder carrier member 367 includes a vertically disposed carrier plate 368 which is integrally connected at is rear end to a slide member 369. As shown in FIGS. 25 and 26, the slide member 369 is slidably mounted on a pair of vertically spaced apart slide bars 370 which have their inner ends fixedly mounted in suitable bores 371 in the left side of the housing 296, as viewed in FIG. 24. As shown in FIG. 24, the slide member 369 is provided with sleeve bushings 372 through which the slide bars 370 extend. As shown in FIG. 25, the outer ends of the slide bars 370 are fixedly secured in bores formed in a vertically disposed and forwardly extended support plate 374 by suitable lock screws 373. The rear end of the support plate 374 is secured to the housing 296 left mounting arm 297 by a pair of machine screws 375 and a pair of dowel pins 376. As shown in FIGS. 24 and 25, the hydraulic cylinder 351 is connected to the outer face of the carrier plate 368 by a plurality of machine screws 378.

As shown in FIGS. 25 and 26, the means for operating the gear rack 348 includes a second hydraulically operated cylinder 379 which is secured to the carrier plate 368 by a plurality of suitable machine screws 380. As shown in FIG. 26, the cylinder 379 is provided with the usual cylinder rod 381 which has a reduced outer end 382 that is threadably mounted in a suitable threaded bore in the rear end of an enlarged diameter operating rod 383. The operating rod 383 is provided with a reduced diameter threaded front end which is threadably mounted in a suitable bore 384 in the left side of the housing 296. The operating rod 383 is locked in place by a suitable lock nut 385.

As shown in FIG. 24, a double acting limit switch 388 is fixedly supported on a mounting plate 389 which is secured to the support plate 374 by any suitable means. As shown in FIGS. 24 and 26, a pair of limit switch operators, in the form of disks 390 and 391, are adjustably mounted in spaced apart positions on a threaded rod 392. As shown in FIG. 26, the rod 392 extends to the right through a bore 393 in the support plate 374 and thence into threaded engagement in a bore 394 (FIG. 24) formed in the slide 369 and in a position vertically spaced between the slide bars 370, as shown in FIG. 25. As best seen in FIG. 26, the limit switch 388 is provided with the usual operating arm and roller 395 which is adapted to be operatively engaged by the operators 390 and 391 when the slide 369 is moved to the right and then to the left, respectively. The two operating positions of the switch 388 are indicated on the schematic hydraulic control circuit of FIG. 57 by the numerals 388A and 388B.

A tool holder similar to the tool holder 144 is shown in detail, for reference purposes, in U. S. Pat. No. 3,449,823, but it is not provided with a locating V-groove 238 as employed in the present invention.

The operation of the tool changer assembly 14 is described in detail hereinafter. It will be understood that the tool holder gripper or locking mechanisms 261 and 262 are actuated into locking positions under the pressure of springs 280 on the pistons 278 and into unlocked positions by hydraulic pressure acting on the cylindrical pistons 271.

X-Axis Assembly

Figure 43:
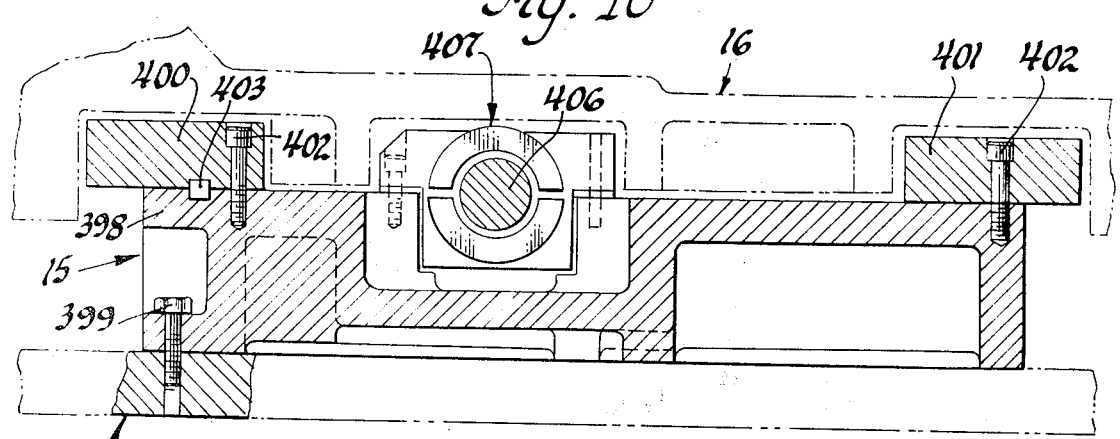
FIG. 43 is a fragmentary, elevational section view of the X-axis ways structure illustrated in FIG. 39, taken along the line 43—43 thereof, and looking in the direction of the arrows.
Figure 39:
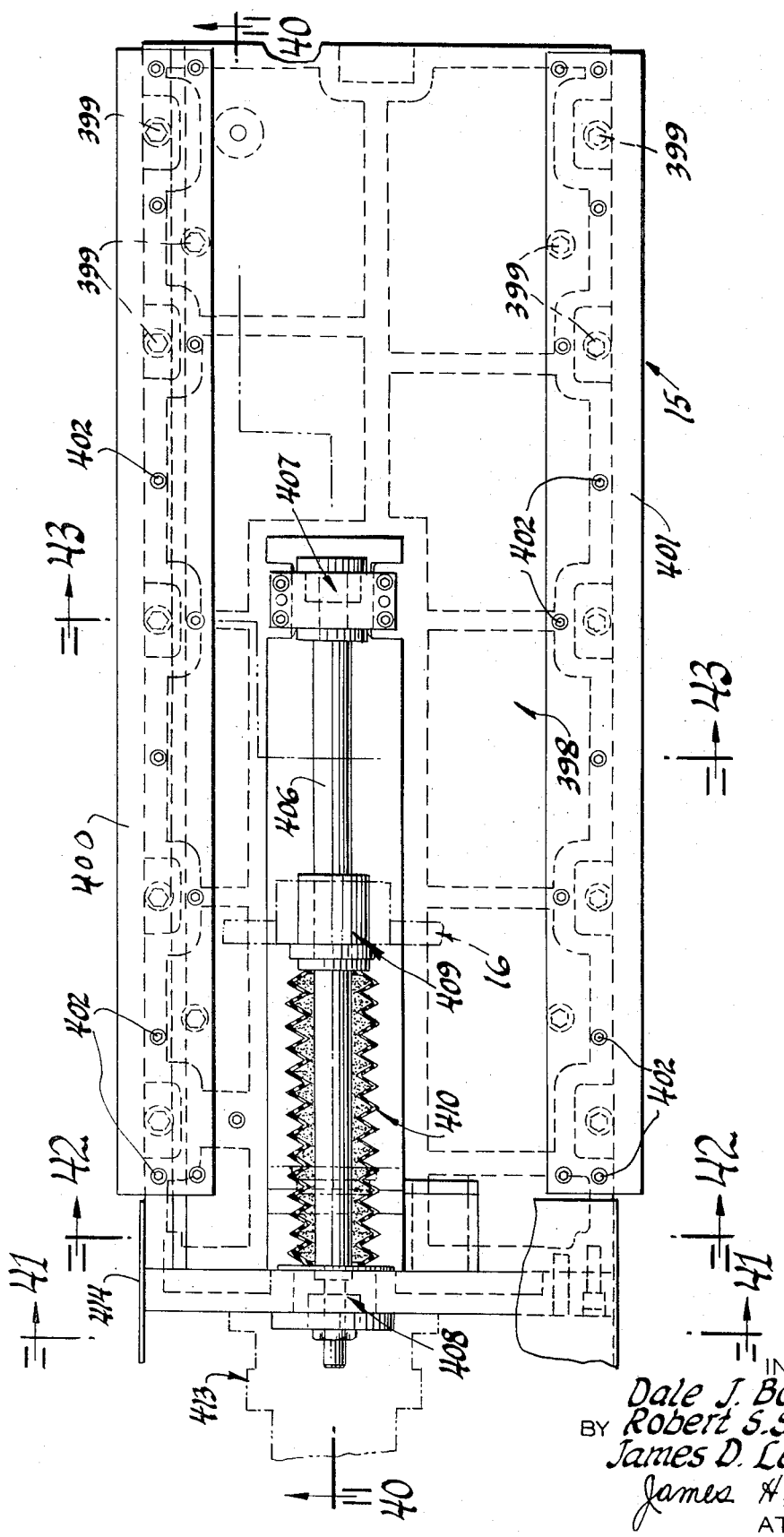
FIG. 39 is a fragmentary, horizontal view of the X-axis ways illustrated in FIG. 2, taken along the line 39—39 thereof, and looking in the direction of the arrows.
Figure 64:
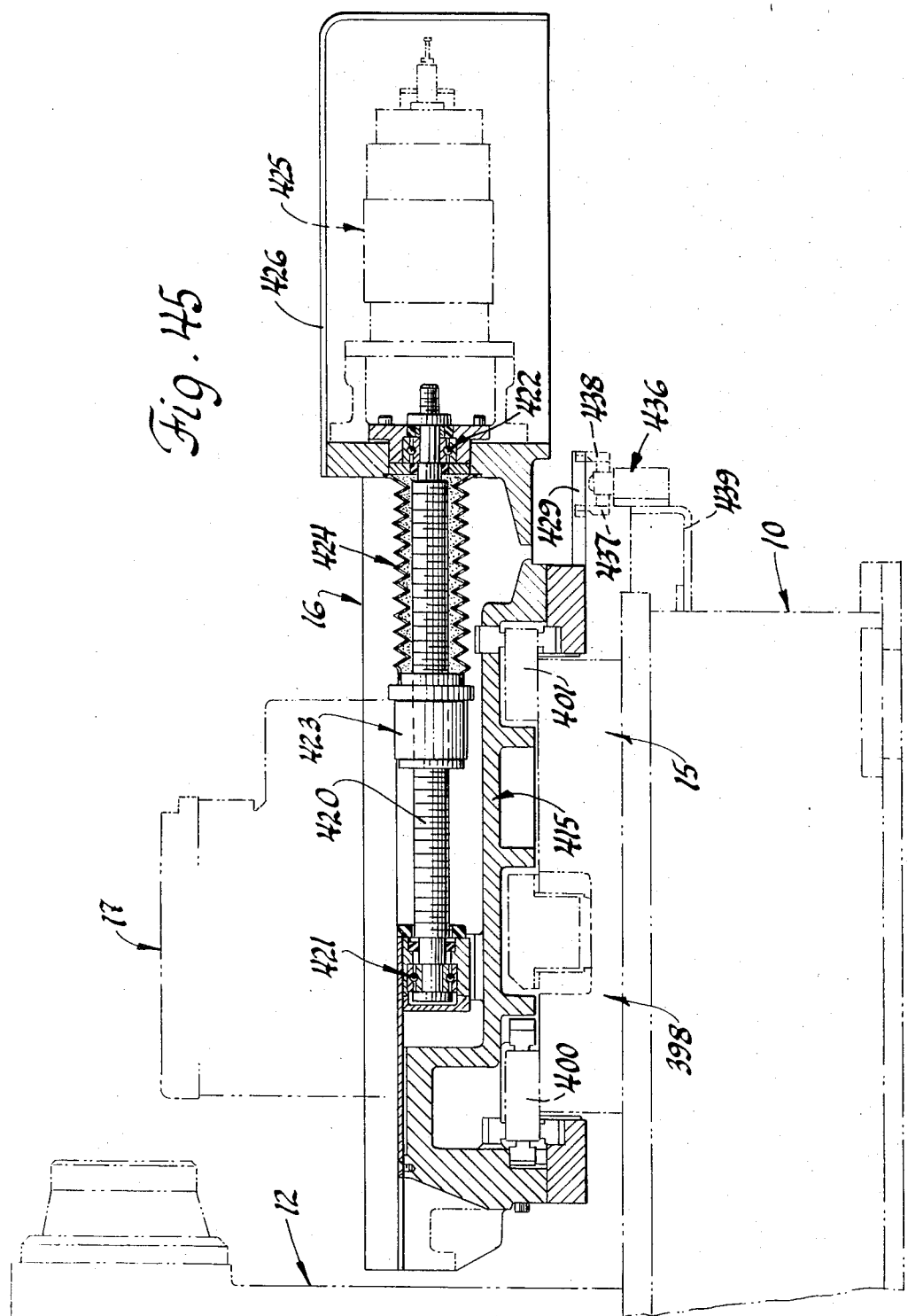
Figure 64:
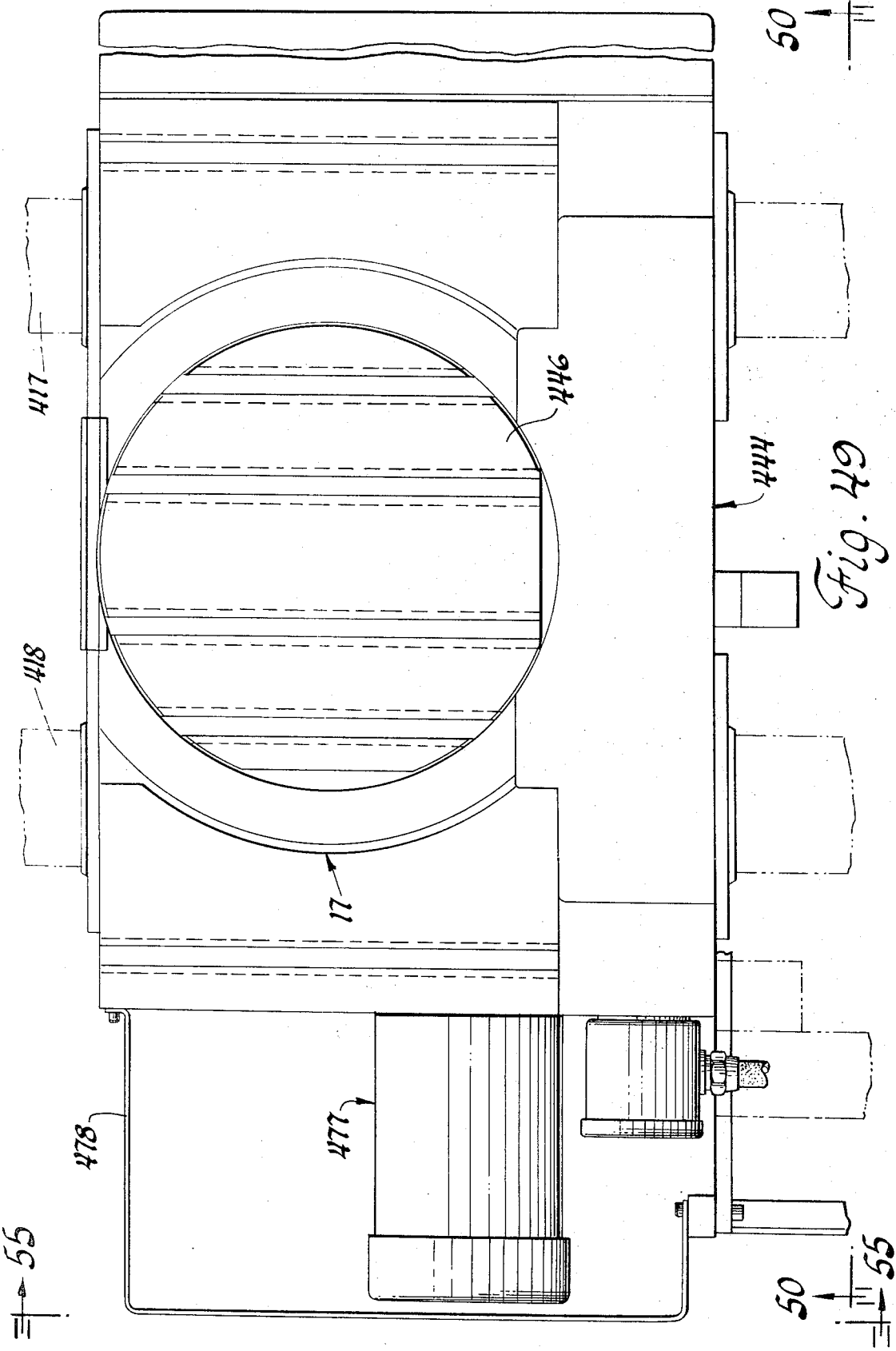

The machine tool 9 of the present invention is provided with an X-axis assembly 15 which is shown in detail in FIGS. 39 through 43. As best seen in FIGS. 39 and 43, the X-axis assembly 15 includes an elongated casting 398 which is fixedly secured by any suitable means to the machine base 10 as by a plurality of suitable machine screws 399. A pair of spaced X-axis rails or ways 401 are fixedly secured to the top of the casting 398 by suitable machine screws 402 and keys 403. A lead screw 406 is longitudinally disposed in the casting 398 with its inner end rotatably mounted in a suitable bearing means and supporting structure generally indicated by the numeral 407. The outer end of the lead screw 406 is also operatively and rotatably supported in a suitable bearing means and support structure 408 which is disposed in the left end of the casting 398, as viewed in FIGS. 39 and 40.

Operatively mounted on the lead screw 406 is a suitable ball bearing screw nut 409 that is operatively attached to the saddle assembly 16 (FIG. 43) for moving the saddle assembly longitudinally on the rails 400 and 401 in the usual manner when the lead screw 406 is actuated. As shown in FIGS. 39 and 40, a suitable accordian type dust cover 410 is operatively mounted around the lead screw 406 between the bearing means 408 and the screw nut 409. As illustrated in FIGS. 40 and 41, the lead screw 406 is operatively connected to a suitable power drive means generally indicated by the numeral 413 which includes a suitable electric drive motor and a suitable conventional feedback resolver or position sensing mechanism. As shown in FIGS. 40 and 41, the power drive means 413 is provided with a suitable cover 414.

It will be seen that the X-axis assembly is a self-contained unit which may be separately formed and mounted on the base 10 with the X-rails 400 and 401 included. The X-axis assembly is doweled in place, and the dowel holes for properly aligning the X-axis assembly on the base 10 are positioned in the base 10 so as to provide the correct disposition between the Y-axis and the X-axis assemblies. This feature eliminates the need for separately positioning the X-rails 400 and 401 relative to the column assembly 11. It also eliminates the scraping of the individual X-rails 400 and 401 which is usually required when the positioning of these rails takes place.

Saddle Assembly

The machine tool of the present invention is provided with a Z-axis or saddle assembly 16 which is shown in detail in FIGS. 44, 45, 46 and 48. As best seen in FIGS. 44 and 45, the saddle assembly 16 includes an elongated casting 415 which is slidably mounted on the X-axis ways 400 and 401 by suitable bearing means 416. The saddle assembly 16 includes a pair of spaced Z-axis rails or ways 417 and 418 which are secured to the casting 415 by suitable machine screws 419 and keys 419a.

A lead screw 420 is longitudinally disposed on the casting 415 with its inner end rotatably mounted in a suitable bearing means and support structure generally indicated by the numeral 421. The outer end of the lead screw 420 is also operatively and rotatably supported in a suitable bearing means and support structure 422, as shown in FIG. 45.

Operatively mounted on the lead screw 420 is a suitable ball bearing screw nut 423 which is operatively attached to the work table assembly 17 (FIG. 45) for moving the work table assembly 17 longitudinally on the Z-axis rails 417 and 418 in the usual manner when the lead screw 420 is actuated. As shown in FIG. 45, a suitable accordian type dust cover 424 is operatively mounted around the lead screw 420 between the bearing means 422 and the screw nut 423.

As illustrated in FIG. 45, the lead screw 420 is operatively connected to a suitable power drive means generally indicated by the numeral 425, which includes a suitable electric drive motor and a suitable conventional feedback resolver or position sensing mechanism. As shown in FIG. 45, the power drive means 425 is provided with a suitable cover 426. It will be understood that the Z-axis or saddle assembly 16 is a self-contained unit which may be separately fabricated and mounted on the X-axis assembly 15.

The end points of the length of travel of the saddle assembly 16 along the X-axis ways 400 and 401 are controlled by a pair of limit switches 436 (FIG. 45) which are mounted on the machine base 10 in a position accessible to limit switch operators mounted on the saddle assembly 16. The limit switches 436 are attached to the machine base 10 by a suitable support bracket 439, and they are provided with the usual roller operating arms 437 and 438.

As shown in FIG. 44, the saddle assembly 16 has fixedly mounted thereon a pair of spaced apart support brackets 429 and 433 which extend laterally outward on the proper level for operating the limit switches 436. The support bracket 429 carries a pair of adjustably mounted switch operator dogs 430 and 431 which are adapted to operate the switch arms 437 and 438, respectively, when the saddle assembly 16 is moved to the left along the X-axis ways 400 and 401, as viewed from the front of the machine. The support bracket 433 carries two adjustably mounted switch operator dogs 434 and 435 which are adapted to operate the switch operating arms 437 and 438, respectively, when the saddle assembly 16 is moved in the other direction.

Work Table Assembly

Figure 51:
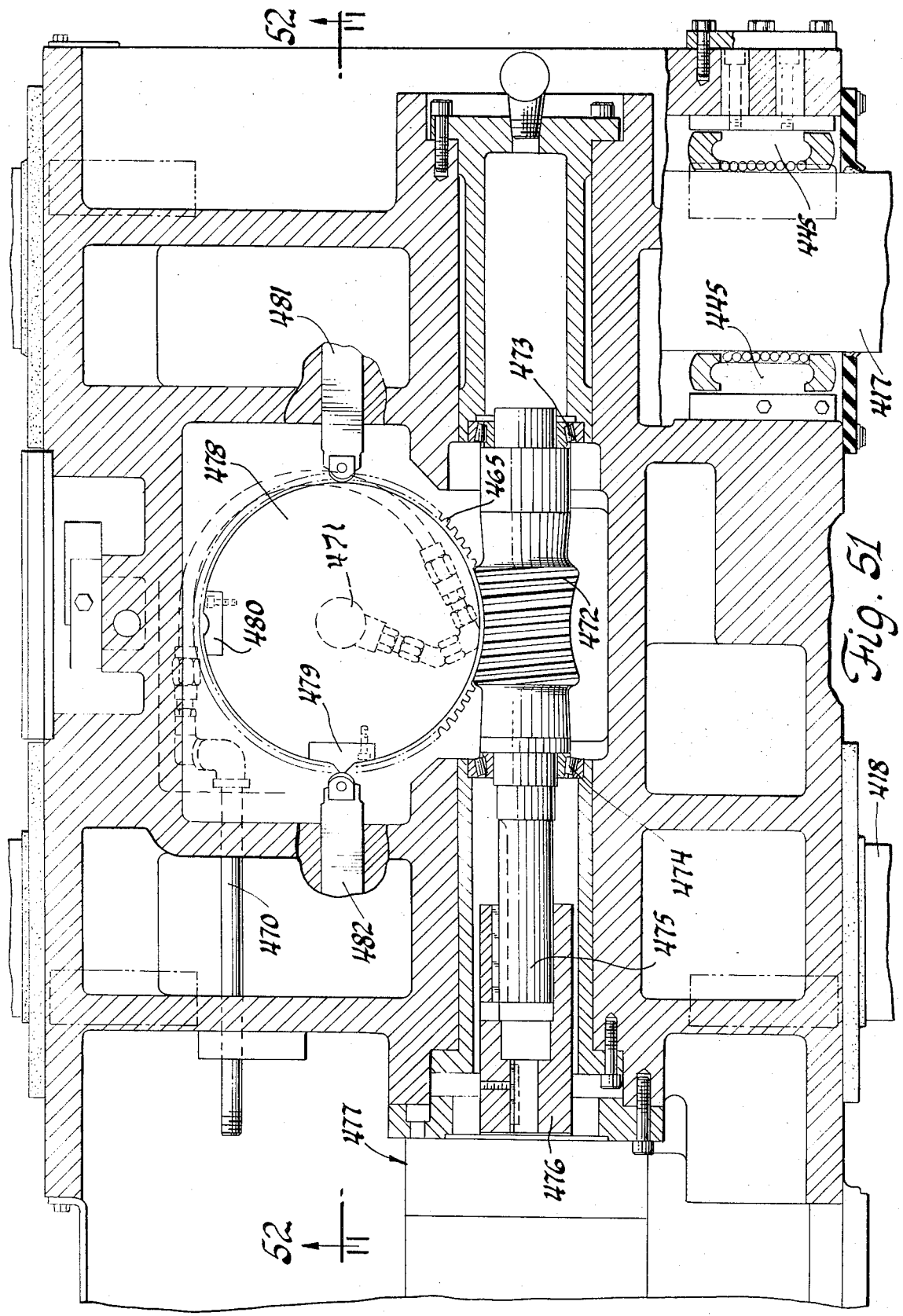
FIG. 51 is a horizontal section view of the work table structure illustrated in FIG. 50, taken along the line 51—51 thereof, and looking in the direction of the arrows.

The work table assembly 17 is slidably mounted on the Z-axis ways 417 and 418 for longitudinal movement toward and from the spindle assembly 12. The table assembly 17 includes a work table casting or slide member, generally indicated by the numeral 444 in FIGS. 52 and 53. The slide member 444 is provided with the aforementioned ball bearing screw nut 423 (FIG. 53) through which is operatively mounted the lead screw 420. The end points of travel of the work table slide member 444 along the Z-axis ways 417 and 418 are controlled by a pair of limit switches 440 which are shown in FIGS. 46, 47 and 55. The limit switches 440 are mounted on the side of the saddle casting 415 and they are each provided with the usual limit switch operating arms 441. As illustrated in FIG. 55, a pair of support brackets 442 are mounted on the slide member 444 and they each carry a pair of limit switch operator dogs 443, which are similar to the aforedescribed operator dogs 430 and 431. One set of operator dogs 443 operates one of the switches 440 when the work table slide member 444 is moved in one direction, and the other set of operators 443 operate the other switch 440 when the slide member 444 is moved in the other direction. As illustrated in FIG. 51, the work table slide member 444 is operatively mounted on the Z-axis ways 417 and 418 by suitable bearings 445.

Figure 50:
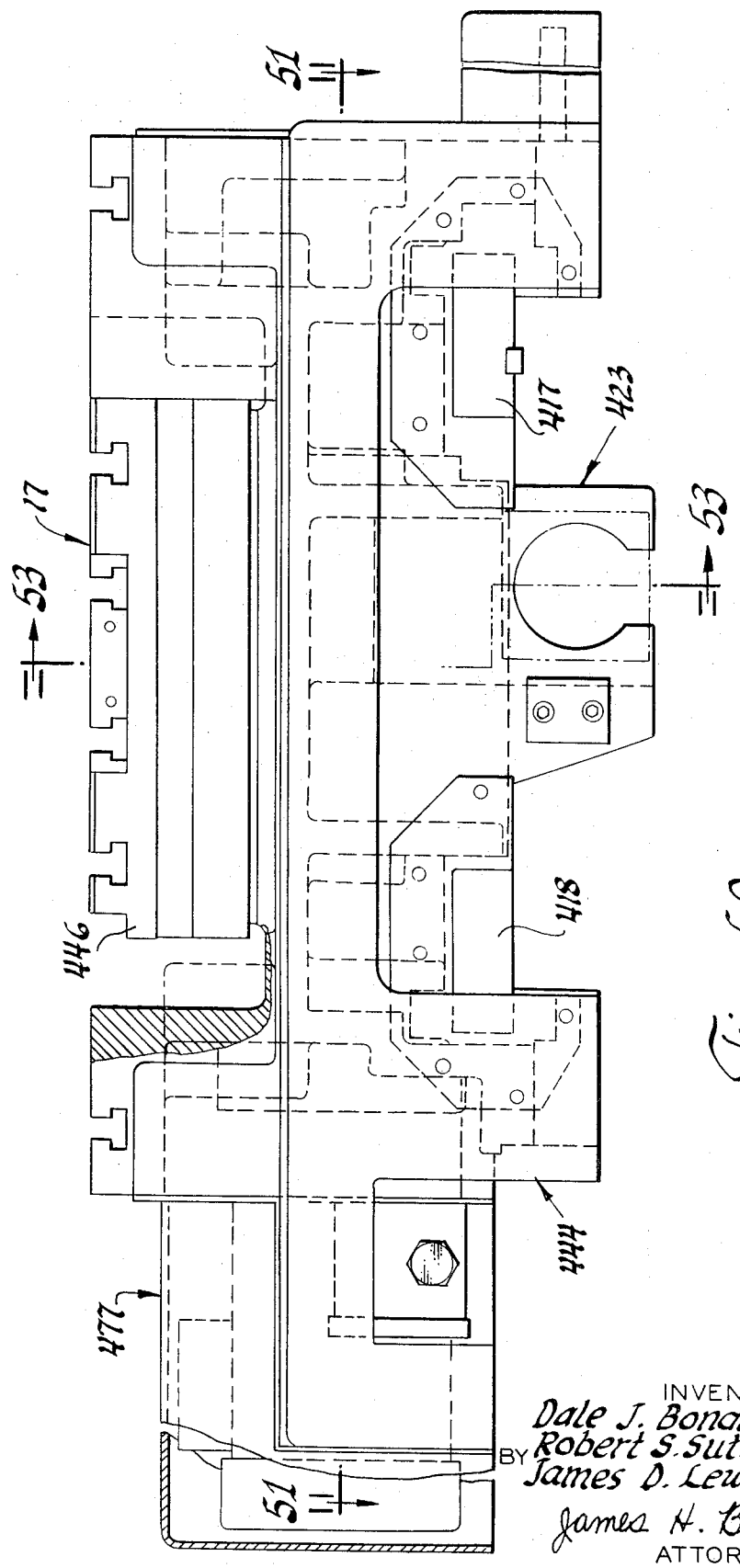
FIG. 50 is a front elevational view, with parts in section, of the work table structure illustrated in FIG. 49, taken along the line 50—50 thereof, and looking in the direction of the arrows.
Figure 52:
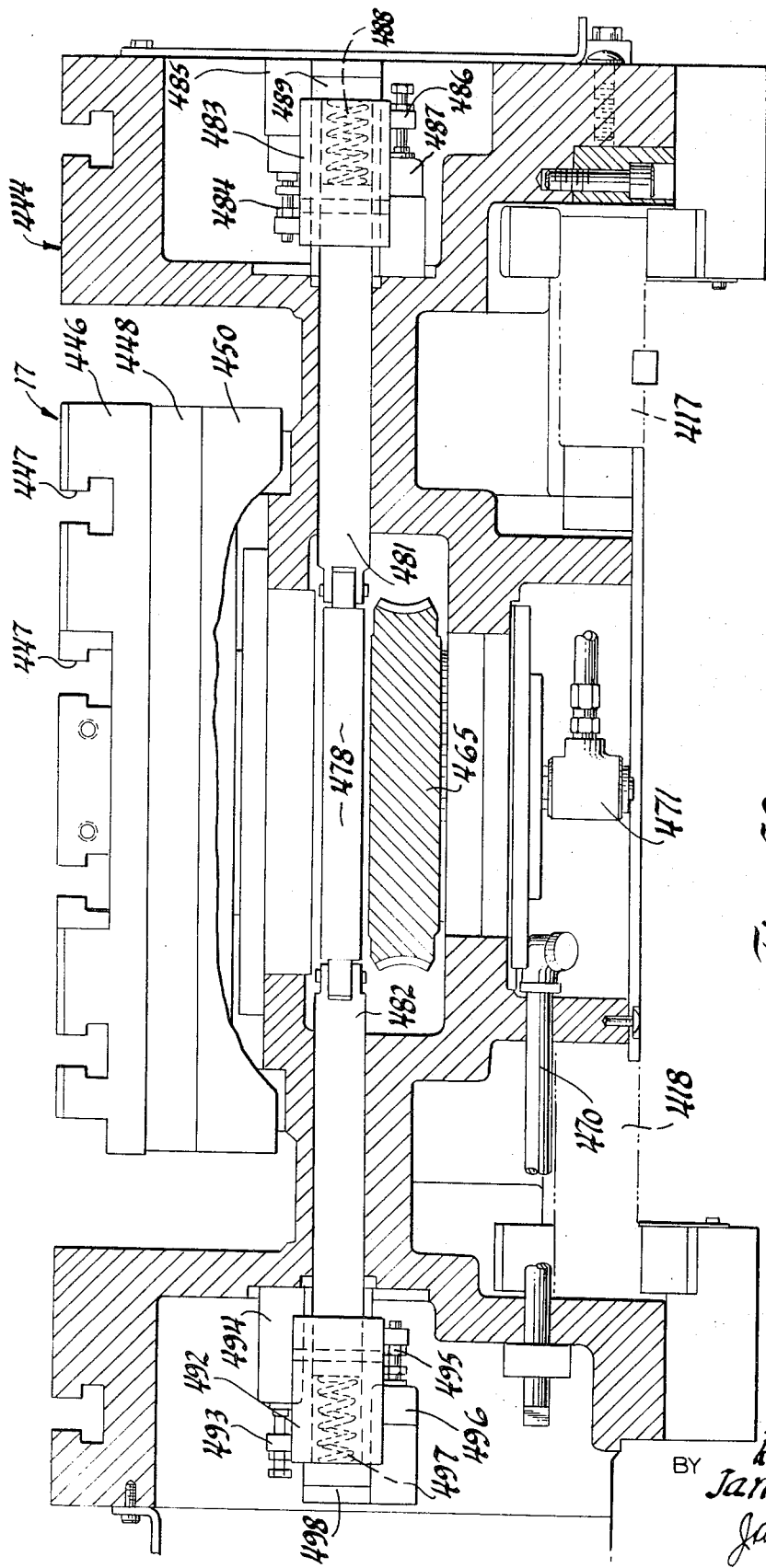
FIG. 52 is an elevational view, partly in section, with parts broken away, of the work table structure illustrated in FIG. 51, taken along the line 52—52 thereof, and looking in the direction of the arrows.
Figure 53:
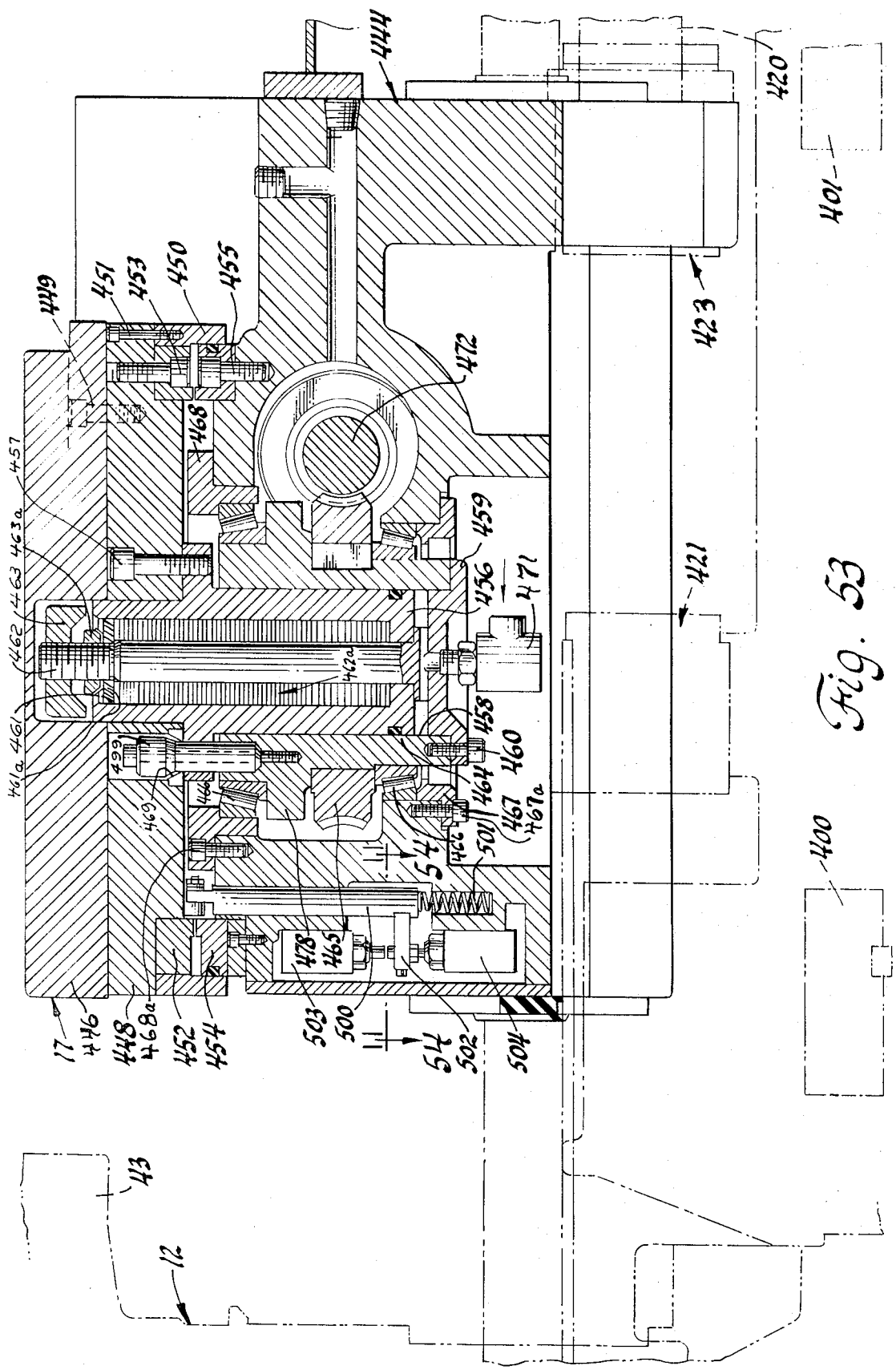
FIG. 53 is a fragmentary, elevational section view of the work table structure illustrated in FIG. 50, taken along the line 53—53 thereof, and looking in the direction of the arrows.

The work table assembly 17 includes a rotary table 446 which is shown in FIGS. 50, 52 and 53. The rotary table 446 is provided with the usual T slots 447 (FIG. 52) for use in mounting workpiece thereon.

As shown in FIG. 53, the rotary table 446 is secured to a circular journal mounting plate 448 by a plurality of machine screws 449. The rotary table 446 is provided with a 72-tooth "CURVIC" coupling for indexing the table. The "CURVIC" coupling comprises an upper coupling ring 452 which is provided on the inner side of its lower face with a plurality of teeth, and it is fixed to the lower periphery of the plate 448 by a plurality of machine screws 453. A lower coupling ring 454, having teeth on the inner side of its upper face for mating engagement with the teeth on the upper coupling ring 452, is fixedly secured to the table slide member 444 by a plurality of machine screws 455. A coupling retainer ring 450 is secured by a plurality of suitable machine screws 451 to the plate 448 for maintaining vertical alignment of the coupling rings 452 and 454 when they are moved vertically apart, as will be explained more fully hereinafter.

Fixedly secured to the plate 448, is a rotary tubular shaft and piston 456 which is closed at the lower end thereof, and which functions as a rotary shaft for the table 446 and also as a hydraulic piston for raising the table 446 for indexing purposes. The rotary shaft 456 is provided with a suitable flange which is secured to the plate 448 by a plurality of machine screws 457. The rotary shaft and piston 456 is slidably mounted in a vertically formed cylinder 458 in a rotary cylinder housing 464 which is formed separately from the slide member 446 and which is rotatably mounted in the slide member 444 by a pair of suitable bearing assemblies 466. As shown in FIG. 53, the lower end of the cylinder 458 is enclosed by a cylinder head or cover plate 459 that is secured to the lower end of the rotary cylinder housing 464 by a plurality of machine screws 460. The rotary cylinder housing 464 and the bearings 466 are retained in place by a lower retainer ring 467 and an upper retainer ring 468 which are secured in place by suitable machine screws 467a and 468a, respectively.

As shown in FIG. 53, the rotary shaft and piston 456 has a cylindrical chamber 461 formed therein, which is open on the upper end and closed at the lower end. A fixed post 462 extends upwardly through the closed lower end of the chamber 461 and into a recess in the work table 446. The lower end of the post 462 is fixed to the cylinder head 459 by suitable means. A stop member 463 is mounted on the upper threaded end of the post 462 for stopping the upward movement of the table 446 during an indexing operation, as described more fully hereinafter. The table 446 is locked in place by a spring means 462a which comprises a plurality of sets of spring washers operatively mounted around the post 462 in the chamber 461. The spring washers exert a downward locking pressure on the piston 456 and table 446 and they are secured in place by the lock nut 463a and pressure washer 461a.

As shown in FIGS. 51 and 53, a gear 465 is fixed to the outer periphery of the rotary cylinder housing 464 for rotating the table 446. As best seen in FIG. 51, the gear 465 is meshably engaged with a worm gear 472 which is formed on a shaft 475. The shaft 475 is rotatably mounted in a pair of bearing means 473 and 474. The input end of shaft 475 is operatively connected by a suitable coupling 476 to a suitable D.C. drive motor 477.

As shown in FIGS. 51, 52 and 53, a rotary cam plate 478 is integrally formed on the outer periphery of the rotary cylinder housing 464, and it carries a protruding cam 479 fixed on its periphery, and an intended cam 480 fixed on its periphery at a point spaced 90' from cam 479. When the rotary cylinder housing 464 is rotated, the cams 479 and 480 are adapted to operatively engage cam rollers mounted on the inner end of a pair of cam follower rods 481 and 482, which are slidably mounted in the work table slide member 444 in radially extended positions relative to the rotary cylinder housing 464.

As shown in FIG. 52, the outer end of the cam follower rod 481 is slidably mounted in a spring housing 483 which is fixed to the slide member 444. A spring 488 is mounted in the housing 483 and it functions to normally bias the rod 481 radially inward toward the cam plate 478 to maintain it in operative contact therewith. The spring housing 483 is enclosed at its outer end by a suitable end plate 489. The cam follower rod 481 operatively carries a limit switch operator 484 for operating a limit switch 485 when the cam rod 481 is moved inwardly by coaction with the intended cam 480. A second operator 486 is also carried by the rod 481 and it operates a second limit switch 487 when the cam rod 481 is moved outwardly by coaction with the protruding cam 479.

As shown in FIG. 52, the cam follower rod 482 is also adapted to operate a pair of limit switches 494 and 496 when it is moved outwardly and inwardly, respectively, by means of a pair of operators 493 and 495. The rod 482 extends into a spring housing 492 in which is operatively mounted a spring 497 for normally biasing the rod 482 into operative engagement with the cam plate 478. The spring housing 492 is enclosed at its outer end by a suitable end plate 498. The limit switches 485, 486, 494 and 496 are carried on the slide member 444 and they are adapted to provide a limit switch signal at each 90° rotary movement of the work table 446 to provide an automatic four-position indexing table. However, it will be understood that the table 446 may be manually rotated in increments of five degrees, if desired. It will also be understood that the aforementioned "CURVIC" coupling is provided with the spring means 462a for normally biasing the work table 446 downwardly to maintain the coupling rings 452 and 454 in operative engagement with each other.

The rotary table 446 is raised upwardly to separate the upper coupling ring 452 from the lower coupling ring 454 to permit the table 446 to be indexed between the four index positions by the following described structure. As shown in FIG. 51, a pressurized hydraulic fluid supply line 470 is operatively connected to a rotating fitting 471 that is secured to the cylinder head cap 459 for admitting fluid under pressure into the cylinder 458 upon an index signal from the machine control system. The fluid under pressure will force the rotary table 446 and piston 456 upwardly to move the coupling ring 452 upward from the coupling ring 454. After the table 446 has been moved to a raised position, the drive motor 477 is actuated to turn the shaft 475 and the worm gear 472 and its mating gear 465. When the appropriate signal is given by the last mentioned limit switch signal means, the indexing movement is completed and the supply of fluid under pressure is stopped and the table 446 is locked in place by the downwardly directed pressure of spring means 462a.

The following described means is provided to take the backlash out of the table structure so that the backlash between the worm drive gear 472 and the gear 465 will not affect the indexing of the table 446. As shown in FIG. 53, a locating pin 499 has its lower end fixed in the rotary cylinder housing 464 and it is provided with an enlarged head on the upper end thereof. The pin 499 is slidably mounted through a flange on the rotary piston 456. Said enlarged head is provided with a chamfered or tapered lower edge which forms an inverted, conical surface. The enlarged head of the locating pin 499 extends into a recess in the mounting plate 448. An inverted conical seat is formed on a ring at the lower edge of said recess and in a position such that when the table 446 is raised the last mentioned inverted conical seat will be moved upwardly into engagement with the inverted conical surface on the lower end of the enlarged head on the locating pin 499. The work table 446 is thus always held in a predetermined position during an indexing movement and it is indexed independently of the teeth of the "CURVIC" coupling.

The upward and downward travel of the table 446 is signaled by a rod 500 which is slidably mounted in the slide member 444 in a vertical position. A roller is operatively mounted on the upper end of the rod 500 and it rolls against the flat undersurface of the journal mounting plate 448. A spring 501 is operatively mounted in a bore in the slide member 444 and it normally biases the rod 500 upwardly to maintain the roller on its upper end in engagement with the plate 448. The rod 500 carries a switch operator 502 which is adapted to operate an upwardly disposed limit switch 503 when the rod 500 moves upwardly and to operate a downwardly disposed limit switch 504 when the rod 500 moves downwardly. The limit switches 503 and 504 are fixedly secured to the slide member 444 by any suitable means.

OPERATION

Figure 56:
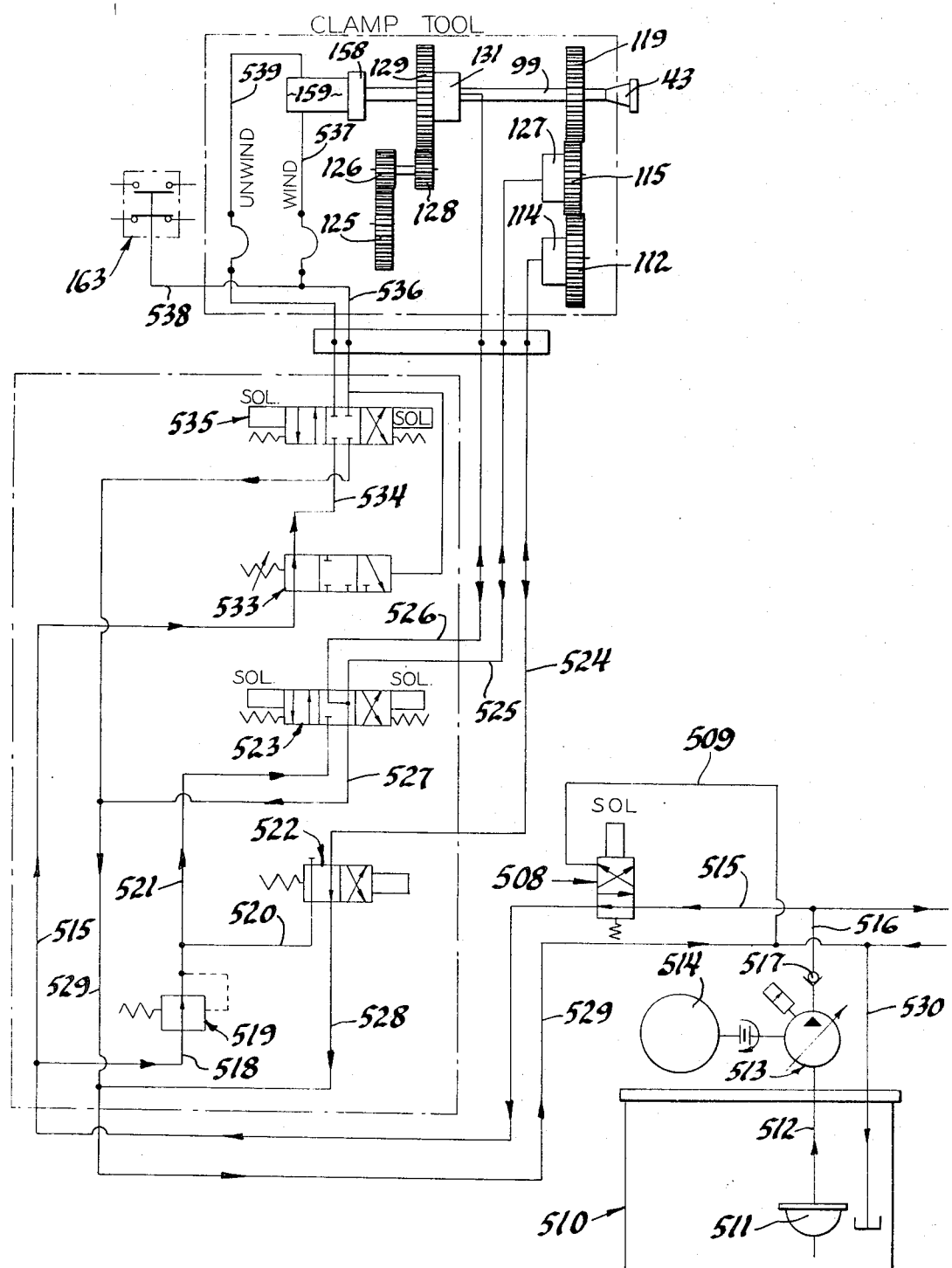
FIGS. 56 and 57 comprise an illustrative hydraulic and drive control system for controlling the operation of the illustrative machine tool.
Figure 57:
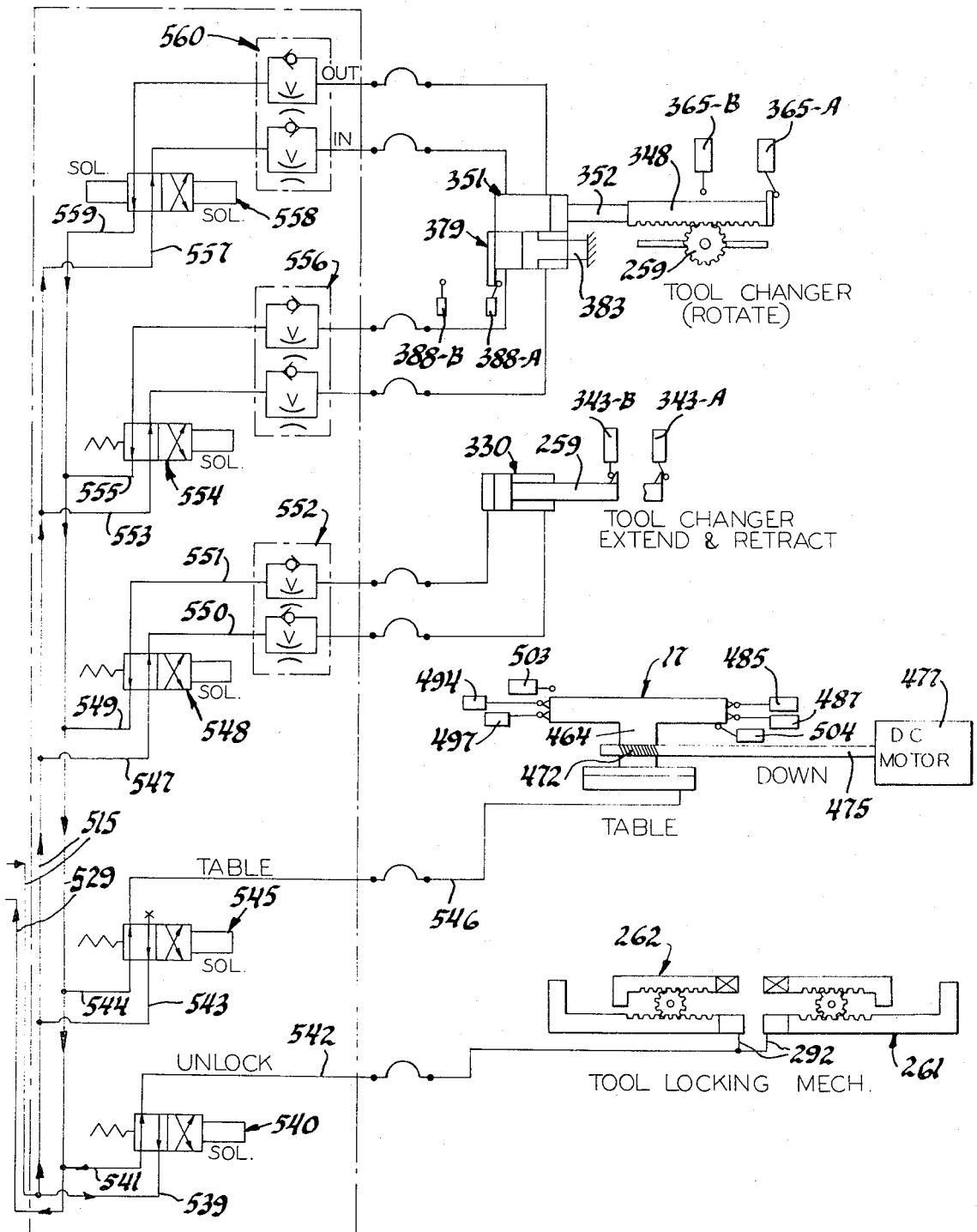

It will be understood that any suitable electric control circuit may be employed for controlling the various electric drive motors, solenoids, and other apparatuses used for controlling the operation of the hydraulic units shown in FIGS. 56 and 57, since control circuits of this type are within the realm of selection by a skilled mechanic. A machining tool 9 made in accordance with the principles of the present invention may also be controlled by a suitable numerical control system, as for example, a "NUMERA-TROL" positioning control system available on the market from the Ex-Cell-O Corporation of Detroit, Mich. The last mentioned positioning system is programmed incrementally, (4) axis, accepting tab sequential data. It will accommodate the positioning of all linear axes as well as 360 discrete positions of the rotary axis. It will accept and control all feed rates and rapid traverse rates. It will control all spindle speed selections and directions, coolant On-Off situations, the entire cycle and desired sequence of automatic tool changing, and other control factors.

The cutting tools 145 are mounted in the holders 144 and are then manually inserted into the tool pots 169 which comprise the tool storage conveyor 166. The tool storage conveyor 166 is jogged to new positions to enable the operator to continue to insert the tools from a desired position. The tools 145 are inserted into the tool storage conveyor 166 in their desired sequence.

As shown in FIG. 56, a suitable hydraulic fluid reservoir 510 is provided to supply the necessary hydraulic fluid to the various hydraulic motors and cylinders used in the machine. The numeral 511 indicates a filter which is connected by an intake conduit 512 to a suitable hydraulic fluid pump 513 which is driven by a suitable electric motor 514. The pump 513 forces hydraulic fluid under pressure through a suitable check valve 517 and discharge conduit 516 into a fluid supply conduit 515. A solenoid operated master control hydraulic valve is interconnected in the supply conduit 515 and it is spring biased to a first or normal position to permit flow through the conduit 515, and it is solenoid operated to a second position to by-pass the conduit 515. When the valve 508 is solenoid operated to said second position, it traps the hydraulic fluid in the various conduits and by-passes the fluid through the by-pass conduit 509 back to the return conduit 530, until the pump 513 is stopped. The valve 508 provides the hydraulic system with positive stopping and starting actions. The hydraulic system is ready for instant use and it stops all hydraulic action immediately upon operation of the valve solenoid. The hydraulic clutches 114, 127 and 131 for controlling the speeds of the tool spindle 43 are controlled by solenoid operated flow control valves 522 and 523. Fluid under pressure is fed to the flow control valve 522 through the fluid conduits 515 and 518, and the pressure regulating valve 519 and the fluid conduit 520. Fluid under pressure is fed to the flow control valve 523 from the fluid supply conduit 515 through the conduits 518 and 521 and the pressure regulating valve 519. The flow control valve 522 regulates the flow of pressurized fluid to the fluid operated clutch 114 through the conduit 524. The flow control valve 523 controls the flow of fluid to the fluid operated clutches 127 and 131 through the conduits 525 and 526. Fluid is returned to the reservoir 510 from the valves 522 and 523 through the conduits 527, 528, 529 and 530.

As shown in FIG. 56, the draw bar hydraulic motor 159 is controlled through suitable solenoid operated flow control valves 533 and 535 which control the unlocking and locking operations of the draw bar, respectively. Fluid under pressure is supplied to the flow control valve 533 from the conduit 515. Fluid under pressure is supplied to the flow control valve 535 from the valve 533 through the conduit 534. The control valves 533 and 535 are interconnected with the hydraulic motor 159 through fluid conduits 536, 537 and 539. The pressure operated switch 163, for controlling the electric clutch 158 is interconnected with the conduits 536 and 537 by the conduit 538.

As shown in FIG. 57, the operation of the hydraulic cylinder means in the tool changer arm 258 for operating the pistons 271 is controlled by a suitable solenoid operated flow control valve 540 which is supplied with fluid under pressure by conduits 515 and 539. The valve 540 supplies fluid under pressure through the conduit 542 to the cylinders 272 for unlocking the tools in the tool gripper means 261 and 262. The fluid is returned to the reservoir 510 from the valve 540 through the conduits 541 and 529.

A suitable solenoid operated flow control valve 545 is provided to control the flow of fluid to the cylinder 458 for raising the work table 446. Fluid under pressure is supplied to the flow control valve 545 by the conduits 515 and 543. Fluid is returned from the valve 545 through the conduits 544 and 529. Fluid is supplied to the inlet pipe 270 of the cylinder 458 by the conduit 546.

A suitable solenoid operated flow control valve 548, and a pair of speed control valves 552 are provided for controlling the direction of movement and speed, respectively, of the tool changer fluid cylinder 330. The flow control valve 548 is supplied with fluid from the conduit 515 by the conduit 547. Fluid is returned to the reservoir 510 through the conduits 549 and 529. The speed control valves 552 are interposed between the flow control valve 548 and the hydraulic cylinder 330 in fluid conduits 550 and 551.

The hydraulic cylinders 379 and 351 for rotating the tool changer arm 258 are controlled in their forward and rearward movements by suitable solenoid operated flow control valves 554 and 558. The flow control valve 554 is provided with fluid under pressure by the conduits 515 and 553, and it is connected to the fluid reservoir 510 by the conduits 555 and 529. The flow control valve 558 is provided with fluid under pressure by the fluid conduits 529 and 557. The flow control valve 558 is connected to the fluid reservoir 510 by the return conduits 559 and 529. The speed control valves 560 and 556 are interconnected in the conduits which connect the flow control valves 558 and 554 to the cylinders 351 and 379, respectively.

An automatic tool change operation is carried out by setting the control system employed for the automatic mode of operation. In order to change tools, the tool in the spindle 43 must be programmed clear of the workpiece and fixture on the work table 446. The spindle assembly 12 is then automatically moved upward along the Y-axis to the "tool change position" at a rapid traverse rate by its electric drive motor 51. As the spindle assembly 12 moves toward the tool change position, it activates the slow-down limit switch 80 which removes the "rapid traverse" rate from the spindle assembly 12 and applies a "slow" rate until the tool change position limit switch 79 is activated, at which time the spindle assembly 12 stops at the tool change position. The tool conveyor 166 will have been stopped with a tool pot 169 at the tool change position with the next tool to be used in the desired sequence.

The tool changer arm would be in the "springs or start position shown in FIG. 29, with the cylinder 351 in the forward position and the cylinder 379 in the retracted position. The solenoid operated valve 554 would be activated to supply fluid to cylinder 379 which is then operated to the position shown in FIG. 30, and the tool changer arm 258 is thus rotated in a counterclockwise direction, as viewed from the front of the machine, to the "tool pick-up" positionc8 shown in FIG. 30.

The solenoid operated valve 540 is de-energized and the springs 280 in the tool changer arm 258 then operate to clamp the tool holder 144 in the tool conveyor 166 in the tool gripper mechanism 261, and the tool holder 144 in the spindle 43 in the tool gripper mechanism 262. The draw bar control valves 533 and 535 will be operated to feed fluid under pressure to the hydraulic motor 159 for unlocking the draw bar 141. The electric clutch 158 will also be activated. The solenoid operated valve 548 is then operated to control the flow of fluid under pressure to the hydraulic cylinder 330 which is then operated to extend the tool changer arm 258 to pick up a new tool from the tool conveyor 266 and the old tool from the spindle 43.

When the tool changer arm 258 is fully extended, the solenoid operated valve 558 is operated to control the flow of fluid to the fluid cylinder 351 which rotates the tool changer arm 258a 180° in a counterclockwise direction to the position shown in FIG. 31, so that the new tool picked up from the tool conveyor 166 is rotated towards the spindle 43, and the old tool picked up from the spindle 43 is rotated toward the tool conveyor 166. The solenoid operated valve 548 is then operated to control the flow of fluid to the cylinder 330 for retracting the tool changer arm 258 so as to deposit the new tool in the spindle 43 and the old tool in the tool conveyor 166.

The electric clutch 158 is then energized and at the same time the solenoid operated valve 535 is energized so as to operate the hydraulic motor 159 in a direction to clamp the new tool in the spindle 43. The hydraulic motor 159 is operated until the hydraulic motor pressure switch 163 is activated at a certain predetermined pressure, as for example, 430 psi. When the predetermined pressure is built up in the hydraulic motor 159, the pressure switch 163 de-energizes the electric clutch 158. The solenoid operated valve 540 is then energized to send fluid under pressure to the fluid cylinders 272 in the tool changer arm 258 for unclamping or unlocking the tool gripper means 261 and 262. The solenoid operated valve 554 is then operated to activate fluid cylinder 379 to retract the same and rotate the tool changer arm 258 clockwise 90° to the "park" or idle position as shown in FIG. 32. At this time the tool conveyor 166 is indexed at one position.

FIGS. 33, 34 and 35 show how a tool may be picked up from the spindle 43 and returned to the storage conveyor 166. In order to carry out the last-mentioned tool transfer, thecylinder 379 is activated forwardly in a direction to rotate the tool changer arm 90° counterclockwise, for a tool pick-up from the spindle. The cylinder 330 is activated to retract the tool changer arm 258 toward the spindle 43 to the tool pick-up position. After the tool has been clamped in the tool changer arm 258, the cylinder 351 is activated forward to rotate the tool changer arm 258 in a 180° clockwise movement, as shown in FIG. 34, to return the tool to the storage conveyor 166. After the tool has been disposed in the conveyor 166, thecylinder 379 is activated in the retracting direction to return the tool changer arm 258 90° clockwise to the "park" position.

The machine of the present invention is of a welded steel construction. The provision of the aligned drive motor, gear reduction means, resolver, and spindle permits the mounting of suitable lubrication means on the outside of the machine to eliminate any heat sink within the machine and to maintain accuracy. The major heat producing devices for the electric spindle drive and the electric feed drives are mounted exterior to the machine to eliminate any heat generated on the machine structure itself. By eliminating heat within the machine housing, it is possible to maintain more accurate machining dimensions since the machine will not expand with temperatures being produced by hot lube oil or from the operation of the machine itself. The mounting of the tool conveyor directly over the tool changer arm 258 and in alignment with the spindle assembly 12 provides a tool changing system which eliminates any intermediate or hold positions and permits a fast tool changing operation. The speed of the tool changing operation is also assisted by the fact that the tools are stored in the conveyor 166 on a horizontal axis parallel to the axis of the spindle 43 and they are brought to a tool change position in vertical spaced alignment with the tool spindle 43.

While it will be apparent that the preferred embodiment of the invention herein disclosed is well calculated to fulfill the objects above stated, it will be appreciated that the invention is susceptible to modification, variation and change.

What is claimed is:

1. In a machine tool, the combination of:
 a. a tool spindle assembly including a rotatable tool spindle operatively mounted for movement along a first axis;
 b. a work table for supporting a workpiece for a cutting operation thereon by a tool in said tool spindle;
 c. means for operatively mounting said work table adjacent said tool spindle for movement along two axes which are perpendicular to each other and to said first axis;
 d. a tool storage means carried on said machine and disposed in a position spaced apart from said tool spindle and adapted to move a tool into a tool change position with the axis of the tool parallel to and in alignment with the axis of the tool spindle;
 e. a tool changer means disposed between said tool storage means and said tool spindle for transferring tools directly between said tool storage means and said tool spindle to change the tools held by the tool spindle in a predetermined sequence, whereby a plurality of machining operations can be made automatically on a workpiece mounted on said work table;
 f. a column assembly comprising a pair of laterally spaced column members carried on a machine base;
 g. said spindle assembly is operatively mounted on said column members for movement along said first axis;
 h. said tool storage means is mounted on said column members above said spindle assembly; wherein said storage means comprises:
  1. a horizontally disposed endless conveyor chain including a plurality of tool pots hingedly connected together by a plurality of vertically disposed pins;
  2. means fo moving said endless conveyor in a predetermined sequence of movement for co-action with said tool changer means for transferring tools between the conveyor and the tool spindle;
  3. said tool pots are provided with a tool holder receptacle for releasably holding a tool holder with a tool mounted therein on a horizontal axis;
  4. each of said tool pots is provided with means for indicating that a tool holder is mounted in said pots; and
  5. said means for indicating that a tool holder is mounted in said pots comprises a vertically disposed pin slidably mounted in each pot and movable downwardly by gravity if the tool pot is vacant, and movably upwardly when a tool holder is inserted into a tool pot to indicate that a tool holder is present.

2. In a machine tool, the combination of:
 a. a tool spindle assembly including a rotatable tool spindle operatively mounted for movement along a first axis;
 b. a work table for supporting a workpiece for a cutting operation thereon by a tool in said tool spindle;
 c. means for operatively mounting said work table adjacent said tool spindle for movement along two axes which are perpendicular to each other and to said first axis;
 d. a tool storage means carried on said machine and disposed in a position spaced apart from said tool spindle and adapted to move a tool into a tool change position with the axis of the tool parallel to and in alignment with the axis of the tool spindle;
 e. a column assembly comprising a pair of laterally spaced column members carried on a machine base;
 f. said spindle assembly is operatively mounted on said column members for movement along said first axis;
 g. a tool changer means disposed between said tool storage means and said tool spindle for transferring tools directly between said tool storage means and said tool spindle to change the tools held by the tool spindle in a predetermined sequence, whereby a plurality of machining operations can be made automatically on a workpiece mounted on said work table; wherein said tool changing means comprises:
1. an actuating shaft operatively mounted between said column members for movement longitudinally and for movement in a rotary oscillating manner in both clockwise and counterclockwise directions;
2. a tool changer arm operatively mounted on the outer end of said actuating shaft;
3. power drive means operatively connected to said shaft for moving said shaft longitudinally to extend and retract said tool changer arm;
4. power drive means operatively connected to said shaft for rotating said shaft through said rotary movements; wherein said power drive means for rotating said shaft comprises:
  A. a gear formed on said shaft;
  B. a gear rack meshed with said gear for turning the same;
  C. fluid operated cylinder means operatively connected to said gear rack for operating the same; wherein said fluid operated cylinder means comprises:
    I. a first fluid cylinder having a cylinder rod secured to a housing in which said shaft is mounted;
    II. a second fluid cylinder attached to said first fluid cylinder and carried thereon and having a cylinder rod connected to said gear rack; and,
    III. means for slidably supporting said fluid cylinders for movement relative to said shaft housing.

3. In a machine tool, the combination of:
a. a tool spindle assembly including a rotatable tool spindle operatively mounted for movement along a first axis;
b. a work table for supporting a workpiece for a cutting operation thereon by a tool in said tool spindle;
c. means for operatively mounting said work table adjacent said tool spindle for movement along two axes which are perpendicular to each other and to said first axis;
d. a tool storage means carried on said machine and disposed in a position spaced apart from said tool spindle and adapted to move a tool into a tool change position with the axis of the tool parallel to and in alignment with the axis of the tool spindle;
e. a tool changer means disposed between said tool storage means and said tool spindle for transferring tools directly between said tool storage means and said tool spindle to change the tools held by the tool spindle in a predetermined sequence, whereby a plurality of machining operations can be made automatically on a workpiece mounted on said work table;
f. a column assembly comprising a pair of laterally spaced column members carried on a machine base;
g. said spindle assembly is operatively mounted on said column members for movement along said first axis;
h. a draw bar rotatably mounted in said spindle and having a drawbolt on the front end thereof for operative threading engagement with a tool holder inserted into said spindle;
i. a fluid operated drive motor;
j. an electric clutch interconnecting said fluid operated drive motor and the rear end of said draw bar for rotating the draw bar selectively in a clamping or unclamping direction of rotation; and
k. a pressure operated switch operatively connected to said fluid operated drive motor for disengaging said electric clutch when said fluid drive motor has developed a predetermined clamping pressure.

4. In a machine tool, the combination of:
a. a tool spindle assembly including a rotatable tool spindle operatively mounted for movement along a first axis;
b. a work table for supporting a workpiece for a cutting operation thereon by a tool in said tool spindle;
c. means for operatively mounting said work table adjacent said tool spindle for movement along two axes which are perpendicular to each other and to said first axis;
d. a tool storage means carried on said machine and disposed in a position spaced apart from said tool spindle and adapted to move a tool into a tool change position with the axis of the tool parallel to and in alignment with the axis of the tool spindle;
e. a tool changer means disposed between said tool storage means and said tool spindle for transferring tools directly between said tool storage means and said tool spindle to change the tools held by the tool spindle in a predetermined sequence, whereby a plurality of machining operations can be made automatically on a workpiece mounted on said work table;
f. a column assembly comprising a pair of laterally spaced column members carried on a machine base;
g. said spindle assembly is operatively mounted on said column members for movement along said first axis;
h. a draw bar rotatably mounted in said spindle and having a drawbolt on the front end thereof for operative threading engagement with a tool holder inserted into said spindle
i. a fluid operated drive motor;
j. an electric clutch interconnecting said fluid operated drive motor and the rear end of said draw bar for rotating the draw bar selectively in a clamping or unclamping direction of rotation; and
k. said draw bar is connected to said electric clutch by a spring biased spline means, whereby said draw bar is provided with a constant forward bias toward the front end of the spindle.

5. In a machine tool, the combination of:
a. a tool spindle assembly including a rotatable tool spindle operatively mounted for movement along a first axis;
b. a work table for supporting a workpiece for a cutting operation therein by a tool in said tool spindle; wherein said means for mounting said work table adjacent said tool spindle includes:
  1. an X-axis ways assembly carrying X-axis ways;
  2. a saddle slide assembly slidably mounted on said X-axis ways and carrying Z-axis ways;

3. a power drive means mounted on said X-axis ways assembly and engagable with said saddle slide assembly for moving the same along the X-axis ways;
4. a work table slide slidably mounted on said Z-axis ways;
5. a power drive means mounted on said saddle slide assembly and engageable with said work table slide for moving the same along said Z-axis ways;
6. means for rotatably mounting said work table on said work table slide;
7. means for raising said work table and indexing said work table;
8. a spring biased clamping means for normally retaining said work table on said work table slide against rotation thereof and being disabled by means for raising said work table when said work table is indexed;
9. means for holding said work table in a predetermined position when it is raised for indexing relative to said coupling;
10. said coupling is provided with an upper part and a lower part and each of said coupling parts is provided with a coupling teeth which mesh with each other when the table is in a lowered position;

c. means for operatively mounting said work table adjacent said tool spindle for movement along two axes which are perpendicular to each other and to said first axis;
d. a tool storage means carried on said machine and disposed in a position spaced apart from said tool spindle and adapted to move a tool into a tool change position with the axis of the tool parallel to and in alignment with the axis of the tool spindle; and
e. a tool changer means disposed between said tool storage means and said tool spindle for transferring tools directly between said tool storage means and said tool spindle to change the tools held by the tool spindle in a predetermined sequence, whereby a plurality of machining operations can be made automatically on a workpiece mounted on said work table.

6. In a machine tool, the combination of:
a. a tool spindle assembly including a rotatable tool spindle operatively mounted for movement along a first axis;
b. a work table for supporting a workpiece for a cutting operation thereon by a tool in said tool spindle; wherein said means for mounting said work table adjacent said tool spindle includes:
1. an X-axis ways assembly carring X-axis ways;
2. a saddle slide assembly mounted on said X-axis ways and carrying Z-axis wasy;
3. a power drive means mounted on said X-axis ways assembly and engagable with said saddle slide assembly for moving the same along the X-axis ways;
4. a work table slide slidably mounted on said Z-axis ways;
5. a power drive means mounted on said saddle slide assembly and engageable with said work table slide for moving the same along said Z-axis ways;
6. means for rotatably mounting said work table on said work table slide;
7. means for raising said work table and indexing said work table;
8. a spring biased clamping means for normally retaining said work table on said work table slide against rotation thereof and being disabled by said means for raising said work table when said work table is indexed;
9. means for holding said work table in a predetermined position when it is raised for indexing relative to said coupling; wherein said means for holding said work table in a predetermined position includes;
  A. a locating pin fixed against movement with said table when the table is raised and having an inverted conical lower edge, and a locating ring movable upwardly with said table when the table is raised and having an inverted conical inner periphery which seats on said inverted conical lower edge on said locating pin to hold said table in a raised position relative to the coupling teeth on said coupling parts so as to eliminate backlash effect when the table is lowered after it has been indexed;
10. said coupling is provided with an upper part and a lower part and each of said coupling parts is provided with coupling teeth which mesh with each other when the table is in a lowered position;

c. means for operatively mounting said work table adjacent said tool spindle for movement along two axis which are perpendicular to each other and to said first axis;
d. a tool storage means carried on said machine and disposed in a position spaced apart from said tool spindle and adapted to move a tool into a tool change position with the axis of the tool parallel to and in alignment with the axis of the tool spindle; and
e. a tool changer means disposed between said tool storage means and said tool spindle for transferring tools directly between said tool storage means and said tool spindle to change the tools held by the tool spindle in a predetermined sequence, whereby a plurality of machining operations can be made automatically on a workpiece mounted on said work table.

7. In a machine tool, the combination:
a. a tool spindle assembly including a rotatable tool spindle operatively mounted for movement along a first axis;
b. a work table for supporting a workpiece for a cutting operation thereon by a tool in said tool spindle;
c. means for operatively mounting said work table adjacent said tool spindle for movement along two axes which are perpendicular to each other and to said first axis; wherein said means for mounting said work table adjacent said tool spindle includes:
1. An X-axis ways assembly carrying X-axis ways;
2. a saddle slide assembly slidably mounted on said X-axis ways and carrying Z-axis ways;
3. a power drive means mounted on said X-axis ways assembly and engageable with said saddle slide assembly for moving the same along the X-axis ways;

4. a work table slide slidably mounted on said Z-axis ways;
5. a power drive means mounted on said saddle slide assembly and engageable with said work table slide for moving the same along said Z-axis ways;
6. means for rotatably mounting said work table on said work table slide;
7. means for raising said work table and indexing said work table; wherein said means for indexing said work table includes:
   A. a circular cam operatively connected to said work table;
   B. a pair of radially disposed cam follower rods slidably mounted in said work table slide, and each of said cam follower rods having a roller on one end in rolling engagement with said circular cam and having spring means on the other end for normally biasing the rod against said circular cam;
   C. each of said cam follower rods carrying a pair of limit switch operators fixed thereon for operating a limit switch on either an inward movement or an outward movement; and
   D. an indented cam disposed on the periphery of said circular cam for operative engagement with said cam follower rods and a projecting cam spaced 90° from said indented cam on the periphery of said circular cam for operative engagement with said cam follower rods, for controlling the indexing of said rotary table when it is in a raised portion;
d. a storage means carried on said machine and disposed in a position spaced apart from said tool spindle and adapted to move a tool into a tool change position with the axis of the tool parallel to and in alignment with the axis of the tool spindle; and
e. a tool changer means disposed between said tool storage means and said tool spindle for transferring tools directly between said tool storage means and said tool spindle to change the tools held by the tool spindle in a predetermined sequence, whereby a plurality of machining operations can be made automatically on a workpiece mounted on said work table.

8. In a machine tool, the combination comprising:
a. a machine base;
b. a work table slide operatively mounted on said machine base;
c. a rotary work table;
d. means for rotabably mounting said rotary work table on said slide;
e. means for rotating said rotary work table;
f. means for retaining said rotary work table in a locked position against rotation; and,
g. means for raising said rotary work table to an unlocked position to permit said means for rotating the work table to rotate the table to a new position.

9. A machine tool as defined in claim 8, including:
a. means for controlling the means for rotating said rotary work table for indexing the rotary work table through a predetermined rotary distance.

10. A machine tool as defined in claim 9, wherein:
a. said means for controlling the means for rotating said rotary work table includes a rotary cam means and a limit switch control means operated by said cam means.

11. A machine tool as defined in claim 8, wherein:
a. said means for retaining said rotary work table in a locked position includes a toothed coupling means and a spring means.

12. A machine tool as defined in claim 8, wherein:
a. said means for raising said rotary work table includes a hydraulically operated power cylinder.

13. A machine tool as defined in claim 11, including:
a. means for holding the rotary work table in a predetermined position relative to said toothed coupling means while the rotary work table is indexed to a new position.

* * * * *